United States Patent
Choi et al.

(10) Patent No.: US 12,457,330 B2
(45) Date of Patent: *Oct. 28, 2025

(54) METHOD AND DEVICE FOR IMAGE DECODING ON BASIS OF CCLM PREDICTION IN IMAGE CODING SYSTEM

(71) Applicant: LG ELECTRONICS INC., Seoul (KR)

(72) Inventors: Jangwon Choi, Seoul (KR); Seunghwan Kim, Seoul (KR); Jin Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1 day.

This patent is subject to a terminal disclaimer.

(21) Appl. No.: 18/583,655

(22) Filed: Feb. 21, 2024

(65) Prior Publication Data

US 2024/0195956 A1    Jun. 13, 2024

Related U.S. Application Data

(63) Continuation of application No. 17/667,957, filed on Feb. 9, 2022, now Pat. No. 11,943,434, which is a
(Continued)

(51) Int. Cl.
*H04N 19/11* (2014.01)
*H04N 19/105* (2014.01)
*H04N 19/132* (2014.01)
*H04N 19/176* (2014.01)
*H04N 19/186* (2014.01)
(Continued)

(52) U.S. Cl.
CPC .......... *H04N 19/11* (2014.11); *H04N 19/105* (2014.11); *H04N 19/132* (2014.11);
(Continued)

(58) Field of Classification Search
CPC .... H04N 19/11; H04N 19/105; H04N 19/132; H04N 19/176; H04N 19/186;
(Continued)

(56) References Cited

U.S. PATENT DOCUMENTS

| 2018/0077426 A1* | 3/2018 | Zhang | H04N 19/117 |
| 2018/0176594 A1* | 6/2018 | Zhang | H04N 19/11 |
| 2021/0136409 A1* | 5/2021 | Ma | H04N 19/11 |

OTHER PUBLICATIONS

Bross "Versatile Video Coding (Draft 4)," ITU-T SG 16 WP 3 and ISO/IEC JTC 1/SC 29/WG 11, JVET-M1001-v6v7, 299 pages, Jan. 2019.
(Continued)

*Primary Examiner* — Francis Geroleo
(74) *Attorney, Agent, or Firm* — Bryan Cave Leighton Paisner LLP

(57) ABSTRACT

An image decoding method performed by a decoding apparatus according to the present document includes deriving a CCLM mode as an intra prediction mode of a current block, deriving a specific value for the current chroma block, deriving, based on the width and the height of the current chroma block being greater than or equal to the specific value, top neighboring chroma samples whose number is equal to the specific value of the current chroma block, and left neighboring chroma samples whose number is equal to the specific value, deriving CCLM parameters based on the top neighboring chroma samples, the left neighboring chroma samples, and down-sampled neighboring luma samples, deriving prediction samples for the current chroma block based on the CCLM parameters and the down-sampled luma samples, and generating reconstructed samples for the current chroma block based on the prediction samples, wherein the derived specific value is 2.

3 Claims, 40 Drawing Sheets

Related U.S. Application Data continuation of application No. 17/276,438, filed as application No. PCT/KR2019/012195 on Sep. 20, 2019, now Pat. No. 11,290,713.

(60) Provisional application No. 62/737,885, filed on Sep. 27, 2018, provisional application No. 62/734,239, filed on Sep. 20, 2018.

(51) Int. Cl.
  *H04N 19/46* (2014.01)
  *H04N 19/593* (2014.01)
(52) U.S. Cl.
  CPC ......... *H04N 19/176* (2014.11); *H04N 19/186* (2014.11); *H04N 19/46* (2014.11); *H04N 19/593* (2014.11)

(58) Field of Classification Search
  CPC .... H04N 19/46; H04N 19/593; H04N 19/597; H04N 19/70; H04N 19/157; H04N 19/159
  See application file for complete search history.

(56) References Cited

OTHER PUBLICATIONS

Auwera et al. "Description of Core Experiment 3: Intra Prediction and Mode Coding," ITU-T SG 16 WP 3 and ISO/IEC JTC 1/SC 29/WG 11, JVET-J1023, 44 pages, Apr. 2018.

* cited by examiner

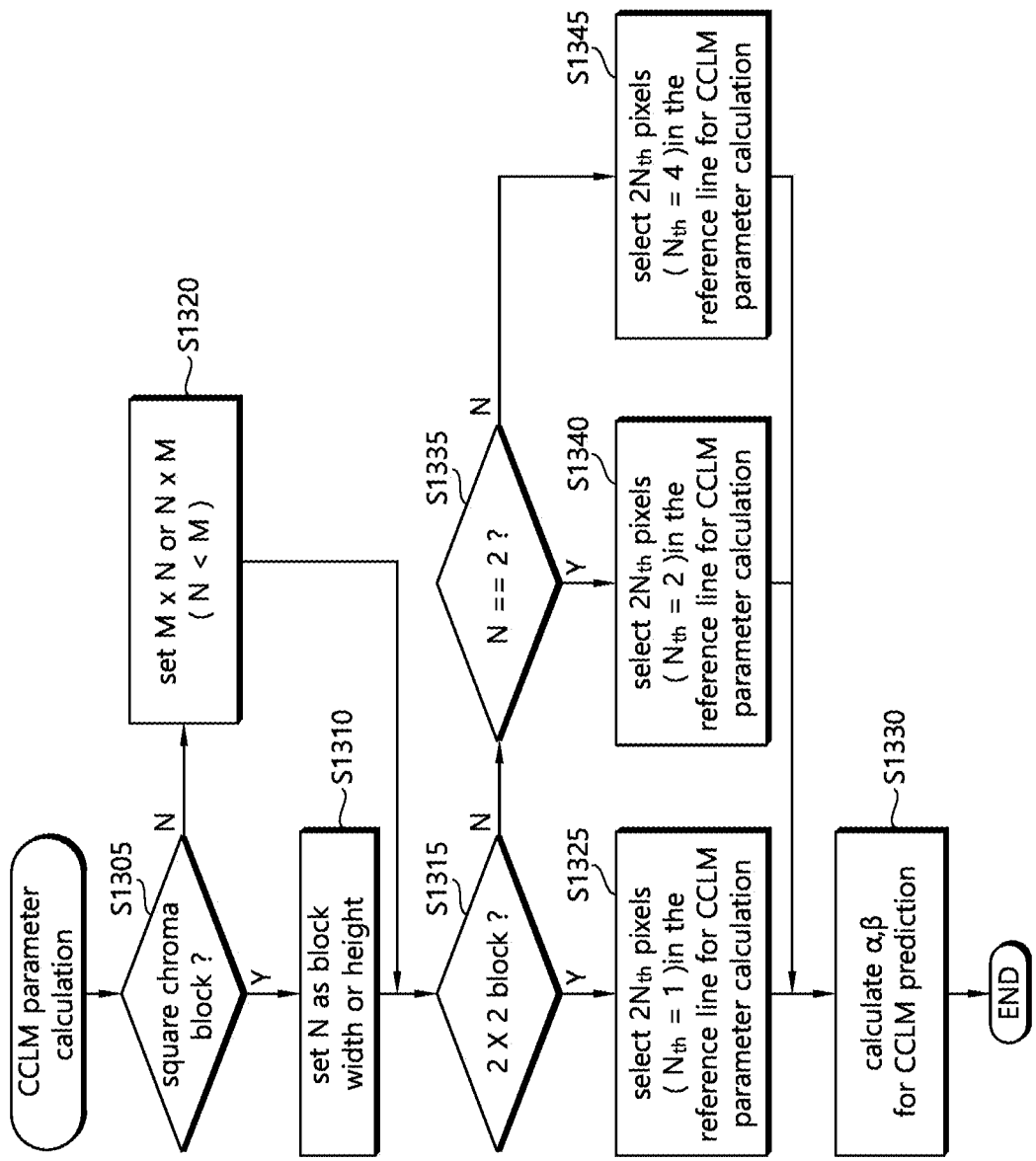

downsampled Y      Cb / Cr previous reference subsampling method downsampled Y      Cb / Cr proposed reference subsampling method downsampled Y  Cb / Cr previous reference subsampling method downsampled Y  Cb / Cr proposed reference subsampling method downsampled Y Cb / Cr previous reference subsampling method downsampled Y Cb / Cr proposed reference subsampling method

FIG. 24

| operations | Number of operations |
|---|---|
| Multiplications | 2N+5 |
| Sums | 4N-1 |
| Division | 2 |

FIG. 25

| Block size | Number of operations ( multiplication + sums ) | | | |
|---|---|---|---|---|
| | Original CCLM | Proposed method ($N_{th}$ =2) | Proposed method ($N_{th}$ =4) | Proposed method ($N_{th}$ =8) |
| N = 2 | 24 | 24 | 24 | 24 |
| N = 4 | 44 | 24 | 44 | 44 |
| N = 8 | 84 | 24 | 44 | 84 |
| N = 16 | 164 | 24 | 44 | 84 |
| N = 32 | 324 | 24 | 44 | 84 |

FIG. 26

| slice_header( ) { | Descriptor |
|---|---|
| ... | |
| cclm_reduced_sample_num | f(2) |
| ... | |
| | |

FIG. 27

| pic_parameter_set_rbsp( ) { | Descriptor |
|---|---|
| ... | |
| cclm_reduced_sample_num | f(2) |
| ... | |
| | |

FIG. 28

| seq_parameter_set_rbsp( ) { | Descriptor |
|---|---|
| ... | |
| cclm_reduced_sample_num | f(2) |
| ... | |
| | |

FIG. 29

| cclm_reduced_sample_num | $N_{th}$ |
|---|---|
| 0 | 2 |
| 1 | 4 |
| 2 | 8 |
| 3 | 16 |

FIG. 30

|  | All Intra Main10 | | | | |
|---|---|---|---|---|---|
|  | Over VTM-2.0.1 | | | | |
|  | Y | U | V | EncT | DecT |
| Class A1 | 0.58% | 2.19% | 1.87% | 100% | 99% |
| Class A2 | 0.37% | 1.92% | 0.83% | 100% | 100% |
| Class B | 0.21% | 0.91% | 1.08% | 100% | 98% |
| Class C | 0.21% | 1.07% | 1.35% | 99% | 99% |
| Class E | 0.13% | 1.14% | 0.88% | 99% | 98% |
| Overall | 0.28% | 1.37% | 1.20% | 100% | 99% |
| Class D | 0.18% | 1.05% | 0.72% | 99% | 95% |

FIG. 31

|  | All Intra Main10 | | | | |
|---|---|---|---|---|---|
|  | Over VTM-2.0.1 | | | | |
|  | Y | U | V | EncT | DecT |
| Class A1 | 0.07% | 0.11% | 0.00% | 99% | 98% |
| Class A2 | 0.08% | 0.37% | 0.10% | 98% | 99% |
| Class B | 0.03% | 0.03% | 0.01% | 96% | 94% |
| Class C | 0.02% | 0.07% | 0.14% | 96% | 93% |
| Class E | 0.02% | 0.10% | 0.09% | 97% | 91% |
| Overall | 0.04% | 0.12% | 0.07% | 97% | 95% |
| Class D | 0.02% | 0.27% | -0.09% | 97% | 92% |

FIG. 32

|  | All Intra Main10 | | | | |
|---|---|---|---|---|---|
|  | Over VTM-2.0.1 | | | | |
|  | Y | U | V | EncT | DecT |
| Class A1 | 0.00% | -0.22% | -0.14% | 98% | 98% |
| Class A2 | 0.01% | 0.18% | -0.05% | 98% | 98% |
| Class B | 0.00% | -0.04% | -0.06% | 97% | 94% |
| Class C | -0.01% | 0.02% | 0.00% | 95% | 92% |
| Class E | -0.02% | 0.00% | -0.17% | 97% | 95% |
| Overall | 0.00% | -0.01% | -0.08% | 97% | 95% |
| Class D | 0.01% | 0.02% | -0.10% | 97% | 92% |

FIG. 33

|  | All Intra Main10 | | | | |
|---|---|---|---|---|---|
|  | Over VTM-2.0.1 | | | | |
|  | Y | U | V | EncT | DecT |
| Class A1 | -0.04% | -0.22% | -0.16% | 99% | 98% |
| Class A2 | 0.00% | 0.06% | -0.02% | 98% | 97% |
| Class B | -0.01% | -0.02% | -0.09% | 97% | 94% |
| Class C | -0.01% | 0.01% | 0.11% | 97% | 93% |
| Class E | -0.01% | -0.21% | -0.12% | 96% | 90% |
| Overall | -0.01% | -0.07% | -0.05% | 97% | 94% |
| Class D | -0.01% | 0.06% | -0.07% | 98% | 92% |

FIG. 34

| Block size | Number of operations ( multiplication + sums ) | | |
|---|---|---|---|
| | Original CCLM | Proposed method (TH =4) | Proposed method (TH =8) |
| N = 2 | 24 | 24 | 24 |
| N = 4 | 44 | 24 | 24 |
| N = 8 | 84 | 44 | 24 |
| N = 16 | 164 | 44 | 44 |
| N = 32 | 324 | 44 | 44 |

FIG. 35

| slice_header( ) { | Descriptor |
|---|---|
| ... | |
| cclm_reduced_sample_threshold | u(1) |
| ... | |
| | |

FIG. 36

| pic_parameter_set_rbsp( ) { | Descriptor |
|---|---|
| ... | |
| cclm_reduced_sample_threshold | u(1) |
| ... | |
| | |

FIG. 37

| sps_parameter_set_rbsp( ) { | Descriptor |
|---|---|
| ... | |
| cclm_reduced_sample_threshold | u(1) |
| ... | |
| | |

FIG. 38

| cclm_reduced_sample_threshold | TH |
|---|---|
| 0 | 4 |
| 1 | 8 |

FIG. 39

| Block size | Number of operations ( multiplication + sums ) | | | | |
|---|---|---|---|---|---|
| | Original CCLM | Proposed method 1 ($N_{th}$=1,2,4) | Proposed method 2 ($N_{th}$=1,2,4,8) | Proposed method 3 ($N_{th}$=1,2) | Proposed method 4 ($N_{th}$=1,4) |
| N = 2 | 24 | 14 | 14 | 14 | 14 |
| N = 4 | 44 | 24 | 24 | 24 | 44 |
| N = 8 | 84 | 44 | 44 | 24 | 44 |
| N = 16 | 164 | 44 | 84 | 24 | 44 |
| N = 32 | 324 | 44 | 84 | 24 | 44 |

FIG. 40

| slice_header( ) { | Descriptor |
|---|---|
| ... | |
| cclm_reduced_sample_threshold | f(2) |
| ... | |
| | |

FIG. 41

| pic_parameter_set_rbsp( ) { | Descriptor |
|---|---|
| ... | |
| cclm_reduced_sample_threshold | f(2) |
| ... | |
| | |

FIG. 42

| sps_parameter_set_rbsp( ) { | Descriptor |
|---|---|
| ... | |
| cclm_reduced_sample_threshold | f(2) |
| ... | |
| | |

FIG. 43

| cclm_reduced_sample_threshold | Proposed method |
|---|---|
| 0 | 1 ($N_{th}$=1,2,4) |
| 1 | 2 ($N_{th}$=1,2,4,8) |
| 2 | 3 ($N_{th}$=1,2) |
| 3 | 4 ($N_{th}$=1,4) |

FIG. 44

| Block size | Number of operations ( multiplication + sums ) | | | |
|---|---|---|---|---|
| | Original CCLM | Proposed method 1 ($N_{th}$=1,2,4) | Proposed method 2 ($N_{th}$=1,2,2,4) | Proposed method 2 ($N_{th}$=1,2,4,8) |
| 2 x 2 | 24 | 14 | 14 | 14 |
| N = 2 | 24 | 24 | 24 | 24 |
| N = 4 | 44 | 44 | 24 | 44 |
| N = 8 | 84 | 44 | 44 | 84 |
| N = 16 | 164 | 44 | 44 | 84 |
| N = 32 | 324 | 44 | 44 | 84 |

FIG. 45

| slice_header( ) { | Descriptor |
|---|---|
| ... | |
| cclm_reduced_sample_threshold | f(2) |
| ... | |
| | |

FIG. 46

| pic_parameter_set_rbsp( ) { | Descriptor |
|---|---|
| ... | |
| cclm_reduced_sample_threshold | f(2) |
| ... | |
| | |

FIG. 47

| sps_parameter_set_rbsp( ) { | Descriptor |
|---|---|
| ... | |
| cclm_reduced_sample_threshold | f(2) |
| ... | |
| | |

FIG. 48

| cclm_reduced_sample_threshold | Proposed method |
|---|---|
| 0 | Not apply |
| 1 | 1 ($N_{th}$=1,2,4) |
| 2 | 2 ($N_{th}$=1,2,2,4) |
| 3 | 3 ($N_{th}$=1,2,4,8) |

FIG. 49

| Chroma block size | (subsample_num_width, subsample_num_height) |
|---|---|
| 2x2, 2xN, Nx2 (N>2) | (2,2) |
| 4x4, 4xN, Nx4 (N>4) | (4,4) |
| 8x8, 8xN, Nx8 (N>8) | (8,8) |
| 16x16, 16xN, Nx16 (N>16) | (16,16) |
| 32x32, 32xN, Nx32 (N>32) | (32,32) |
| 64x64 | (64,64) |

FIG. 50 subsample_num_width = min(width,height) if $N_{th}$ >= width subsample_num_width = min($N_{th}$, height) if $N_{th}$ < width subsample_num_height = min(width,height) if $N_{th}$ >= height subsample_num_height = min($N_{th}$, width) if $N_{th}$ < height

FIG. 51

| Chroma block size | (subsample_num_width, subsample_num_height) |
|---|---|
| 2x2, 2x4, 2x8, 2x16, 2x32 | (2,2), (2,2), (2,6), (2,14), (2,30) |
| 4x2, 8x2, 16x2, 32x2 | (2,2), (6,2), (14,2), (30,2) |
| 4x4, 4x8, 4x16, 4x32 | (4,4), (4,4), (4,12), (4,28) |
| 8x4, 16x4, 32x4 | (4,4), (12,4), (28,4) |
| 8x8, 8x16, 8x32 | (8,8), (8,8), (8,24) |
| 16x8, 32x8 | (8,8), (24,8) |
| 16x16, 16x32 | (16,16), (16,16) |
| 32x16 | (16,16) |
| 32x32 | (32,32) |

FIG. 52

| Chroma block size | (subsample_num_width, subsample_num_height) |
|---|---|
| 2x2, 2x4, 2x8, 2x16, 2x32 | (2,2), (2,2), (2,6), (2,6), (2,6) |
| 4x2, 8x2, 16x2, 32x2 | (2,2), (6,2), (6,2), (6,2) |
| 4x4, 4x8, 4x16, 4x32 | (4,4), (4,4), (2,6), (2,6) |
| 8x4, 16x4, 32x4 | (4,4), (6,2), (6,2) |
| 8x8, 8x16, 8x32 | (4,4), (4,4), (2,6) |
| 16x8, 32x8 | (4,4), (6,2) |
| 16x16, 16x32 | (4,4), (4,4) |
| 32x16 | (4,4) |
| 32x32 | (4,4) |

FIG. 53

| slice_header( ) { | Descriptor |
|---|---|
| ... | |
|    cclm_subsample_flag | f(1) |
| ... | |
| } | |

FIG. 54

| pic_parameter_set_rbsp( ) { | Descriptor |
|---|---|
| ... | |
|    cclm_subsample_flag | f(1) |
| ... | |
| } | |

FIG. 55

| sps_parameter_set_rbsp( ) { | Descriptor |
|---|---|
| ... | |
|    cclm_subsample_flag | f(1) |
| ... | |
| } | |

FIG. 56

| cclm_subsample_flag | Proposed method |
|---|---|
| 0 | Not apply (Use Equation 5) |
| 1 | Apply (Use Equation 6) |

METHOD AND DEVICE FOR IMAGE DECODING ON BASIS OF CCLM PREDICTION IN IMAGE CODING SYSTEM

CROSS REFERENCE TO RELATED APPLICATIONS

This application is a Continuation Application of U.S. patent application Ser. No. 17/667,957, filed Feb. 9, 2022, which is a Continuation Application of U.S. patent application Ser. No. 17/276,438 filed Mar. 15, 2021 (now patented), which is a National Stage Application of International Application No. PCT/KR2019/012195 filed on Sep. 20, 2019, which claims the benefit of U.S. Provisional Application No. 62/737,885, filed on Sep. 27, 2018, and 62/734,239, filed Sep. 20, 2019, the contents of which are all hereby incorporated by reference herein in their entirety.

BACKGROUND OF THE DISCLOSURE

Field of the Disclosure

The present document relates generally to an image coding technology and, more particularly, to an image decoding method based on intra prediction according to CCLM in an image coding system, and an apparatus therefor.

Related Art

Recently, demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and device for improving image coding efficiency.

The present disclosure also provides a method and device for improving intra-prediction efficiency.

The present disclosure also provides a method and device for improving intra-prediction efficiency based on Cross Component Linear Model (CCLM).

Still another technical objective of this document is to provide an efficient encoding and decoding method for CCLM prediction, and an apparatus for performing the encoding and decoding method.

Still another technical objective of this document is to provide a method and apparatus for selecting a neighboring sample for deriving a linear model parameter for CCLM.

According to an embodiment of the present document, an image decoding method which is performed by a decoding apparatus is provided. The method includes deriving a cross-component linear model (CCLM) mode as an intra prediction mode of a current chroma block, deriving a specific value for the current chroma block, comparing a width and a height of the current chroma block with the specific value, based on the width and the height being greater than or equal to the specific value, deriving top neighboring chroma samples whose number is equal to the specific value of the current chroma block, and left neighboring chroma samples whose number is equal to the specific value, deriving down-sampled neighboring luma samples and down-sampled luma samples of a current luma block, wherein the down-sampled neighboring luma samples correspond to the top neighboring chroma samples and the left neighboring chroma samples, deriving CCLM parameters based on the top neighboring chroma samples, the left neighboring chroma samples, and the down-sampled neighboring luma samples, deriving prediction samples for the current chroma block based on the CCLM parameters and the down-sampled luma samples, and generating reconstructed samples for the current chroma block based on the prediction samples, wherein the derived specific value is 2.

According to another embodiment of the present document, a decoding apparatus which performs image decoding is provided. The decoding apparatus includes a predictor which derives a cross-component linear model (CCLM) mode as an intra prediction mode of a current chroma block, derives a specific value for the current chroma block, compares a width and a height of the current chroma block with the specific value, derives, based on the width and the height being greater than or equal to the specific value, top neighboring chroma samples whose number is equal to the specific value of the current chroma block, and left neighboring chroma samples whose number is equal to the specific value, derives down-sampled neighboring luma samples and down-sampled luma samples of the current luma block, the neighboring luma samples corresponding to the top neighboring chroma samples and the left neighboring chroma samples, derives CCLM parameters based on the top neighboring chroma samples, the left neighboring chroma samples, and the down-sampled neighboring luma samples, and derives prediction samples for the current chroma block based on the CCLM parameters and the down-sampled luma samples; and an adder which generates reconstructed samples for the current chroma block based on the prediction samples, wherein the derived specific value is 2.

According to still another embodiment of the present document, a video encoding method which is performed by an encoding apparatus is provided. The method includes determining a cross-component linear model (CCLM) mode as an intra prediction mode of a current chroma block, deriving a specific value for the current chroma block, comparing a width and a height of the current chroma block with the specific value, based on the width and the height being greater than or equal to the specific value, deriving top neighboring chroma samples whose number is equal to the specific value of the current chroma block, and left neighboring chroma samples whose number is equal to the specific value, deriving down-sampled neighboring luma samples and down-sampled luma samples of a current luma block, wherein the down-sampled neighboring luma samples correspond to the top neighboring chroma samples and the left neighboring chroma samples, deriving CCLM parameters based on the top neighboring chroma samples, the left neighboring chroma samples, and the down-sampled neighboring luma samples, deriving prediction samples for the current chroma block based on the CCLM parameters and the down-sampled luma samples, and encoding image information including prediction related information for the current chroma block, wherein the derived specific value is 2.

According to still another embodiment of the present document, a video encoding apparatus is provided. The encoding apparatus includes a predictor which determines a cross-component linear model (CCLM) mode as an intra prediction mode of a current chroma block, derives a specific value for the current chroma block, compares a width and a height of the current chroma block with the specific value, derives, based on the width and the height being greater than or equal to the specific value, top neighboring chroma samples whose number is equal to the specific value of the current chroma block, and left neighboring chroma samples whose number is equal to the specific value, derives down-sampled neighboring luma samples and down-sampled luma samples of the current luma block, the neighboring luma samples corresponding to the top neighboring chroma samples and the left neighboring chroma samples, derives CCLM parameters based on the top neighboring chroma samples, the left neighboring chroma samples, and the down-sampled neighboring luma samples, and derives prediction samples for the current chroma block based on the CCLM parameters and the down-sampled luma samples; and an entropy encoder which encodes image information including prediction related information of the current chroma block, wherein the derived specific value is 2.

According to the present disclosure, overall image/video compression efficiency can be improved.

According to the present disclosure, the efficiency of intra-prediction can be improved.

According to the present disclosure, the image coding efficiency can be improved by performing an intra-prediction based on CCLM.

According to this document, it is possible to increase the efficiency of intra prediction based on the CCLM.

According to this document, the complexity of intra prediction can be reduced by limiting the number of neighboring samples selected to derive a linear model parameter for the CCLM to a specific number.

BRIEF DESCRIPTION OF THE DRAWINGS

FIGS. 13a and 13b are diagrams for describing a procedure of performing CCLM prediction based on the CCLM parameters of the current chroma block derived according to method 1 of the present embodiment described above.

FIG. 24 schematically shows the number of operations required to derive CCLM parameters $\alpha$ and $\beta$.

FIG. 25 schematically shows the number of operations required to derive CCLM parameters based on block size.

FIG. 26 schematically shows signaling of syntax element cclm_reduced_sample_num in slice header according to an embodiment.

FIG. 27 schematically shows signaling of syntax element cclm_reduced_sample_num in PPS according to an embodiment.

FIG. 28 schematically shows signaling of syntax element cclm_reduced_sample_num in SPS according to an embodiment.

FIG. 29 schematically shows derivation of Nth based on cclm_reduced_sample_num.

FIG. 30 schematically shows the experimental result data when the Nth is 2.

FIG. 31 schematically shows the experimental result data when the Nth is 4.

FIG. 32 schematically shows the experimental result data when the Nth is 8.

FIG. 33 schematically shows the experimental result data when the Nth is 16.

FIG. 34 schematically shows the number of operations required to derive CCLM parameters according to the previous CCLM reference sample selection method and according to embodiment of the present document.

FIG. 35 schematically shows signaling of syntax element cclm_reduced_sample_threshold in slice header according to an embodiment.

FIG. 36 schematically shows signaling of syntax element cclm_reduced_sample_threshold in PPS according to an embodiment.

FIG. 37 schematically shows signaling of syntax element cclm_reduced_sample_threshold in SPS according to an embodiment.

FIG. 38 schematically shows derivation of TH based on cclm_reduced_sample_threshold.

FIG. 39 schematically shows the number of operations required to derive CCLM parameters based on chroma block size according to an embodiment.

FIG. 40 schematically shows signaling of syntax element cclm_reduced_sample_threshold in slice header according to an embodiment.

FIG. 41 schematically shows signaling of syntax element cclm_reduced_sample_threshold in PPS according to an embodiment.

FIG. 42 schematically shows signaling of syntax element cclm_reduced_sample_threshold in SPS according to an embodiment.

FIG. 43 schematically shows selection of method for calculating CCLM parameters based on cclm_reduced_sample_threshold.

FIG. 44 schematically shows the number of operations required to derive CCLM parameters based on chroma block size according to an embodiment.

FIG. 45 schematically shows signaling of syntax element cclm_reduced_sample_threshold in slice header according to an embodiment.

FIG. 46 schematically shows signaling of syntax element cclm_reduced_sample_threshold in PPS according to an embodiment.

FIG. 47 schematically shows signaling of syntax element cclm_reduced_sample_threshold in SPS according to an embodiment.

FIG. 48 schematically shows selection of method for calculating CCLM parameters based on cclm_reduced_sample_threshold.

FIG. 49 schematically shows derivation of the subsample_num_width and the subsample_num_height based on chroma block size.

FIG. 50 schematically shows derivation of the subsample_num_width and the subsample_num_height based on Nth.

FIG. 51 schematically shows LUT(look-up table) for deriving of the subsample_num_width and the subsample_num_height based on chroma block size according to an embodiment.

FIG. 52 schematically shows LUT(look-up table) for deriving of the subsample_num_width and the subsample_num_height based on chroma block size according to an embodiment.

FIG. 53 schematically shows signaling of syntax element cclm_subsample_flag in slice header according to an embodiment.

FIG. 54 schematically shows signaling of syntax element cclm_subsample_flag in PPS according to an embodiment.

FIG. 55 schematically shows signaling of syntax element cclm_subsample_flag in SPS according to an embodiment.

FIG. 56 schematically shows selection of proposed method based on cclm_subsample_flag.

DESCRIPTION OF EXEMPLARY EMBODIMENTS

Figure 1:
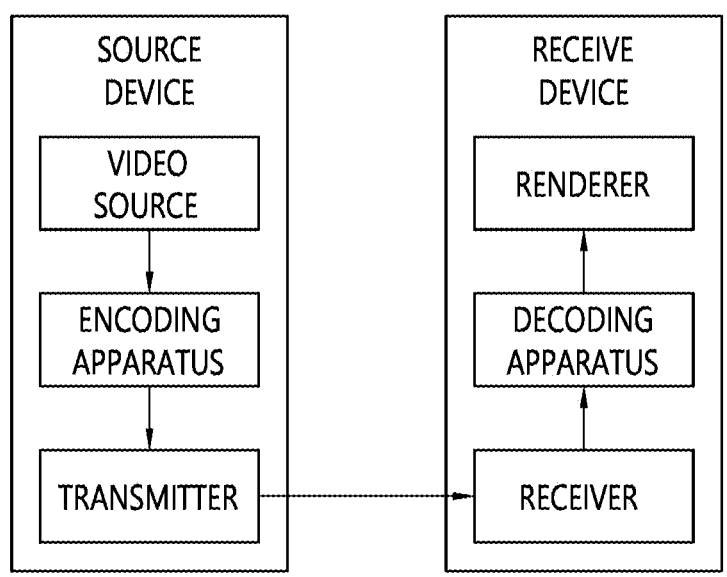
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/"and"," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
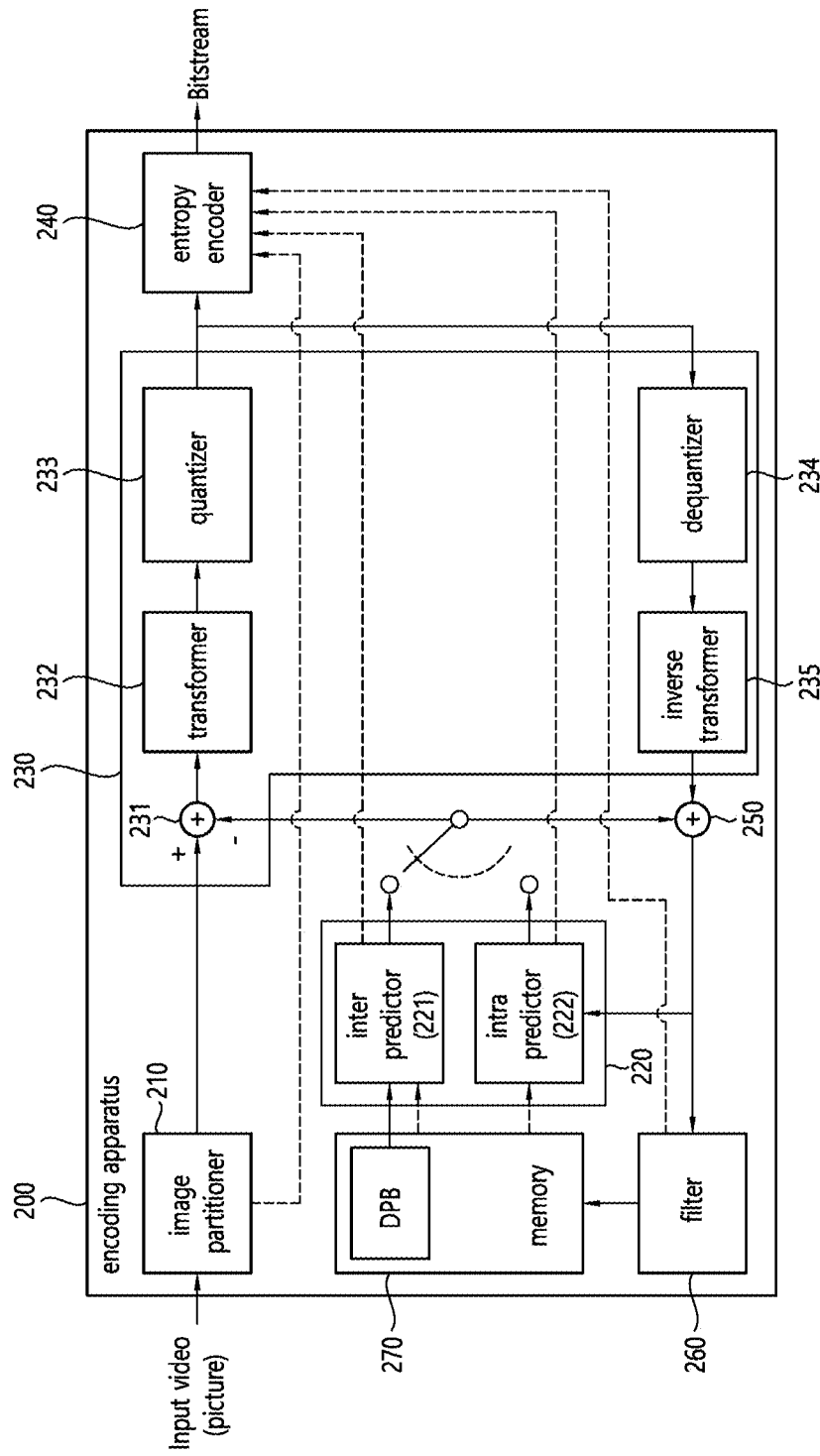
FIG. 2 is a schematic diagram illustrating a configuration of a video/image encoding apparatus to which the embodiment(s) of the present document may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, B1 prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (step, SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (step, SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
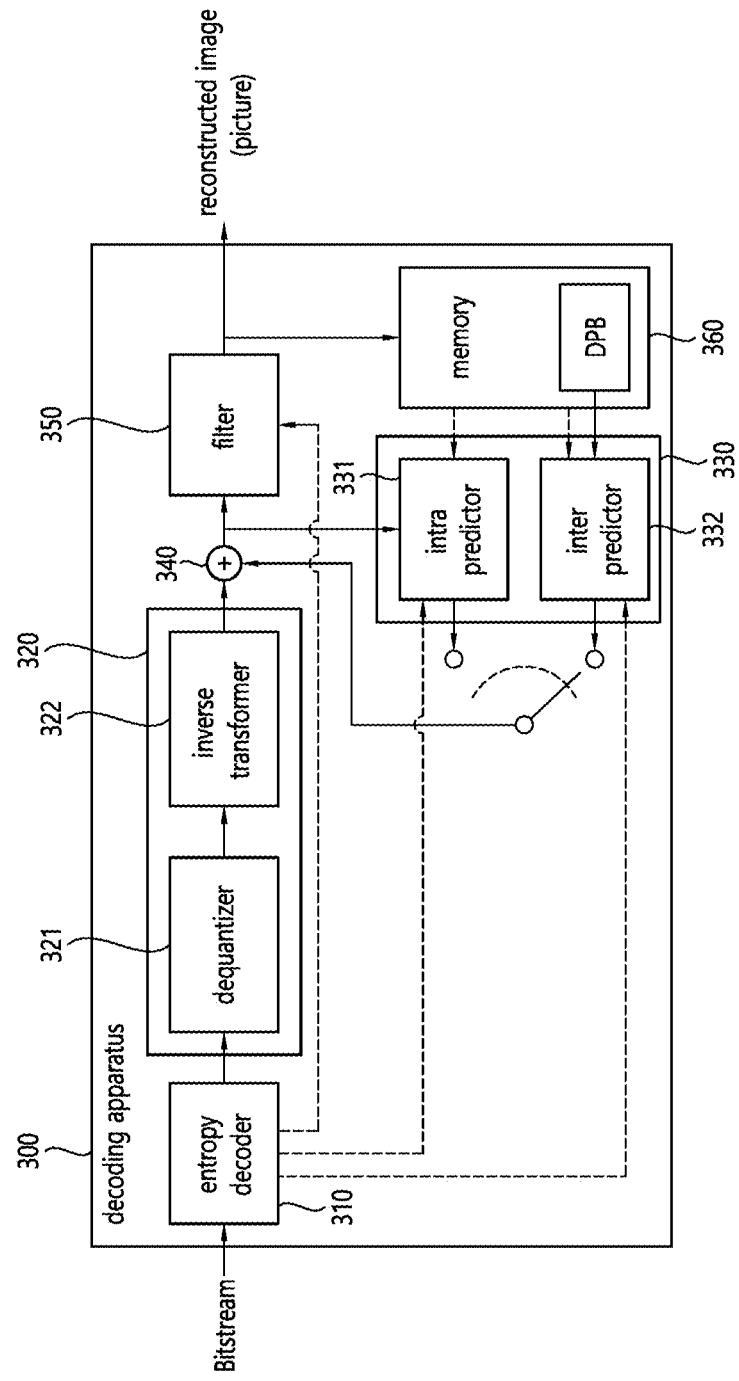
FIG. 3 is a schematic diagram illustrating a configuration of a video/image decoding apparatus to which the embodiment(s) of the present document may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (step, SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (step, SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, B1 prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, as described above, in performing video coding, a prediction is performed to enhance compression efficiency. Accordingly, a prediction block including prediction samples for a current block, that is, a coding target block, may be generated. In this case, the predicted block includes prediction samples in a spatial domain (or pixel domain). The prediction block is identically derived in the encoding apparatus and the decoding apparatus. The encoding apparatus may improve image coding efficiency by signaling residual information on a residual between an original block and the predicted block not an original sample value of the original block itself to the decoding apparatus. The decoding apparatus may derive a residual block including residual samples based on the residual information, may generate a reconstructed block including reconstructed samples by adding up the residual block and the prediction block, and may generate a reconstructed picture including the reconstructed block.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bit stream). in this case, the residual information may include information, such as value information, location information, a transform scheme, a transform kernel and a quantization parameter of the quantized transform coefficients. The decoding apparatus may perform a dequantization/inverse transform procedure based on the residual information and may derive the residual samples (or residual block). The decoding apparatus may generate the reconstructed picture based on the prediction block and the residual block. The encoding apparatus may also derive the residual block by performing a dequantization/inverse transform on the quantized transform coefficients for the reference of inter prediction of a subsequent picture and may generate the reconstructed picture based on the residual block.

Figure 4:
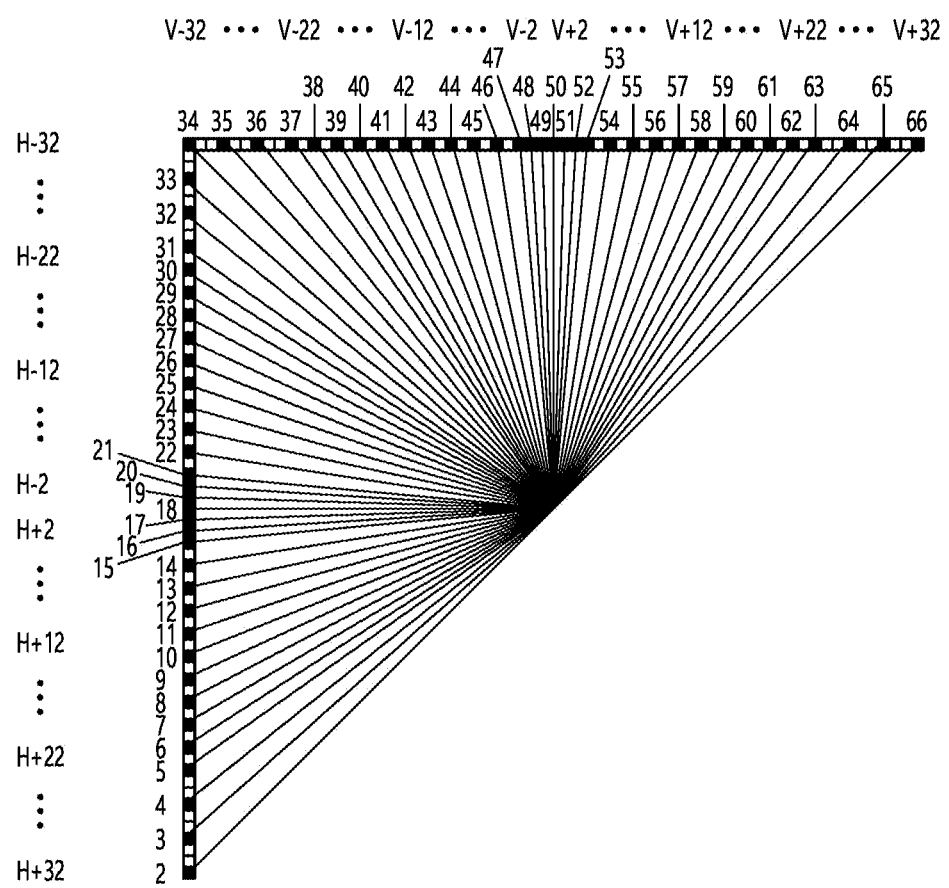
FIG. 4 illustrates intra-directional modes of 65 prediction directions.

FIG. 4 illustrates intra-directional modes of 65 prediction directions.

Referring to FIG. 4, intra-prediction modes having horizontal directionality and intra-prediction modes having vertical directionality may be classified based on an intra-prediction mode #34 having an upper left diagonal prediction direction. H and V in FIG. 3 represent the horizontal directionality and the vertical directionality, respectively, and the numbers from −32 to 32 represent displacements of 1/32 unit on sample grid positions. Intra-prediction modes #2 to #33 have the horizontal directionality and intra-prediction modes #34 to #66 have the vertical directionality. Intra-prediction mode #18 and intra-prediction mode #50 represent a horizontal intra-prediction mode and a vertical intra-prediction mode, respectively. Intra-prediction modes #2 may be called a lower left diagonal intra-prediction mode, intra-prediction mode #34 may be called an upper left diagonal intra-prediction mode and intra-prediction mode #66 may be called an upper right diagonal intra-prediction mode.

Figure 5:
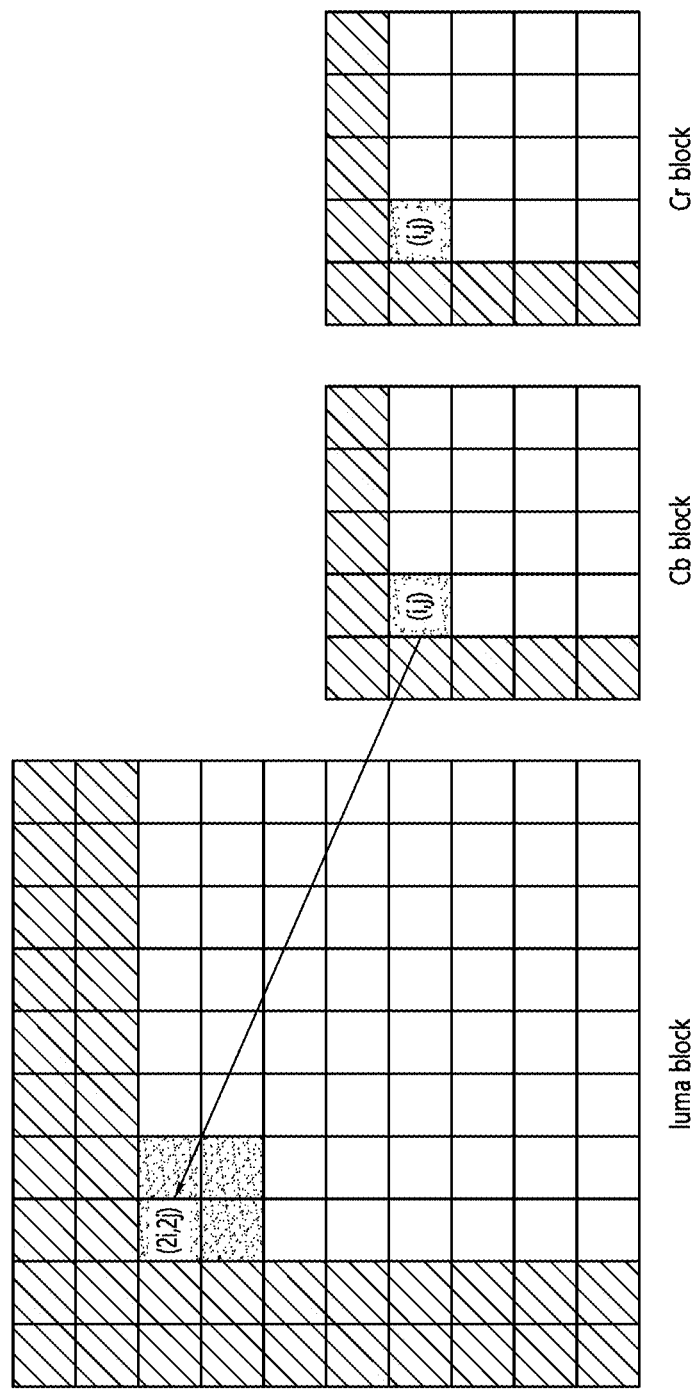
FIG. 5 is a diagram for describing a process of deriving an intra-prediction mode of a current chroma block according to an embodiment.

FIG. 5 is a diagram for describing a process of deriving an intra-prediction mode of a current chroma block according to an embodiment.

In the present disclosure, "chroma block", "chroma image", and the like may represent the same meaning of chrominance block, chrominance image, and the like, and accordingly, chroma and chrominance may be commonly used. Likewise, "luma block", "luma image", and the like may represent the same meaning of luminance block, luminance image, and the like, and accordingly, luma and luminance may be commonly used.

In the present disclosure, a "current chroma block" may mean a chroma component block of a current block, which is a current coding unit, and a "current luma block" may mean a luma component block of a current block, which is a current coding unit. Accordingly, the current luma block and the current chroma block correspond with each other. However, block formats and block numbers of the current luma block and the current chroma block are not always the same but may be different depending on a case. In some cases, the current chroma block may correspond to the current luma region, and in this case, the current luma region may include at least one luma block.

In the present disclosure, "reference sample template" may mean a set of reference samples neighboring a current chroma block for predicting the current chroma block. The reference sample template may be predefined, or information for the reference sample template may be signaled to the decoding apparatus 300 from the encoding apparatus 200.

Referring to FIG. 5, a set of samples one shaded line neighboring 4×4 block, which is a current chroma block, represents a reference sample template. It is shown in FIG. 5 that the reference sample template includes a reference sample of one line, but the reference sample region in a luma region corresponding to the reference sample template includes two lines.

In an embodiment, when an intra encoding of a chroma image is performed in Joint Exploration TEST Model (JEM) used in Joint Video Exploration Team (JVET), Cross Component Linear Model (CCLM) may be used. CCLM is a method of predicting a pixel value of a chroma image based on a pixel value of a reconstructed luma image, which is based on the property of high correlation between a chroma image and a luma image.

CCLM prediction of Cb and Cr chroma images may be based on the equation below.

$$\text{Pred}_C(i,j) = \alpha \cdot \text{Rec}'_L(i,j) + \beta \quad \text{[Equation 1]}$$

Herein, $\text{pred}_c$ (i, j) means Cb or Cr chroma image to be predicted, $\text{Rec}_L'(i, j)$ means a luma image to be reconstructed which is adjusted to a chroma block size and (i, j) means a coordinate of a pixel. In 4:2:0 color format, since a size of luma image is double of that of a chroma image, $\text{Rec}_L'$ of a chroma block size should be generated through down-sampling, and accordingly, a pixel of luma image to be used in chroma image $\text{pred}_c$ (i, j) may also use neighboring pixels in addition to $\text{Rec}_L(2i, 2j)$. The $\text{pred}_c$ (i, j) may be represented as a down-sampled luma sample.

For example, the $\text{pred}_c$ (i, j) may be derived by using 6 neighboring pixels as represented in the equation below.

$$\text{Rec}'_L(x,y)=(2\times\text{Rec}_L(2x,2y)+2\times\text{Rec}_L(2x,2y+1)+\text{Rec}_L(2x-1,2y)+\text{Rec}_L(2x+1,2y)+\text{Rec}_L(2x-1,2y+1)) \quad \text{[Equation 2]}$$

In addition, as shown in the shaded area of FIG. 3, α and β represent a cross-correlation and a difference of average values between Cb or Cr chroma block neighboring template and luma block neighboring template, and α and β are represented as Equation 3 below.

$$\alpha = \frac{M(t_L(i,j) - M(t_L)) \times M(t_C(i,j) - M(t_C))}{M(t_L(i,j) - M(t_L)) \times M(t_L(i,j) - M(t_L))}, \quad \text{[Equation 3]}$$

$$\beta = M(t_c) - \alpha M(t_L)$$

Here, $t_L$ means a neighboring reference sample of a luma block corresponding to a current chroma image, $t_C$ means neighboring reference sample of a current chroma block to which encoding is applied currently, and (i, j) means a position of a pixel. In addition, M(A) means an average of A pixels.

Meanwhile, samples for parameter calculation (i.e., for example, α and β) for CCLM prediction described above may be selected as below.

In the case that a current chroma block is a chroma block of N×N size, total 2N (N horizontal and N vertical) neighboring reference sample pairs (luma and chroma) of the current chroma block may be selected.

In the case that a current chroma block is a chroma block of N×M size or M×N size (herein, N<=M), total 2N (N horizontal and N vertical) neighboring reference sample pairs of the current chroma block may be selected. Meanwhile, since M is greater than N (e.g., M=2N or 3N, etc.), among M samples, N sample pairs may be selected through subsampling.

Figure 6:
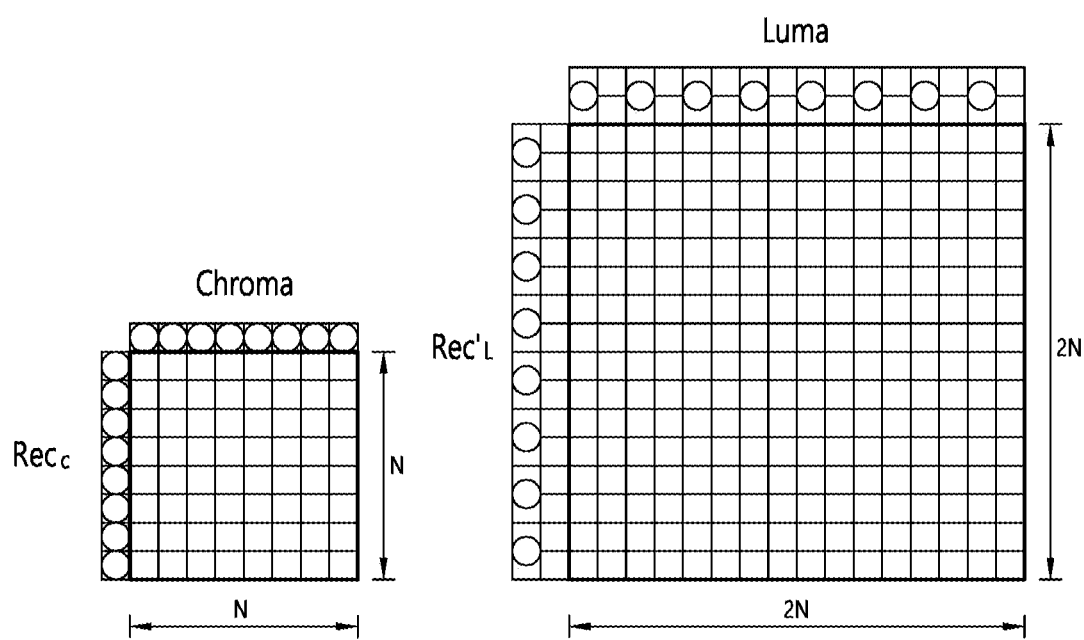
FIG. 6 illustrates 2N reference samples for parameter calculation for CCLM prediction described above.

FIG. 6 illustrates 2N reference samples for parameter calculation for CCLM prediction described above. Referring to FIG. 6, 2N reference sample pairs are shown, which is derived for parameter calculation for the CCLM prediction. The 2N reference sample pairs may include 2N reference samples adjacent to the current chroma block and 2N reference samples adjacent to the current luma block.

As described above, 2N sample pairs may be derived, and in the case that CCLM parameters α and β are calculated using Equation 3 using the sample pair described above, the operation of numbers as represented in Figure below may be required.

FIG. 24 schematically shows the number of operations required to derive CCLM parameters α and β.

Referring to FIG. 24 above, for example, in the case of a chroma block of 4×4 size, 13 multiplication operations and 15 addition operations may be required for calculating CCLM parameter, and in the case of a chroma block of 32×32 size, 69 multiplication operations and 127 addition operations may be required for calculating CCLM parameter. That is, as the size of the chroma block increases, an amount of operation required for calculating CCLM parameter increases rapidly, which may be directly connected to a delay problem in hardware implementation. Particularly, since the CCLM parameter should be derived through calculation eve in the decoding apparatus, the amount of operation may be connected to a delay problem in hardware implementation of the decoding apparatus and increase of implementation cost.

Therefore, the present embodiment may reduce operation complexity for deriving CCLM parameters, and through this, may reduce hardware cost and complexity and time of decoding procedure.

As an example, in order to solve the problem of increase of CCLM parameter operation amount as the chroma block size increase described above, an embodiment may be proposed for calculating a CCLM parameter by selecting a chroma block neighboring pixel, after configuring a neighboring sample selection upper limit $N_{th}$ as described below. The $N_{th}$ may also be represented as a maximum neighboring sample number. For example, $N_{th}$ may be set as 2, 4, 8 or 16.

The CCLM parameter calculation procedure according to the present embodiment may be as below.

In the case that a current chroma block is a chroma block of N×N size and $N_{th}$>=N, total 2N (N horizontal and N vertical) neighboring reference sample pairs of the current chroma block may be selected.

In the case that a current chroma block is a chroma block of N×N size and $N_{th}$<N, total $2*N_{th}$ ($2*N_{th}$ horizontal and $2*N_{th}$ vertical) neighboring reference sample pairs of the current chroma block may be selected.

In the case that a current chroma block is a chroma block of N×M size or M×N size (herein, N<=M) and $N_{th}$>=N, total 2N (N horizontal and N vertical) neighboring reference sample pairs of the current chroma block may be selected. Since M is greater than N (e.g., M=2N or 3N, etc.), among M samples, N sample pairs may be selected through subsampling.

In the case that a current chroma block is a chroma block of N×M size or M×N size (herein, N<=M) and $N_{th}$<N, total $2*N_{th}$ ($2*N_{th}$ horizontal and $2*N_{th}$ vertical) neighboring reference sample pairs of the current chroma block may be selected. Since M is greater than N (e.g., M=2N or 3N, etc.), among M samples, $N_{th}$ sample pairs may be selected through subsampling.

As described above, according to the present embodiment, a neighboring reference sample number for CCLM parameter calculation may be limited by setting $N_{th}$ which is a maximum number of selected neighboring sample numbers, and through this, a CCLM parameter may be calculated through relatively less calculations even in a chroma block of big size.

In addition, in the case of setting $N_{th}$ as relatively small number (e.g., 4 or 8), in hardware implementation of CCLM parameter calculation, a worst case operation (e.g., chroma block of 32×32 size) may be avoided, and therefore, a required hardware gate numbers may be reduced in comparison with the worst case, and through this, there is also an effect of reducing hardware implementation cost.

For example, in the case that $N_{th}$ is 2, 4 and 8, an amount of the CCLM parameter calculation for a chroma block size may be represented as the following figure.

FIG. 25 schematically shows the number of operations required to derive CCLM parameters based on block size.

Meanwhile, $N_{th}$ may be derived as a predetermined value in the encoding apparatus and the decoding apparatus without need to transmit additional information representing $N_{th}$. Alternatively, additional information representing $N_{th}$ may be transmitted in a unit of a Coding Unit (CU), a slice, a picture or a sequence, and $N_{th}$ may be derived based on the additional information representing $N_{th}$.

For example, in the case that the additional information representing $N_{th}$ is transmitted in a CU unit, when an intra-prediction mode of a current chroma block is the CCLM mode, as described below, a method may be proposed to parse syntax element cclm_reduced_sample_flag and perform a CCLM parameter calculation procedure. The cclm_reduced_sample_flag may represent a syntax element of CCLM reduced sample flag.

In the case that the cclm_reduced_sample_flag is 0 (false), a CCLM parameter calculation is performed through the existing CCLM neighboring sample selection method.

In the case that the cclm_reduced_sample_flag is 1 (true), $N_{th}$ is set to 2, and a CCLM parameter calculation is performed through the neighboring sample selection method proposed in the present embodiment described above.

Alternatively, in the case that the additional information representing $N_{th}$ is transmitted in a unit of slice, picture or sequence, as described below, $N_{th}$ value may be decoded based on the additional information transmitted through a high level syntax (HLS).

For example, the additional information signaled through a slice header may be represented as the following figure.

FIG. 26 schematically shows signaling of syntax element cclm_reduced_sample_num in slice header according to an embodiment.

cclm_reduced_sample_num may represent a syntax element of the additional information representing $N_{th}$.

Alternatively, for example, the additional information signaled through a Picture Parameter Set (PPS) may be represented as the following figure.

FIG. 27 schematically shows signaling of syntax element cclm_reduced_sample_num in PPS according to an embodiment.

Alternatively, for example, the additional information signaled through a Sequence Parameter Set (step, SPS) may be represented as the following figure.

FIG. 28 schematically shows signaling of syntax element cclm_reduced_sample_num in SPS according to an embodiment.

$N_{th}$ value, which is derived based on the cclm_reduced_sample_num value (i.e., a value derived by decoding cclm_reduced_sample_num) transmitted through the slice header, the PPS or the SPS, may be derived as represented in the following figure.

FIG. 29 schematically shows derivation of $N_{th}$ based on cclm_reduced_sample_num.

For example, referring to FIG. 29, $N_{th}$ may be derived based on the cclm_reduced_sample_num. In the case that the cclm_reduced_sample_num value is 0, $N_{th}$ may be derived as 2, in the case that the cclm_reduced_sample_num value is 1, $N_{th}$ may be derived as 4, in the case that the cclm_reduced_sample_num value is 2, $N_{th}$ may be derived as 8, and in the case that the cclm_reduced_sample_num value is 3, $N_{th}$ may be derived as 16.

Meanwhile, in the case that the additional information representing $N_{th}$ is transmitted in a unit of CU, slice, picture or sequence, the encoding apparatus may determine the $N_{th}$ value as below and transmit the additional information representing $N_{th}$ that represent the $N_{th}$ value.

In the case that the additional information representing $N_{th}$ is transmitted in a unit of CU, when an intra-prediction mode of the current chroma block is CCLM mode, the encoding apparatus may determine a side of good encoding efficiency between two following cases through RDO and transmit information of the determined method to the decoding apparatus.

1) In the case that encoding efficiency is good when a CCLM parameter calculation is performed through the existing CCLM reference sample selection method, cclm_reduced_sample_flag of value 0 (false) is transmitted.

2) In the case that encoding efficiency is good when $N_{th}$ is set to 2 and a CCLM parameter calculation is performed through the CCLM reference sample selection method proposed in the present embodiment, cclm_reduced_sample_flag of value 1 (true) is transmitted.

Alternatively, in the case that the additional information representing $N_{th}$ is transmitted in a unit of slice, picture or sequence, the encoding apparatus may add a high level syntax (HLS) as represented in FIG. 26, FIG. 27 or FIG. 28 described above and transmit the additional information representing $N_t$. The encoding apparatus may configure the $N_{th}$ value by considering a size of input image or in accordance with an encoding target bitrate.

1) For example, in the case that an input image is HD quality or more, the encoding apparatus may set as $N_{th}$=8, and in the case that an input image is HD quality or less, the encoding apparatus may set as $N_{th}$=4.

2) In the case that image encoding of high quality is required, the encoding apparatus may set as $N_{th}$=8, and in the case that image encoding of normal quality is required, the encoding apparatus may set as $N_{th}$=2.

Meanwhile, as represented in FIG. 25 described above, when the method proposed in the present embodiment is used, it is identified that an amount of operation required for the CCLM parameter calculation is not increase even a block size is increased. As an example, in the case that a current chroma block size is 32×32, an amount of operation required for the CCLM parameter calculation may be reduced as 86% through the method proposed in the present embodiment (e.g., it is set: $N_{th}$=4).

The figure below may represent an experiment result data in the case that the $N_{th}$ is 2.

FIG. 30 schematically shows the experimental result data when the $N_{th}$ is 2.

In addition, the figure below may represent an experiment result data in the case that the $N_{th}$ is 4.

FIG. 31 schematically shows the experimental result data when the $N_{th}$ is 4.

In addition, the figure below may represent an experiment result data in the case that the $N_{th}$ is 8.

FIG. 32 schematically shows the experimental result data when the $N_{th}$ is 8.

In addition, the figure below may represent an experiment result data in the case that the $N_{th}$ is 16.

FIG. 33 schematically shows the experimental result data when the $N_{th}$ is 16.

FIG. 30 to FIG. 33 above may represent coding efficiency and operation complexity in the case that the $N_{th}$ is 2, 4, 8 and 16, respectively.

Referring to FIG. 30 to FIG. 33 above, it is identified that encoding efficiency is not significantly changed even in the case of reducing an amount of operation required for the CCLM parameter calculation. For example, referring to FIG. 31, in the case that the $N_{th}$ is set to 4 ($N_{th}$=4), encoding efficiency for each component is Y 0.04%, Cb 0.12% and Cr 0.07%, which identifies that encoding efficiency is not significantly changed in comparison with the case of not setting the $N_{th}$, and encoding and decoding complexity is reduced to 97% and 95%, respectively.

In addition, referring to FIG. 32 and FIG. 33, in the case of reducing an amount of operation required for the CCLM parameter calculation (i.e., $N_{th}$=8 or 16), it is identified that encoding efficiency becomes better, and encoding and decoding complexity is reduced.

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 7A:
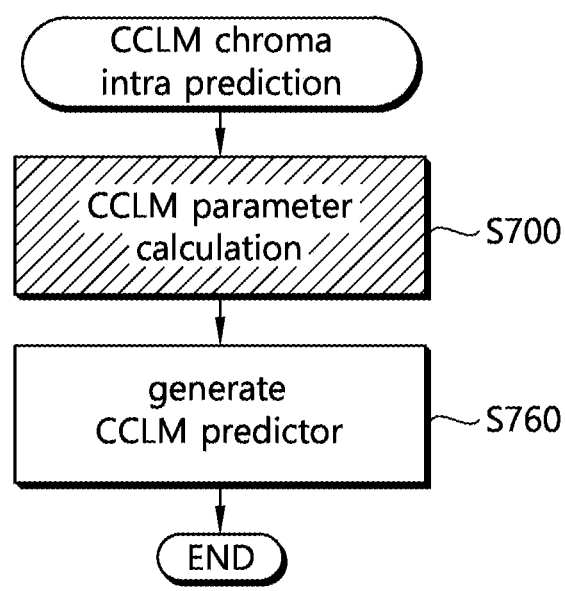
FIGS. 7a and 7b are diagrams for describing a procedure of performing CCLM prediction for a current chroma block according to an embodiment.
Figure 7B:
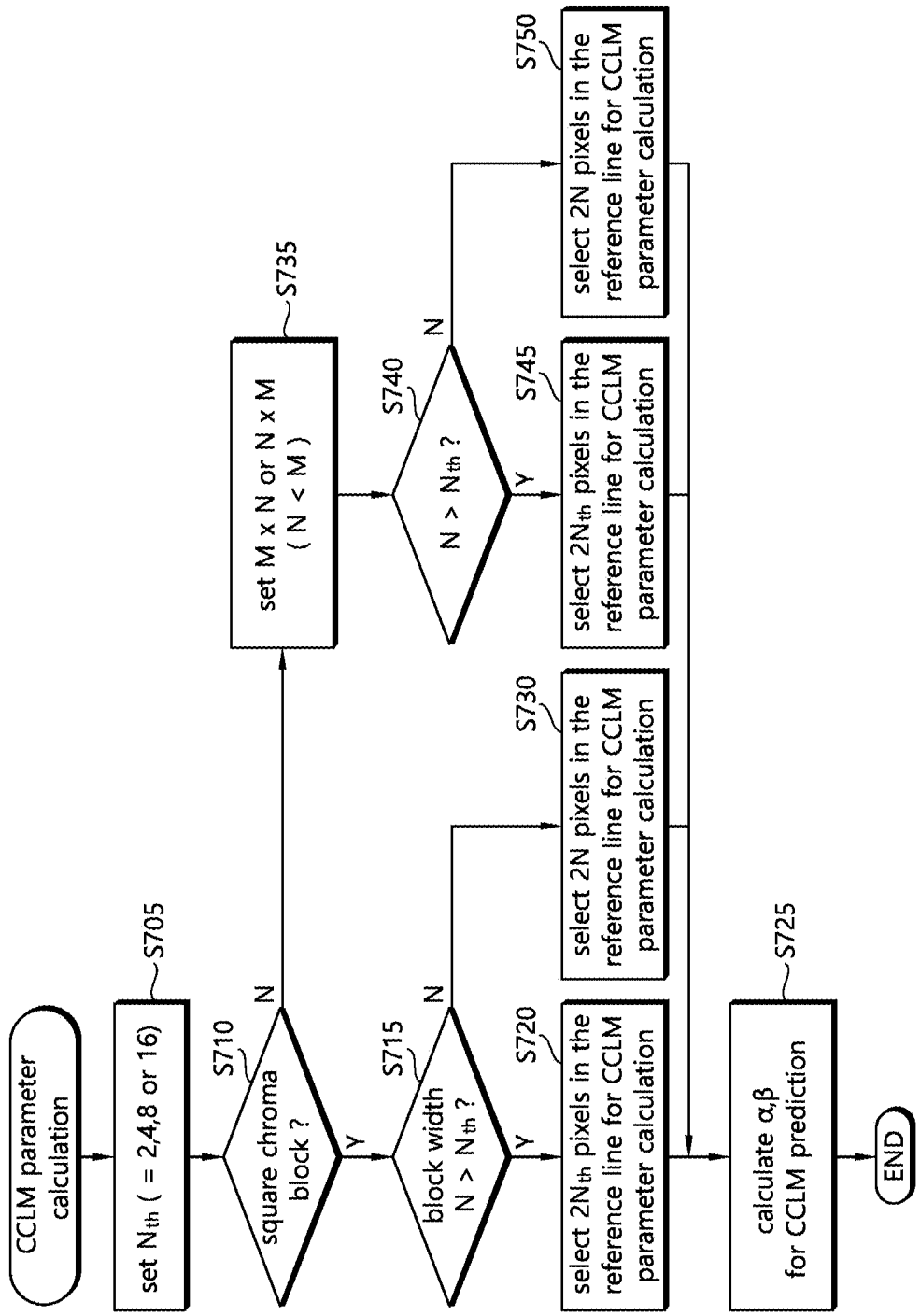

FIGS. 7a and 7b are diagrams for describing a procedure of performing CCLM prediction for a current chroma block according to an embodiment.

Referring to FIG. 7a, the encoding apparatus/decoding apparatus may calculate a CCLM parameter for the current block (step, S700). For example, the CCLM parameter may be calculated as in the embodiment shown in FIG. 7b.

FIG. 7b may illustratively represent a specific embodiment of calculating a CCLM parameter. For example, referring to FIG. 7b, the encoding apparatus/decoding apparatus may set $N_{th}$ for the current chroma block (step, S705). The $N_{th}$ may be a preset value, or may be derived based on additional information on the signaled $N_{th}$. The $N_{th}$ may be set as 2, 4, 8, or 16.

Thereafter, the encoding apparatus/decoding apparatus may determine whether the current chroma block is a square chroma block (step, S710).

When the current chroma block is the square chroma block, the encoding apparatus/decoding apparatus may determine whether the width N of the current block is greater than the $N_{th}$ (step, S715).

When the N is greater than the $N_{th}$, the encoding apparatus/decoding apparatus may select $2N_{th}$ neighboring samples in a reference line adjacent to the current block as a reference sample for calculating the CCLM parameter (step, S720).

The encoding apparatus/decoding apparatus may derive parameters α and β for the CCLM prediction based on the selected reference samples (step, S725).

Additionally, when the N is not greater than the $N_{th}$, the encoding apparatus/decoding apparatus may select 2N neighboring samples in a reference line adjacent to the current block as a reference sample for calculating the CCLM parameter (step, S730). Thereafter, the encoding apparatus/decoding apparatus may derive parameters α and β for the CCLM prediction based on the selected reference samples (step, S725).

Meanwhile, when the current chroma block is not the square chroma block, the size of the current chroma block may be derived as an M×N size or an N×M size (step, S735). Here, the M may represent a value greater than the N (N<M).

Thereafter, the encoding apparatus/decoding apparatus may determine whether the N is greater than the $N_{th}$ (step, S740).

When the N is greater than the $N_{th}$, the encoding apparatus/decoding apparatus may select $2N_{th}$ neighboring samples in a reference line adjacent to the current block as a reference sample for calculating the CCLM parameter (step, S745).

The encoding apparatus/decoding apparatus may derive parameters α and β for the CCLM prediction based on the selected reference samples (step, S725).

Additionally, when the N is not greater than the $N_{th}$, the encoding apparatus/decoding apparatus may select 2N neighboring samples in a reference line adjacent to the current block as a reference sample for calculating the CCLM parameter (step, S750). Thereafter, the encoding apparatus/decoding apparatus may derive parameters α and β for the CCLM prediction based on the selected reference samples (step, S725).

Referring back to FIG. 7a, in the case that the parameters for CCLM prediction for the current chroma block are calculated, the encoding apparatus/decoding apparatus may perform CCLM prediction based on the parameters to generate a prediction sample for the current chroma block (step, S760). For example, the encoding apparatus/decoding apparatus may generate a prediction sample for the current chroma block based on Equation 1 in which the calculated parameters and reconstructed samples of the current luma block for the current chroma block are used.

Meanwhile, in the present disclosure, in deriving the CCLM parameter, an embodiment which is different from the present embodiment of reducing operation complexity for deriving the CCLM parameter may be proposed.

As an example, in order to solve the problem of increase of the CCLM parameter operation amount as the chroma block size increase described above, an embodiment may be proposed for calculating the CCLM parameter by configuring a neighboring sample selection upper limit $N_{th}$ to a block size of the current chroma block adaptively and selecting a neighboring pixel of the current chroma block based on the configured $N_{th}$. The $N_{th}$ may also be represented as a maximum neighboring sample number.

For example, the $N_{th}$ may be configured to a block size of the current chroma block adaptively as below.

In the case that N<=TH in the current chroma block of N×M size (here, for example, N<=M), it is configured: $N_{th}$=2.

In the case that N>TH in the current chroma block of N×M size (here, for example, N<=M), it is configured: $N_{th}$=4.

In this case, for example, depending on a threshold value TH, a reference sample used for calculating the CCLM parameter may be selected as below.

For example, in the case that the TH is 4 (TH=4), and in the case that the N of the current chroma block is 2 or 4, two sample pairs for a block side is used, and the CCLM parameter may be calculated, and in the case that the N is 8, 16 or 32, four sample pairs for a block side is used, and the CCLM parameter may be calculated.

In addition, for example, in the case that the TH is 8 (TH=8), two sample pairs for a block side is used, and the CCLM parameter may be calculated, and in the case that the N is 16 or 32, four sample pairs for a block side is used, and the CCLM parameter may be calculated.

As described above, according to the present embodiment, the $N_{th}$ is configured to a block size of the current chroma block adaptively, a sample number which is optimized for a block size may be selected.

For example, an amount of operation for the CCLM parameter calculation according to the existing CCLM reference sample selection method and the present embodiment may be represented as the following figure.

FIG. 34 schematically shows the number of operations required to derive CCLM parameters according to the previous CCLM reference sample selection method and according to embodiment of the present document.

Here, the N may represent the smallest value of a width and a height of the current block. Referring to FIG. 34 above, in the case that the CCLM reference sample selection method proposed in the present embodiment is used, an amount of operation required for the CCLM parameter calculation is not increased even in the case that a block size is increased.

Meanwhile, the TH may be derived as a predetermined value in the encoding apparatus and the decoding apparatus without need to transmit additional information representing the TH. Alternatively, additional information representing the TH may be transmitted in a unit of Coding Unit (CU), slice, picture or sequence, and the TH may be derived based on the additional information representing the TH. The additional information representing the TH may represent a value of the TH.

For example, in the case that the additional information representing TH is transmitted in a CU unit, when an intra-prediction mode of a current chroma block is the CCLM mode, as described below, a method may be proposed to parse syntax element cclm_reduced_sample_flag and perform a CCLM parameter calculation procedure. The cclm_reduced_sample_flag may represent a syntax element of CCLM reduced sample flag.

In the case that the cclm_reduced_sample_flag is 0 (false), it is configured the $N_{th}$=4 for all blocks, and a CCLM parameter calculation is performed through the neighboring sample selection method of the present embodiment proposed in FIG. 7 described above.

In the case that the cclm_reduced_sample_flag is 1 (true), it is configured the TH=4, and a CCLM parameter calculation is performed through the neighboring sample selection method proposed in the present embodiment described above.

Alternatively, in the case that the additional information representing TH is transmitted in a unit of slice, picture or sequence, as described below, TH value may be decoded based on the additional information transmitted through a high level syntax (HLS).

For example, the additional information signaled through a slice header may be represented as the following figure.

FIG. 35 schematically shows signaling of syntax element cclm_reduced_sample_threshold in slice header according to an embodiment.

cclm_reduced_sample_threshold may represent a syntax element of the additional information representing TH.

Alternatively, for example, the additional information signaled through a Picture Parameter Set (PPS) may be represented as the following figure.

FIG. 36 schematically shows signaling of syntax element cclm_reduced_sample_threshold in PPS according to an embodiment.

Alternatively, for example, the additional information signaled through a Sequence Parameter Set (step, SPS) may be represented as the following figure.

FIG. 37 schematically shows signaling of syntax element cclm_reduced_sample_threshold in SPS according to an embodiment.

TH value, which is derived based on the cclm_reduced_sample_threshold value (i.e., a value derived by decoding cclm_reduced_sample_threshold) transmitted through the slice header, the PPS or the SPS, may be derived as represented in the following figure.

FIG. 38 schematically shows derivation of TH based on cclm_reduced_sample_threshold.

For example, referring to FIG. 38 above, the TH may be derived based on the cclm_reduced_sample_threshold. In the case that the cclm_reduced_sample_threshold value is 0, the TH may be derived as 4, and in the case that the cclm_reduced_sample_threshold value is 1, the TH may be derived as 8.

Meanwhile, in the case that the TH is derived as a predetermined value in the encoding apparatus and the decoding apparatus without transmitting separate additional information, the encoding apparatus may perform the CCLM parameter calculation for the CCLM prediction as the present embodiment described above based on the predetermined TH value.

Alternatively, the encoding apparatus may determine whether to use the threshold value TH and may transmit information representing whether to use the TH and the additional information representing the TH value to the decoding apparatus as below.

In the case that the information representing whether to use the TH is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.

1) In the case that encoding efficiency is good when the $N_{th}$ is set to 4 for all blocks and a CCLM parameter calculation is performed through the reference sample selection method of the present embodiment proposed in FIG. 7 described above, cclm_reduced_sample_flag of value 0 (false) is transmitted.

2) In the case that encoding efficiency is good when the TH is set to 4 and a CCLM parameter calculation is performed through the reference sample selection method of the present embodiment proposed, cclm_reduced_sample_flag of value 1 (true) is transmitted.
3) Alternatively, in the case that the information representing whether to use the TH is transmitted in a unit of slice, picture or sequence, the encoding apparatus may add a high level syntax (HLS) as represented in FIG. 35, FIG. 36 or FIG. 37 described above and transmit the information representing whether to use the TH. The encoding apparatus may configure the use of the TH by considering a size of input image or in accordance with an encoding target bitrate.
1) For example, in the case that an input image is HD quality or more, the encoding apparatus may set as TH=8, and in the case that an input image is HD quality or less, the encoding apparatus may set as TH=4.
2) In the case that image encoding of high quality is required, the encoding apparatus may set as TH=8, and in the case that image encoding of normal quality is required, the encoding apparatus may set as TH=4.

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 8A:
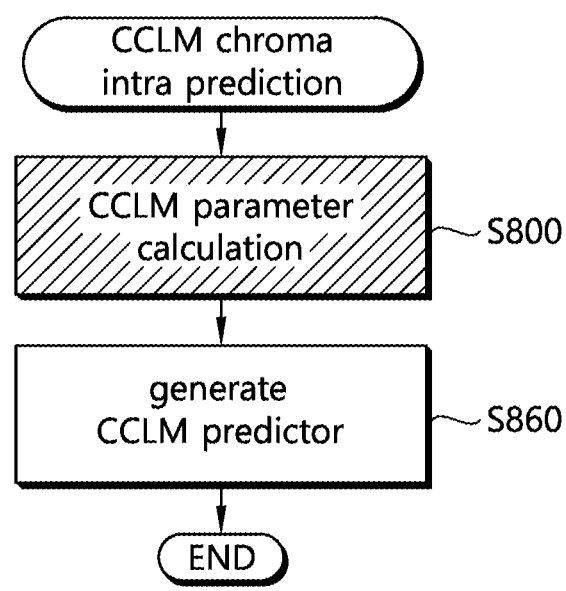
FIGS. 8a and 8b are diagrams for describing a procedure of performing CCLM prediction for a current chroma block according to an embodiment.
Figure 8B:
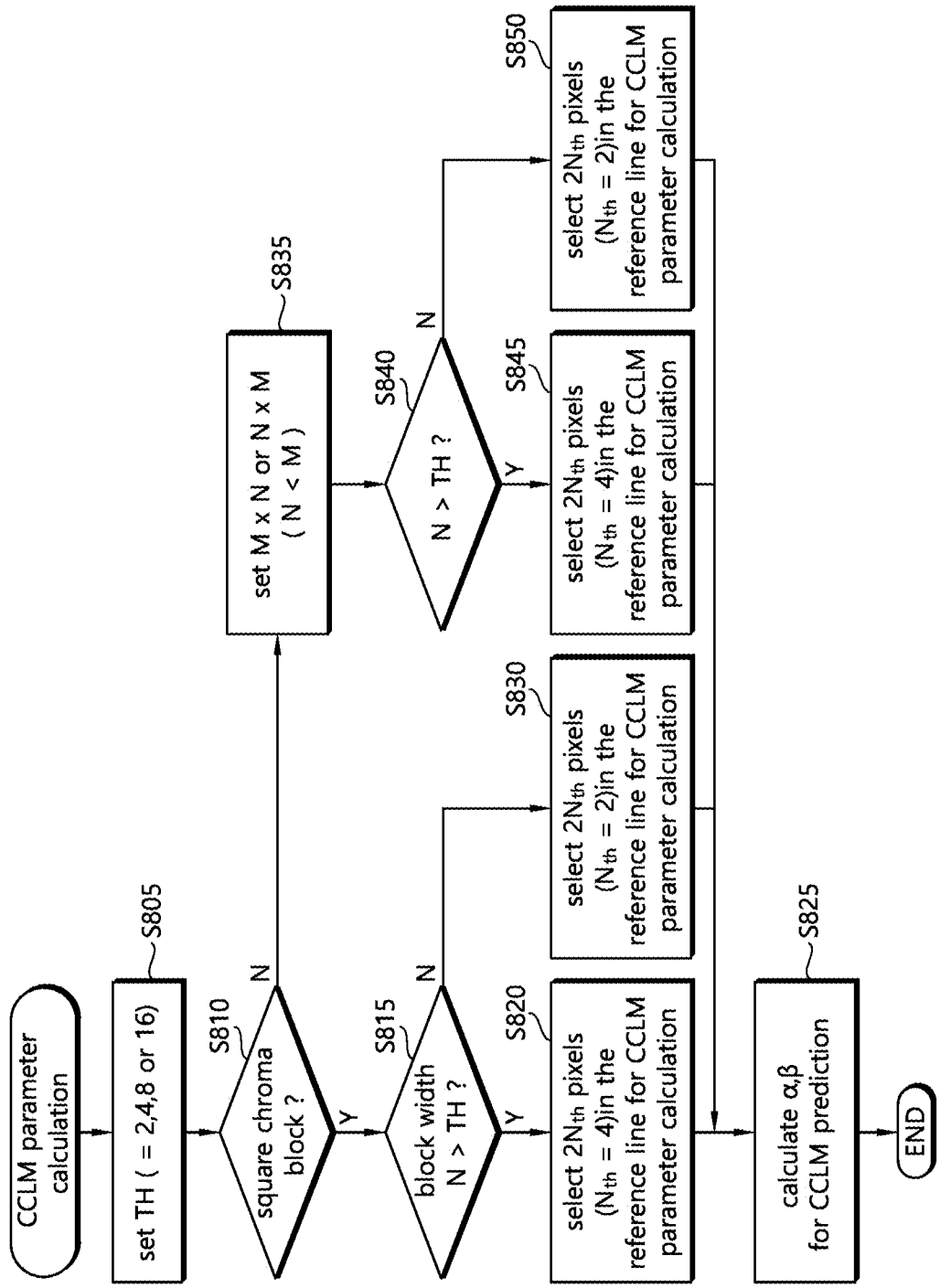

FIGS. 8a and 8b are diagrams for describing a procedure of performing CCLM prediction for a current chroma block according to an embodiment.

Referring to FIG. 8a, the encoding apparatus/decoding apparatus may calculate a CCLM parameter for the current block (step, S800). For example, the CCLM parameter may be calculated as the present embodiment shown in FIG. 8b.

FIG. 8b may illustratively represent a specific embodiment of calculating a CCLM parameter. For example, referring to FIG. 8b, the encoding apparatus/decoding apparatus may set TH for the current chroma block (step, S805). The TH may be a preset value, or may be derived based on additional information on the signaled TH. The TH may be set as 4 or 8.

Thereafter, the encoding apparatus/decoding apparatus may determine whether the current chroma block is a square chroma block (step, S810).

In the case that the current chroma block is the square chroma block, the encoding apparatus/decoding apparatus may determine whether the width N of the current block is greater than the TH (step, S815).

In the case that the N is greater than the TH, the encoding apparatus/decoding apparatus may select $2N_{th}$ neighboring samples in a reference line adjacent to the current block as a reference sample for calculating the CCLM parameter (step, S820). Here, the $N_{th}$ may be 4. That is, in the case that the N is greater than the TH, the $N_{th}$ may be 4.

The encoding apparatus/decoding apparatus may derive parameters α and β for the CCLM prediction based on the selected reference samples (step, S825).

Additionally, in the case that the N is not greater than the TH, the encoding apparatus/decoding apparatus may select $2N_{th}$ neighboring samples in a reference line adjacent to the current block as a reference sample for calculating the CCLM parameter (step, S830). Here, the $N_{th}$ may be 2. That is, in the case that the N is greater than the TH, the $N_{th}$ may be 2. Thereafter, the encoding apparatus/decoding apparatus may derive parameters α and β for the CCLM prediction based on the selected reference samples (step, S825).

Meanwhile, in the case that the current chroma block is not the square chroma block, the size of the current chroma block may be derived as an M×N size or an N×M size (step, S835). Here, the M may represent a value greater than the N (N<M).

Thereafter, the encoding apparatus/decoding apparatus may determine whether the N is greater than the TH (step, S840).

When the N is greater than the TH, the encoding apparatus/decoding apparatus may select $2N_{th}$ neighboring samples in a reference line adjacent to the current block as a reference sample for calculating the CCLM parameter (step, S845). Here, the $N_{th}$ may be 4. That is, in the case that the N is greater than the TH, the $N_{th}$ may be 4.

The encoding apparatus/decoding apparatus may derive parameters α and β for the CCLM prediction based on the selected reference samples (step, S825).

Additionally, in the case that the N is not greater than the TH, the encoding apparatus/decoding apparatus may select $2N_{th}$ neighboring samples in a reference line adjacent to the current block as a reference sample for calculating the CCLM parameter (step, S850). Here, the $N_{th}$ may be 2. That is, in the case that the N is greater than the TH, the $N_{th}$ may be 2. Thereafter, the encoding apparatus/decoding apparatus may derive parameters α and β for the CCLM prediction based on the selected reference samples (step, S825).

Referring back to FIG. 8a, in the case that the parameters for CCLM prediction for the current chroma block are calculated, the encoding apparatus/decoding apparatus may perform CCLM prediction based on the parameters to generate a prediction sample for the current chroma block (step, S860). For example, the encoding apparatus/decoding apparatus may generate a prediction sample for the current chroma block based on Equation 1 in which the calculated parameters and reconstructed samples of the current luma block for the current chroma block are used.

Meanwhile, in the present disclosure, in deriving the CCLM parameter, an embodiment which is different from the present embodiment of reducing operation complexity for deriving the CCLM parameter may be proposed.

Particularly, in order to solve the problem of increase of CCLM parameter operation amount as the chroma block size increase described above, the present embodiment proposes a method of configuring a pixel selection upper limit $N_{th}$ adaptively. In addition, in the case that N=2 (here, N is a smaller value between a width and a height of a chroma block), in order to prevent the worst case operation (a case CCLM prediction is performed for all chroma blocks, after all chroma blocks in a CTU is divided into 2×2 size) occurred in CCLM prediction for a chroma block of 2×2 size, the present embodiment proposes a method of configuring $N_{th}$ adaptively, and through this, an amount of operation for CCLM parameter calculation in the worst cast may be reduced by about 40%.

For example, according to the present embodiment, the $N_{th}$ may be configured to a block size adaptively as below.

Method 1 in the present embodiment (proposed method 1)
In the case that N<=2 in the current chroma block of N×M size or M×N size (here, e.g., N<=M), $N_{th}$ may be set to 1 ($N_{th}$=1).
In the case that N=4 in the current chroma block of N×M size or M×N size (here, e.g., N<=M), $N_{th}$ may be set to 2 ($N_{th}$=2).

In the case that N>4 in the current chroma block of N×M size or M×N size (here, e.g., N<=M), $N_{th}$ may be set to 4 ($N_{th}$=4).

Alternatively, for example, according to the present embodiment, the $N_{th}$ may be configured to a block size adaptively as below.

Method 2 in the present embodiment (proposed method 2)
In the case that N<=2 in the current chroma block of N×M size or M×N size (here, e.g., N<=M), $N_{th}$ may be set to 1 ($N_{th}$=1).
In the case that N=4 in the current chroma block of N×M size or M×N size (here, e.g., N<=M), $N_{th}$ may be set to 2 ($N_{th}$=2).
In the case that N=8 in the current chroma block of N×M size or M×N size (here, e.g., N<=M), $N_{th}$ may be set to 4 ($N_{th}$=4).
In the case that N>8 in the current chroma block of N×M size or M×N size (here, e.g., N<=M), $N_{th}$ may be set to 8 ($N_{th}$=8).

Alternatively, for example, according to the present embodiment, the $N_{th}$ may be configured to a block size adaptively as below.

Method 3 in the present embodiment (proposed method 3)
In the case that N<=2 in the current chroma block of N×M size or M×N size (here, e.g., N<=M), $N_{th}$ may be set to 1 ($N_{th}$=1).
In the case that N>2 in the current chroma block of N×M size or M×N size (here, e.g., N<=M), $N_{th}$ may be set to 2 ($N_{th}$=2).

Alternatively, for example, according to the present embodiment, the $N_{th}$ may be configured to a block size adaptively as below.

Method 4 in the present embodiment (proposed method 4)
In the case that N<=2 in the current chroma block of N×M size or M×N size (here, e.g., N<=M), $N_{th}$ may be set to 1 ($N_{th}$=1).
In the case that N>2 in the current chroma block of N×M size or M×N size (here, e.g., N<=M), $N_{th}$ may be set to 4 ($N_{th}$=4).

Method 1 to method 4 described above in the present embodiment may reduce a complexity of the worst case by about 40%, and since $N_{th}$ may be adaptively applied to each chroma block size, encoding loss may be minimized. In addition, for example, since method 2 may apply $N_{th}$ up to 8 in variable manner, this may proper to high quality image encoding. Since method 3 and method 4 may reduce $N_{th}$ to 4 or 2, CCLM complexity may be reduced significantly, and may proper to low image quality or middle image quality.

As described in method 1 to method 4, according to the present embodiment, $N_{th}$ may be configured adaptively to a block size, and through this, a reference sample number for deriving an optimized CCLM parameter may be selected.

The encoding apparatus/decoding apparatus may set the upper limit $N_{th}$ for neighboring sample selection, and then, calculate a CCLM parameter by selecting a chroma block neighboring sample as described above.

An amount of CCLM parameter calculation according to a chroma block size in the case to which the present embodiment described above is applied may be represented as the following figure.

FIG. 39 schematically shows the number of operations required to derive CCLM parameters based on chroma block size according to an embodiment.

As represented in FIG. 39 above, in the case that the methods proposed in the present embodiment is used, it is identified that an amount of operation required for the CCLM parameter calculation is not increase even a block size is increased.

Meanwhile, according to the present embodiment, without need to transmit additional information, a promised value may be used in the encoding apparatus and the decoding apparatus, or it may be transmitted whether to use the proposed method and information representing the $N_{th}$ value in a unit of CU, slice, picture and sequence.

For example, in the case that information representing whether to use the proposed method is used in a unit of CU, when an intra-prediction mode of a current chroma block is CCLM mode (i.e., in the case that CCLM prediction is applied to the current chroma block), cclm_reduced_sample_flag may be parsed and the present embodiment described above may be performed as below.

In the case that the cclm_reduced_sample_flag is 0 (false), it is configured $N_{th}$=4 for all blocks, and a CCLM parameter calculation is performed through the neighboring sample selection method of the present embodiment proposed in FIG. 7 described above.

In the case that the cclm_reduced_sample_flag is 1 (true), a CCLM parameter calculation is performed through method 3 of the present embodiment described above.

Alternatively, in the case that the information representing the applied method is transmitted in a unit of slice, picture or sequence, as described below, the method among method 1 to method 4 may be selected based on the information transmitted through a high level syntax (HLS), and based on the selected method, the CCLM parameter may be calculated.

For example, the information representing the applied method signaled through a slice header may be represented as the following figure.

FIG. 40 schematically shows signaling of syntax element cclm_reduced_sample_threshold in slice header according to an embodiment.

cclm_reduced_sample_threshold may represent a syntax element of the information representing the applied method.

Alternatively, for example, the information representing the applied method signaled through a Picture Parameter Set (PPS) may be represented as the following figure.

FIG. 41 schematically shows signaling of syntax element cclm_reduced_sample_threshold in PPS according to an embodiment.

Alternatively, for example, the information representing the applied method signaled through a Sequence Parameter Set (step, SPS) may be represented as the following figure.

FIG. 42 schematically shows signaling of syntax element cclm_reduced_sample_threshold in SPS according to an embodiment.

The method selected based on cclm_reduced_sample_threshold value (i.e., a value derived by decoding cclm_reduced_sample_threshold) transmitted through the slice header, the PPS or the SPS may be derived as represented in the following figure.

FIG. 43 schematically shows selection of method for calculating CCLM parameters based on cclm_reduced_sample_threshold.

Referring to FIG. 43, in the case that the cclm_reduced_sample_threshold value is 0, method 1 may be selected as the method applied to the current chroma block, in the case that the cclm_reduced_sample_threshold value is 1, method 2 may be selected as the method applied to the current chroma block, in the case that the cclm_reduced_sample_threshold value is 2, method 3 may be selected as the method applied to the current chroma block, and in the case that the cclm_reduced_sample_threshold value is 3, method 4 may be selected as the method applied to the current chroma block.

The method proposed in the present embodiment may be used a CCLM mode which is an intra-prediction mode for a chroma component, and the chroma block predicted through the CCLM mode may be used for deriving a residual image through a differential from an original image in the encoding apparatus or used for deriving a reconstructed image through an addition with a residual signal in the decoding apparatus.

Meanwhile, in the case that the information representing one of the methods is transmitted in a unit of CU, slice, picture and sequence, the encoding apparatus may determine one of method 1 to method 4 and transmit the information to the decoding apparatus as below.

In the case that the information representing whether the method of the present embodiment described above is applied is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.
1) In the case that encoding efficiency is good when the $N_{th}$ is set to 4 for all blocks and a CCLM parameter calculation is performed through the reference sample selection method of the present embodiment proposed in FIG. 7 described above, cclm_reduced_sample_flag of value 0 (false) is transmitted.
2) In the case that encoding efficiency is good when it is configured that method 3 is applied and a CCLM parameter calculation is performed through the reference sample selection method of the present embodiment proposed, cclm_reduced_sample_flag of value 1 (true) is transmitted.

Alternatively, in the case that the information representing whether the method of the present embodiment described above is applied is transmitted in a unit of slice, picture or sequence, the encoding apparatus may add a high level syntax (HLS) as represented in FIG. 40, FIG. 41 or FIG. 42 described above and transmit the information representing one method among the methods. The encoding apparatus may configure the method applied among the methods by considering a size of input image or in accordance with an encoding target bitrate.
1) For example, in the case that an input image is HD quality or more, the encoding apparatus may apply method 2 ($N_{th}$=1, 2, 4 or 8), and in the case that an input image is HD quality or less, the encoding apparatus may apply method 1 ($N_{th}$=1, 2 or 4).
2) In the case that image encoding of high quality is required, the encoding apparatus may apply method 2 ($N_{th}$=1, 2, 4 or 8), and in the case that image encoding of normal quality is required, the encoding apparatus may apply method 4 ($N_{th}$=1 or 4).

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 9A:
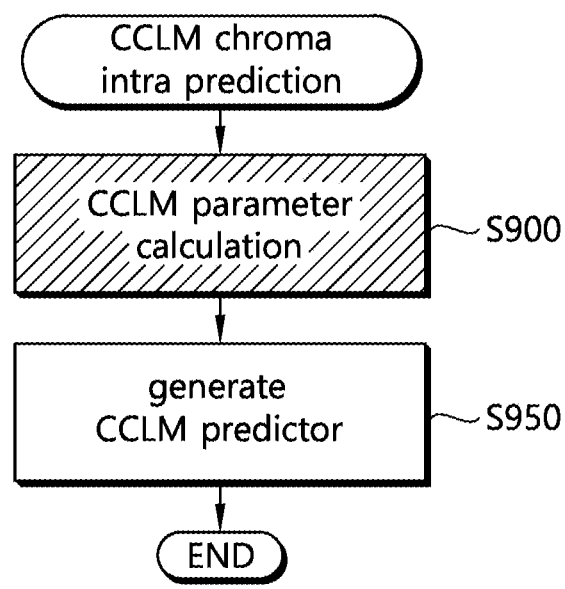
FIGS. 9a and 9b are diagrams for describing a procedure of performing CCLM prediction based on the CCLM parameters of the current chroma block derived according to method 1 of the present embodiment described above.
Figure 9B:
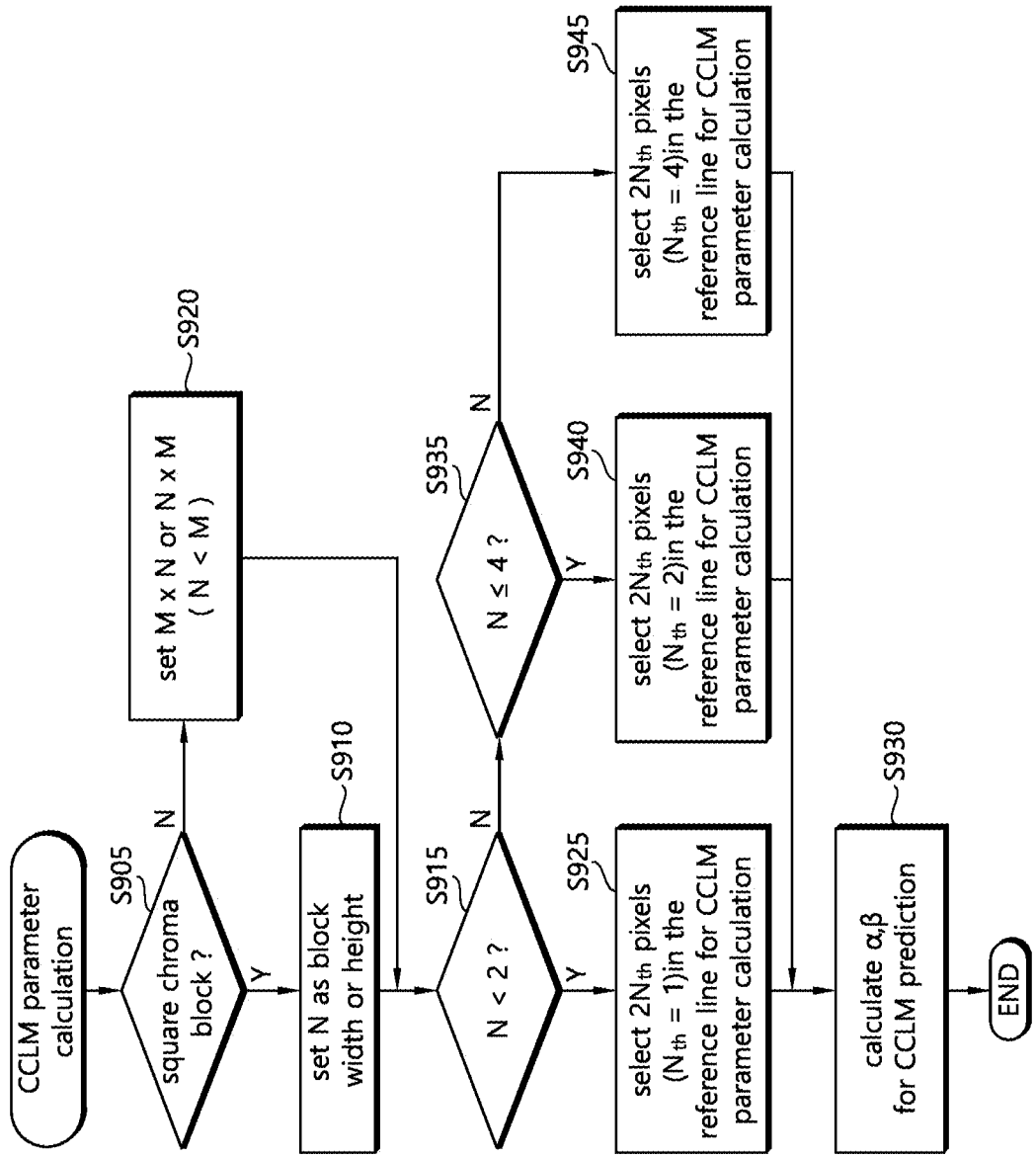

FIGS. 9a and 9b are diagrams for describing a procedure of performing CCLM prediction based on the CCLM parameters of the current chroma block derived according to method 1 of the present embodiment described above.

Referring to FIG. 9a, the encoding apparatus/decoding apparatus may calculate a CCLM parameter for the current block (step, S900). For example, the CCLM parameter may be calculated as the present embodiment shown in FIG. 9b.

FIG. 9b may illustrate a specific embodiment of calculating the CCLM parameter. For example, referring to FIG. 9b, the encoding apparatus/decoding apparatus may determine whether the current chroma block is a square chroma block (step, S905).

In the case that the current chroma block is the square chroma block, the encoding apparatus/decoding apparatus may set a width or a height of the current block to N (step, S910), and determine whether the N is smaller than 2 (N<2) (step, S915).

Alternatively, in the case that the current chroma block is not the square chroma block, the size of the current chroma block may be derived in M×N size or N×M size (step, S920). The encoding apparatus/decoding apparatus may determine whether the N is smaller than 2 (step, S915). Here, the M may represent a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S925). Here, the $N_{th}$ may be 1 ($N_{th}$=1).

The encoding apparatus/decoding apparatus may derive parameters α and β for the CCLM prediction based on the selected reference samples (step, S930).

Meanwhile, in the case that the N is not smaller than 2, the encoding apparatus/decoding apparatus may determine whether the N is 4 or less (N<=4) (step, S935).

In the case that the N is 4 or less, the encoding apparatus/decoding apparatus may select $2N_{th}$ neighboring samples in a reference line adjacent to the current block as a reference sample for the CCLM parameter calculation (step, S940). Here, the $N_{th}$ may be 2 ($N_{th}$=2). Thereafter, the encoding apparatus/decoding apparatus may derive parameters α and β for the CCLM prediction based on the selected reference samples (step, S930).

Alternatively, in the case that the N is greater than 4, the encoding apparatus/decoding apparatus may select $2N_{th}$ neighboring samples in a reference line adjacent to the current block as a reference sample for the CCLM parameter calculation (step, S945). Here, the $N_{th}$ may be 4 ($N_{th}$=4). Thereafter, the encoding apparatus/decoding apparatus may derive parameters α and β for the CCLM prediction based on the selected reference samples (step, S930).

Referring back to FIG. 9a, in the case that the parameters for CCLM prediction for the current chroma block are calculated, the encoding apparatus/decoding apparatus may perform CCLM prediction based on the parameters to generate a prediction sample for the current chroma block (step, S950). For example, the encoding apparatus/decoding apparatus may generate a prediction sample for the current chroma block based on Equation 1 in which the calculated parameters and reconstructed samples of the current luma block for the current chroma block are used.

Figure 10A:
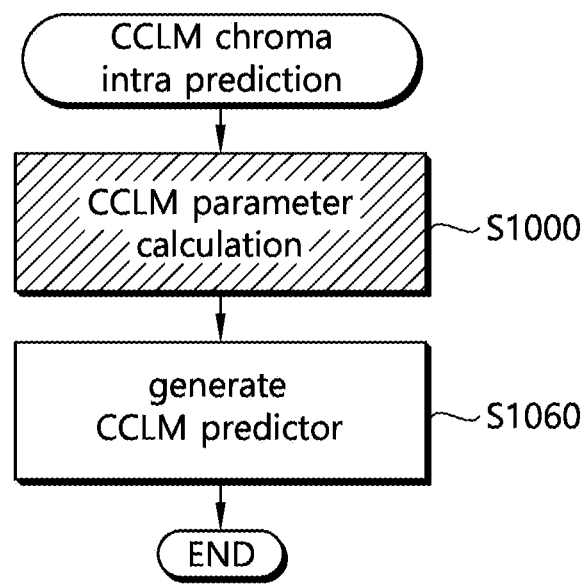
FIGS. 10a and 10b are diagrams for describing a procedure of performing CCLM prediction based on the CCLM parameters of the current chroma block derived according to method 2 of the present embodiment described above.
Figure 10B:
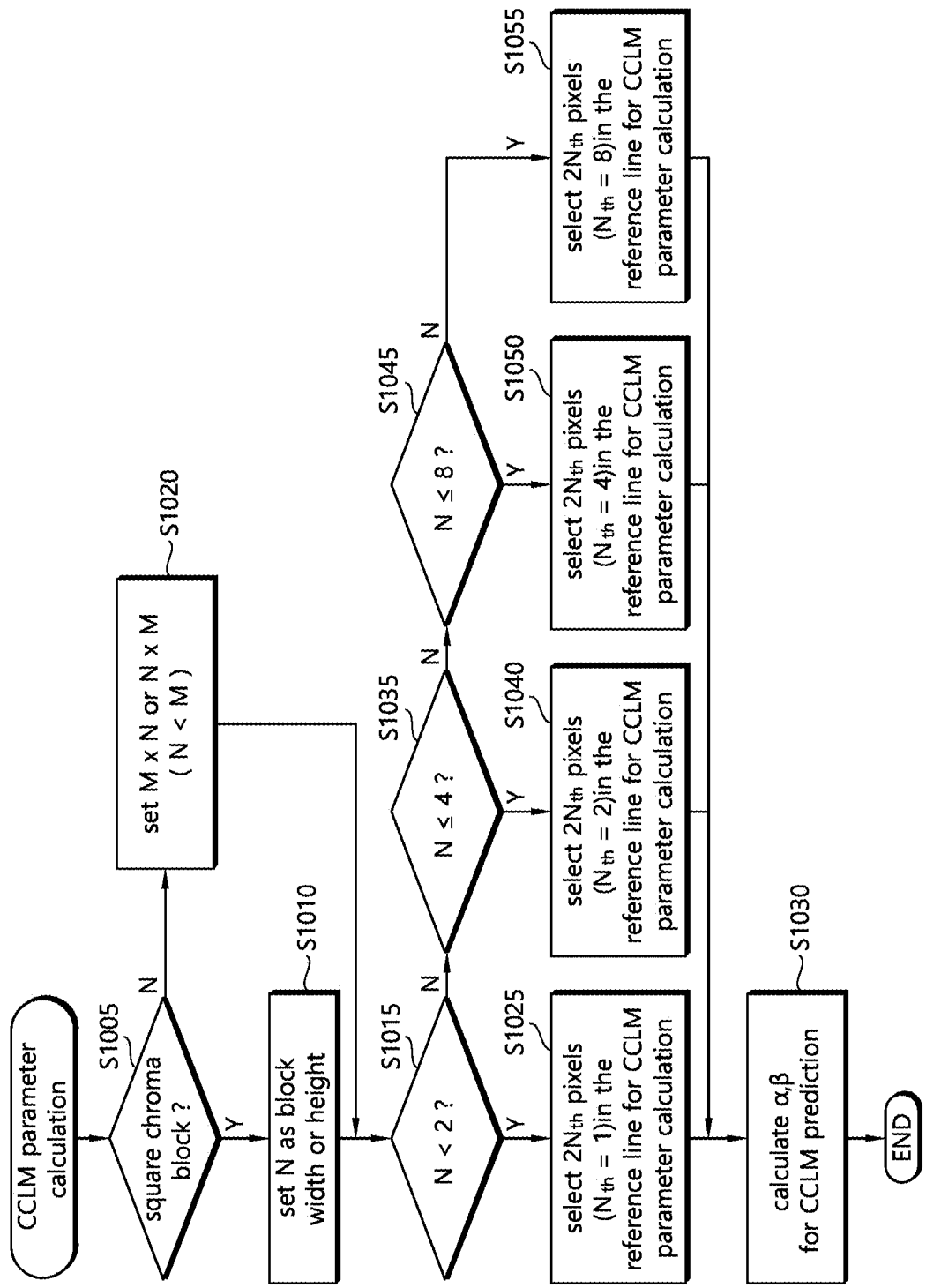

FIGS. 10a and 10b are diagrams for describing a procedure of performing CCLM prediction based on the CCLM parameters of the current chroma block derived according to method 2 of the present embodiment described above.

Referring to FIG. 10a, the encoding apparatus/decoding apparatus may calculate a CCLM parameter for the current block (step, S1000). For example, the CCLM parameter may be calculated as the present embodiment shown in FIG. 10b.

FIG. 10b may illustrate a specific embodiment of calculating the CCLM parameter. For example, referring to FIG. 10b, the encoding apparatus/decoding apparatus may determine whether the current chroma block is a square chroma block (step, S1005).

In the case that the current chroma block is a square chroma block, the encoding apparatus/decoding apparatus may set a width or a height of the current block to N (step, S1010) and determine whether N is smaller than 2 (N<2) (step, S1015).

Alternatively, in the case that the current chroma block is not a square chroma block, a size of the current chroma block may be derived in M×N size or N×M size (step, S1020). The encoding apparatus/decoding apparatus determine whether the N is smaller than 2 (step, S1015). Here, the M represents a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S1025). Here, the $N_{th}$ may be 1 ($N_{th}$=1).

The encoding apparatus/decoding apparatus may derive parameters α and β for the CCLM prediction based on the selected reference samples (step, S1030).

Meanwhile, in the case that the N is not smaller than 2, the encoding apparatus/decoding apparatus may determine whether the N is 4 or less (N<=4) (step, S1035).

In the case that N is 4 or less, the encoding apparatus/decoding apparatus may select $2N_{th}$ neighboring samples in a reference line adjacent to the current block as a reference sample for the CCLM parameter calculation (step, S1040). Here, the $N_{th}$ may be 2. Later, the encoding apparatus/decoding apparatus may derive the parameters α and β for the CCLM prediction based on the selected reference samples (step, S1030).

Meanwhile, in the case that the N is greater than 4, the encoding apparatus/decoding apparatus may determine whether the N is 8 or less (N<=8) (step, S1045).

In the case that the N is smaller than or equal to 8, the encoding apparatus/decoding apparatus may select $2N_{th}$ neighboring samples in a reference line adjacent to the current block as a reference sample for calculating the CCLM parameter (step, S1050). Here, the $N_{th}$ may be 4 ($N_{th}$=4). Thereafter, the encoding apparatus/decoding apparatus may derive parameters α and β for the CCLM prediction based on the selected reference samples (step, S1030).

Alternatively, in the case that the N is greater than 8, the encoding apparatus/decoding apparatus may select $2N_{th}$ neighboring samples in a reference line adjacent to the current block as a reference sample for calculating the CCLM parameter (step, S1055). Here, the $N_{th}$ may be 8 ($N_{th}$=8). Thereafter, the encoding apparatus/decoding apparatus may derive parameters α and β for the CCLM prediction based on the selected reference samples (step, S1030).

Referring back to FIG. 10a, in the case that the parameters for CCLM prediction for the current chroma block are calculated, the encoding apparatus/decoding apparatus may perform CCLM prediction based on the parameters to generate a prediction sample for the current chroma block (step, S1060). For example, the encoding apparatus/decoding apparatus may generate a prediction sample for the current chroma block based on Equation 1 in which the calculated parameters and reconstructed samples of the current luma block for the current chroma block are used.

Figure 11A:
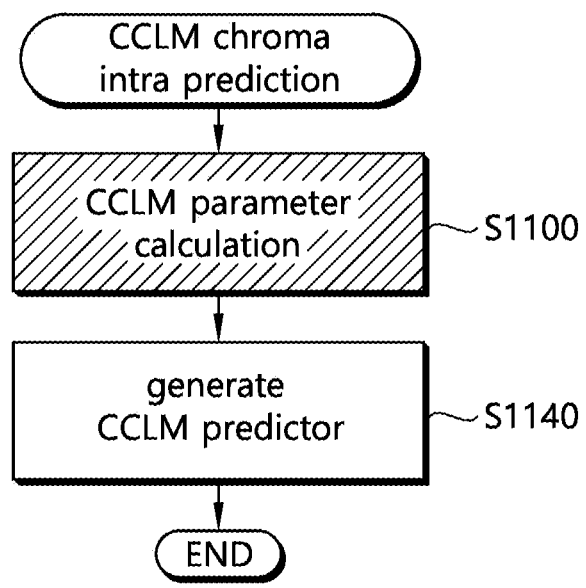
FIGS. 11a and 11b are diagrams for describing a procedure of performing CCLM prediction based on the CCLM parameters of the current chroma block derived according to method 3 of the present embodiment described above.
Figure 11B:
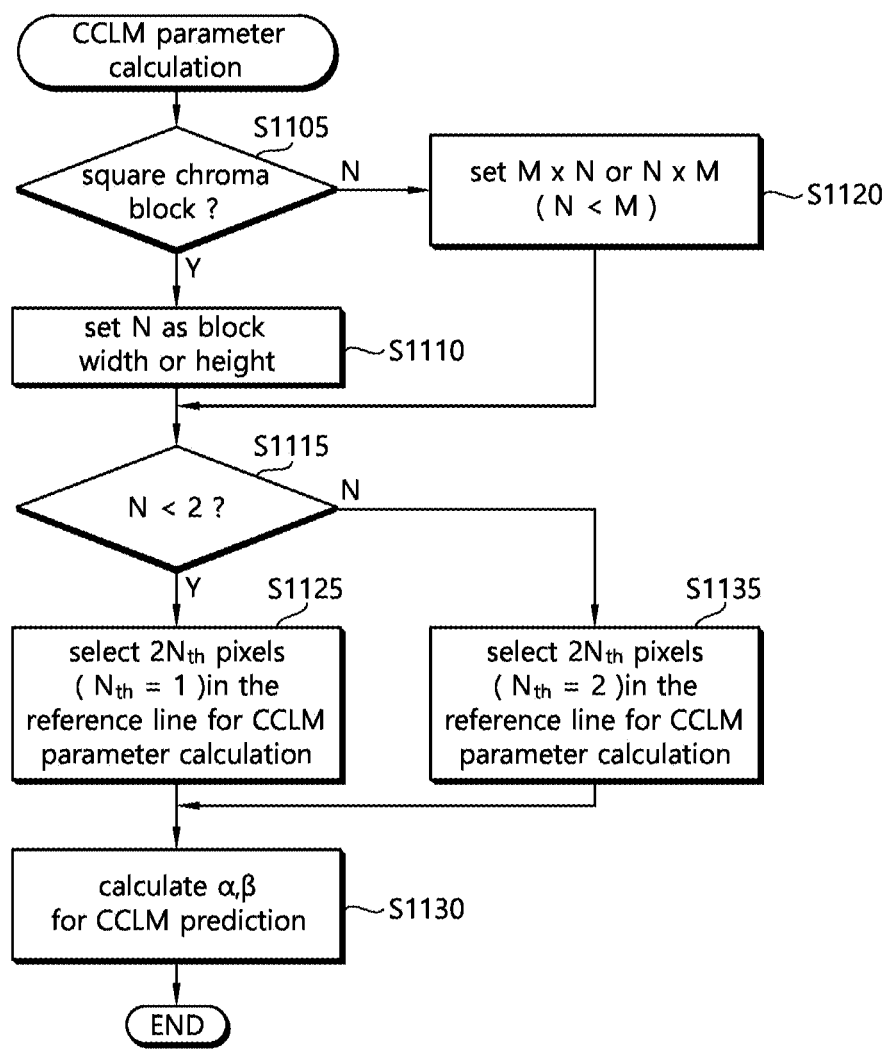

FIGS. 11a and 11b are diagrams for describing a procedure of performing CCLM prediction based on the CCLM parameters of the current chroma block derived according to method 3 of the present embodiment described above.

Referring to FIG. 11a, the encoding apparatus/decoding apparatus may calculate a CCLM parameter for the current block (step, S1100). For example, the CCLM parameter may be calculated as the present embodiment shown in FIG. 11b.

FIG. 11b may illustrate a specific embodiment of calculating the CCLM parameter. For example, referring to FIG. 11b, the encoding apparatus/decoding apparatus may determine whether the current chroma block is a square chroma block (step, S1105).

In the case that the current chroma block is a square chroma block, the encoding apparatus/decoding apparatus may set a width or a height of the current block to N (step, S1110) and determine whether N is smaller than 2 (N<2) (step, S1115).

Alternatively, in the case that the current chroma block is not a square chroma block, a size of the current chroma block may be derived in M×N size or N×M size (step, S1120). The encoding apparatus/decoding apparatus determine whether the N is smaller than 2 (step, S1115). Here, the M represents a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S1125). Here, the $N_{th}$ may be 1 ($N_{th}$=1).

The encoding apparatus/decoding apparatus may derive parameters α and β for the CCLM prediction based on the selected reference samples (step, S1130).

Meanwhile, in the case that the N is not smaller than 2, the encoding apparatus/decoding apparatus may select $2N_{th}$ neighboring samples in a reference line adjacent to the current block as a reference sample for the CCLM parameter calculation (step, S1135). Here, the $N_{th}$ may be 2 ($N_{th}$=2). Thereafter, the encoding apparatus/decoding apparatus may derive parameters α and β for the CCLM prediction based on the selected reference samples (step, S1130).

Referring back to FIG. 11a, in the case that the parameters for CCLM prediction for the current chroma block are calculated, the encoding apparatus/decoding apparatus may perform CCLM prediction based on the parameters to generate a prediction sample for the current chroma block (step, S1140). For example, the encoding apparatus/decoding apparatus may generate a prediction sample for the current chroma block based on Equation 1 in which the calculated parameters and reconstructed samples of the current luma block for the current chroma block are used.

Figure 12A:
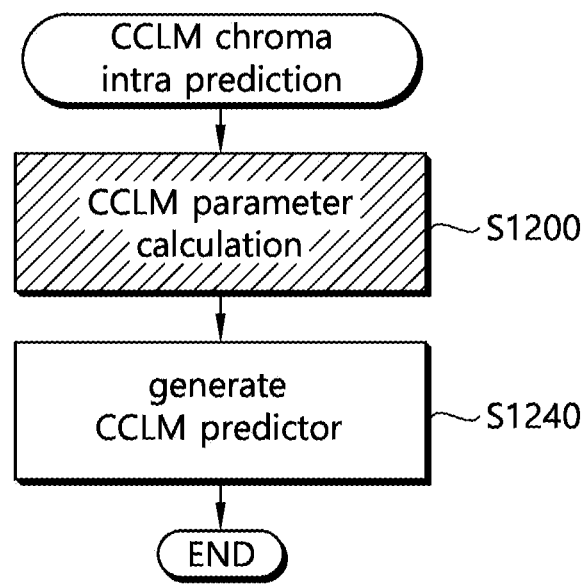
FIGS. 12a and 12b are diagrams for describing a procedure of performing CCLM prediction based on the CCLM parameters of the current chroma block derived according to method 4 of the present embodiment described above.
Figure 12B:
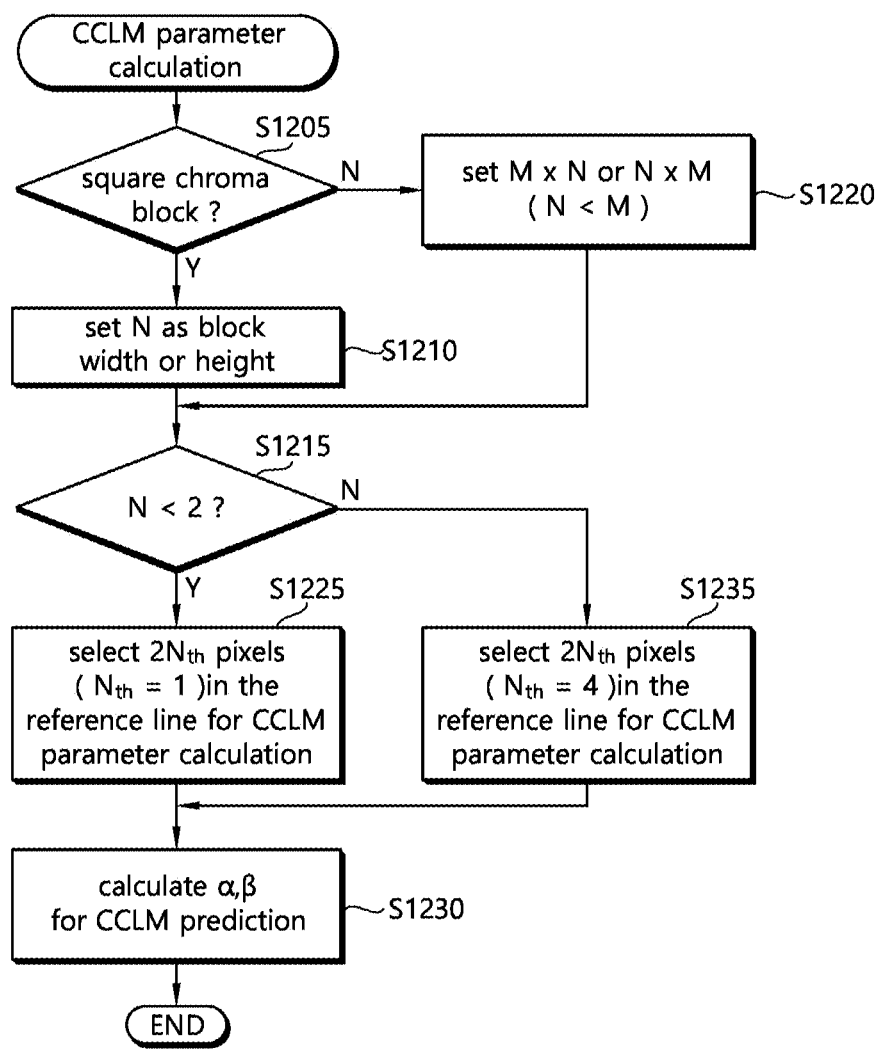

FIGS. 12a and 12b are diagrams for describing a procedure of performing CCLM prediction based on the CCLM parameters of the current chroma block derived according to method 4 of the present embodiment described above.

Referring to FIG. 12a, the encoding apparatus/decoding apparatus may calculate a CCLM parameter for the current block (step, S1200). For example, the CCLM parameter may be calculated as the present embodiment shown in FIG. 12b.

FIG. 12b may illustrate a specific embodiment of calculating the CCLM parameter. For example, referring to FIG. 12b, the encoding apparatus/decoding apparatus may determine whether the current chroma block is a square chroma block (step, S1205).

In the case that the current chroma block is a square chroma block, the encoding apparatus/decoding apparatus may set a width or a height of the current block to N (step, S1210) and determine whether N is smaller than 2 (N<2) (step, S1215).

Alternatively, in the case that the current chroma block is not a square chroma block, a size of the current chroma block may be derived in M×N size or N×M size (step, S1220). The encoding apparatus/decoding apparatus determine whether the N is smaller than 2 (step, S1215). Here, the M represents a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S1225). Here, the $N_{th}$ may be 1 ($N_{th}=1$).

The encoding apparatus/decoding apparatus may derive parameters α and β for the CCLM prediction based on the selected reference samples (step, S1230).

Meanwhile, in the case that the N is not smaller than 2, the encoding apparatus/decoding apparatus may select $2N_{th}$ neighboring samples in a reference line adjacent to the current block as a reference sample for the CCLM parameter calculation (step, S1235). Here, the $N_{th}$ may be 4 ($N_{th}=4$). Thereafter, the encoding apparatus/decoding apparatus may derive parameters α and β for the CCLM prediction based on the selected reference samples (step, S1230).

Referring back to FIG. 12a, in the case that the parameters for CCLM prediction for the current chroma block are calculated, the encoding apparatus/decoding apparatus may perform CCLM prediction based on the parameters to generate a prediction sample for the current chroma block (step, S1240). For example, the encoding apparatus/decoding apparatus may generate a prediction sample for the current chroma block based on Equation 1 in which the calculated parameters and reconstructed samples of the current luma block for the current chroma block are used.

Meanwhile, in the present disclosure, in deriving the CCLM parameter, an embodiment which is different from the present embodiment of reducing operation complexity for deriving the CCLM parameter may be proposed.

Particularly, in order to solve the problem of increase of CCLM parameter operation amount as the chroma block size increase described above, the present embodiment proposes a method of configuring a pixel selection upper limit $N_{th}$ adaptively.

For example, according to the present embodiment, the $N_{th}$ may be configured to a block size adaptively as below.
Method 1 in the present embodiment (proposed method 1)
In the case that a current chroma block is a chroma block of 2×2 size, $N_{th}$ may be set to 1 ($N_{th}=1$).
In the case that N=2 in the current chroma block of N×M size or M×N size (here, e.g., N<M), $N_{th}$ may be set to 2 ($N_{th}=2$).
In the case that N>2 in the current chroma block of N×M size or M×N size (here, e.g., N<=M), $N_{th}$ may be set to 4 ($N_{th}=4$).

Alternatively, for example, according to the present embodiment, the $N_{th}$ may be configured to a block size adaptively as below.
Method 2 in the present embodiment (proposed method 2)
In the case that a current chroma block is a chroma block of 2×2 size, $N_{th}$ may be set to 1 ($N_{th}=1$).
In the case that N=2 in the current chroma block of N×M size or M×N size (here, e.g., N<M), $N_{th}$ may be set to 2 ($N_{th}=2$).
In the case that N=4 in the current chroma block of N×M size or M×N size (here, e.g., N<=M), $N_{th}$ may be set to 2 ($N_{th}=2$).
In the case that N>4 in the current chroma block of N×M size or M×N size (here, e.g., N<=M), $N_{th}$ may be set to 4 ($N_{th}=4$).

Alternatively, for example, according to the present embodiment, the $N_{th}$ may be configured to a block size adaptively as below.
Method 3 in the present embodiment (proposed method 3)
In the case that a current chroma block is a chroma block of 2×2 size, $N_{th}$ may be set to 1 ($N_{th}=1$).
In the case that N=2 in the current chroma block of N×M size or M×N size (here, e.g., N<M), $N_{th}$ may be set to 2 ($N_{th}=2$).
In the case that N=4 in the current chroma block of N×M size or M×N size (here, e.g., N<=M), $N_{th}$ may be set to 4 ($N_{th}=4$).
In the case that N>4 in the current chroma block of N×M size or M×N size (here, e.g., N<=M), $N_{th}$ may be set to 8 ($N_{th}=8$).

Method 1 to method 3 described above in the present embodiment may reduce a complexity of the worst case in the case that the current chroma block is 2×2 by about 40%, and since $N_{th}$ may be adaptively applied to each chroma block size, encoding loss may be minimized. In addition, for example, since method 1 and method 3 may apply $N_{th}$ to 4 in the case of N>2, this may proper to high quality image encoding. Since method 2 may reduce $N_{th}$ to 2 even in the case of N=4, CCLM complexity may be reduced significantly, and may proper to low image quality or middle image quality.

As described in method 1 to method 3, according to the present embodiment, $N_{th}$ may be configured adaptively to a block size, and through this, a reference sample number for deriving an optimized CCLM parameter may be selected.

The encoding apparatus/decoding apparatus may set the upper limit $N_{th}$ for neighboring sample selection, and then, calculate a CCLM parameter by selecting a chroma block neighboring sample as described above.

An amount of CCLM parameter calculation according to a chroma block size in the case to which the present embodiment described above is applied may be represented as the following figure.

FIG. 44 schematically shows the number of operations required to derive CCLM parameters based on chroma block size according to an embodiment.

As represented in FIG. 44 above, in the case that the methods proposed in the present embodiment is used, it is identified that an amount of operation required for the CCLM parameter calculation is not increase even a block size is increased.

Meanwhile, according to the present embodiment, without need to transmit additional information, a promised value may be used in the encoding apparatus and the decoding apparatus, or it may be transmitted whether to use the proposed method and information representing the $N_{th}$ value in a unit of CU, slice, picture and sequence.

For example, in the case that information representing whether to use the proposed method is used in a unit of CU, when an intra-prediction mode of a current chroma block is CCLM mode (i.e., in the case that CCLM prediction is applied to the current chroma block), cclm_reduced_sample_flag may be parsed and the present embodiment described above may be performed as below.
In the case that the cclm_reduced_sample_flag is 0 (false), it is configured $N_{th}=2$ for all blocks, and a CCLM parameter calculation is performed through the neighboring sample selection method of the present embodiment proposed in FIG. 7 described above.
In the case that the cclm_reduced_sample_flag is 1 (true), a CCLM parameter calculation is performed through method 1 of the present embodiment described above.

Alternatively, in the case that the information representing the applied method is transmitted in a unit of slice, picture or sequence, as described below, the method among method 1 to method 3 may be selected based on the information transmitted through a high level syntax (HLS), and based on the selected method, the CCLM parameter may be calculated.

For example, the information representing the applied method signaled through a slice header may be represented as the following figure.

FIG. 45 schematically shows signaling of syntax element cclm_reduced_sample_threshold in slice header according to an embodiment.

cclm_reduced_sample_threshold may represent a syntax element of the information representing the applied method.

Alternatively, for example, the information representing the applied method signaled through a Picture Parameter Set (PPS) may be represented as the following figure.

FIG. 46 schematically shows signaling of syntax element cclm_reduced_sample_threshold in PPS according to an embodiment.

Alternatively, for example, the information representing the applied method signaled through a Sequence Parameter Set (step, SPS) may be represented as the following figure.

FIG. 47 schematically shows signaling of syntax element cclm_reduced_sample_threshold in SPS according to an embodiment.

The method selected based on cclm_reduced_sample_threshold value (i.e., a value derived by decoding cclm_reduced_sample_threshold) transmitted through the slice header, the PPS or the SPS may be derived as represented in the following figure.

FIG. 48 schematically shows selection of method for calculating CCLM parameters based on cclm_reduced_sample_threshold.

Referring to FIG. 48, in the case that the cclm_reduced_sample_threshold value is 0, the methods of the present embodiment described above may not be applied to the current chroma block, in the case that the cclm_reduced_sample_threshold value is 1, method 1 may be selected as the method applied to the current chroma block, in the case that the cclm_reduced_sample_threshold value is 2, method 2 may be selected as the method applied to the current chroma block, and in the case that the cclm_reduced_sample_threshold value is 3, method 3 may be selected as the method applied to the current chroma block.

The method proposed in the present embodiment may be used a CCLM mode which is an intra-prediction mode for a chroma component, and the chroma block predicted through the CCLM mode may be used for deriving a residual image through a differential from an original image in the encoding apparatus or used for deriving a reconstructed image through an addition with a residual signal in the decoding apparatus.

Meanwhile, in the case that the information representing one of the methods is transmitted in a unit of CU, slice, picture and sequence, the encoding apparatus may determine one of method 1 to method 3 and transmit the information to the decoding apparatus as below.

In the case that the information representing whether the method of the present embodiment described above is applied is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.

1) In the case that encoding efficiency is good when the $N_{th}$ is set to 2 for all blocks and a CCLM parameter calculation is performed through the reference sample selection method of the present embodiment proposed in FIG. 7 described above, cclm_reduced_sample_flag of value 0 (false) is transmitted.

2) In the case that encoding efficiency is good when it is configured that method 1 is applied and a CCLM parameter calculation is performed through the reference sample selection method of the present embodiment proposed, cclm_reduced_sample_flag of value 1 (true) is transmitted.

Alternatively, in the case that the information representing whether the method of the present embodiment described above is applied is transmitted in a unit of slice, picture or sequence, the encoding apparatus may add a high level syntax (HLS) as represented in FIG. 45, FIG. 46 or FIG. 46 described above and transmit the information representing one method among the methods. The encoding apparatus may configure the method applied among the methods by considering a size of input image or in accordance with an encoding target bitrate.

1) For example, in the case that an input image is HD quality or more, the encoding apparatus may apply method 3 ($N_{th}$=1, 2, 4 or 8), and in the case that an input image is HD quality or less, the encoding apparatus may apply method 1 ($N_{th}$=1, 2 or 4).

2) In the case that image encoding of high quality is required, the encoding apparatus may apply method 3 ($N_{th}$=1, 2, 4 or 8), and in the case that image encoding of normal quality is required, the encoding apparatus may apply method 2 ($N_{th}$=1, 2, 2 or 4) or method 1 ($N_{th}$=1, 2 or 4).

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 13A:
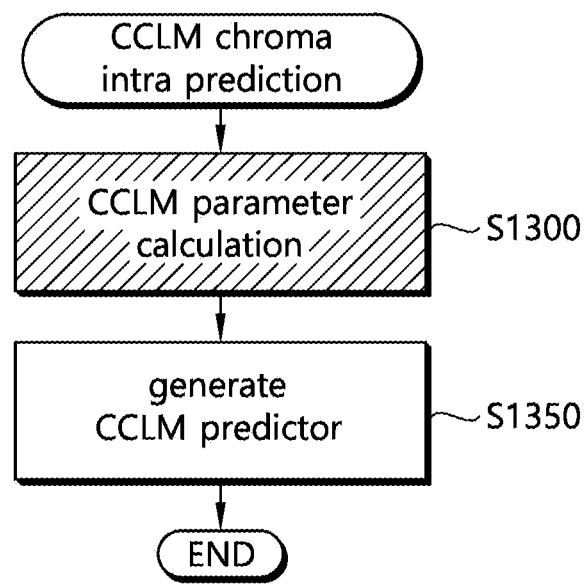

FIGS. 13a and 13b are diagrams for describing a procedure of performing CCLM prediction based on the CCLM parameters of the current chroma block derived according to method 1 of the present embodiment described above.

Referring to FIG. 13a, the encoding apparatus/decoding apparatus may calculate a CCLM parameter for the current block (step, S1300). For example, the CCLM parameter may be calculated as the present embodiment shown in FIG. 13b.

FIG. 13b may illustrate a specific embodiment of calculating the CCLM parameter. For example, referring to FIG. 13b, the encoding apparatus/decoding apparatus may determine whether the current chroma block is a square chroma block (step, S1305).

In the case that the current chroma block is the square chroma block, the encoding apparatus/decoding apparatus may set a width or a height of the current block to N (step, S1310) and determine whether the size of the current chroma block is 2×2 size (step, S1315).

Alternatively, in the case that the current chroma block is not the square chroma block, a size of the current chroma block may be derived in M×N size or N×M size (step, S1320). The encoding apparatus/decoding apparatus determine whether the size of the current chroma block is 2×2 size (step, S1315). Here, the M may represent a value greater than the N (N<M).

In the case that the size of the current chroma block is 2×2 size, the encoding apparatus/decoding apparatus may select $2N_{th}$ neighboring samples in a reference line adjacent to the current block as a reference sample for the CCLM parameter calculation (step, S1325). Here, the $N_{th}$ may be 1 ($N_{th}$=1).

The encoding apparatus/decoding apparatus may derive parameters α and β for the CCLM prediction based on the selected reference samples (step, S1330).

Meanwhile, in the case that the size of the current chroma block is not 2×2 size, the encoding apparatus/decoding apparatus may determine whether the N is 2 (N==2) (step, S1335).

In the case that the N is 2, the encoding apparatus/decoding apparatus may select $2N_{th}$ neighboring samples in a reference line adjacent to the current block as a reference sample for the CCLM parameter calculation (step, S1340). Here, the $N_{th}$ may be 2 ($N_{th}$=2). Thereafter, the encoding apparatus/decoding apparatus may derive parameters α and β for the CCLM prediction based on the selected reference samples (step, S1330).

Alternatively, in the case that the N is not 2, the encoding apparatus/decoding apparatus may select $2N_{th}$ neighboring samples in a reference line adjacent to the current block as a reference sample for the CCLM parameter calculation (step, S1345). Here, the $N_{th}$ may be 4 ($N_{th}$=4). Thereafter, the encoding apparatus/decoding apparatus may derive parameters α and β for the CCLM prediction based on the selected reference samples (step, S1330).

Referring back to FIG. 13a, in the case that the parameters for CCLM prediction for the current chroma block are calculated, the encoding apparatus/decoding apparatus may perform CCLM prediction based on the parameters to generate a prediction sample for the current chroma block (step, S1350). For example, the encoding apparatus/decoding apparatus may generate a prediction sample for the current chroma block based on Equation 1 in which the calculated parameters and reconstructed samples of the current luma block for the current chroma block are used.

Figure 14A:
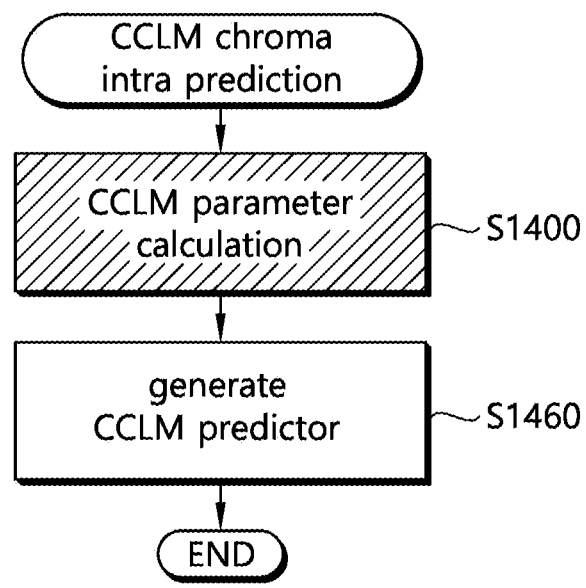
FIGS. 14a and 14b are diagrams for describing a procedure of performing CCLM prediction based on the CCLM parameters of the current chroma block derived according to method 2 of the present embodiment described above.
Figure 14B:
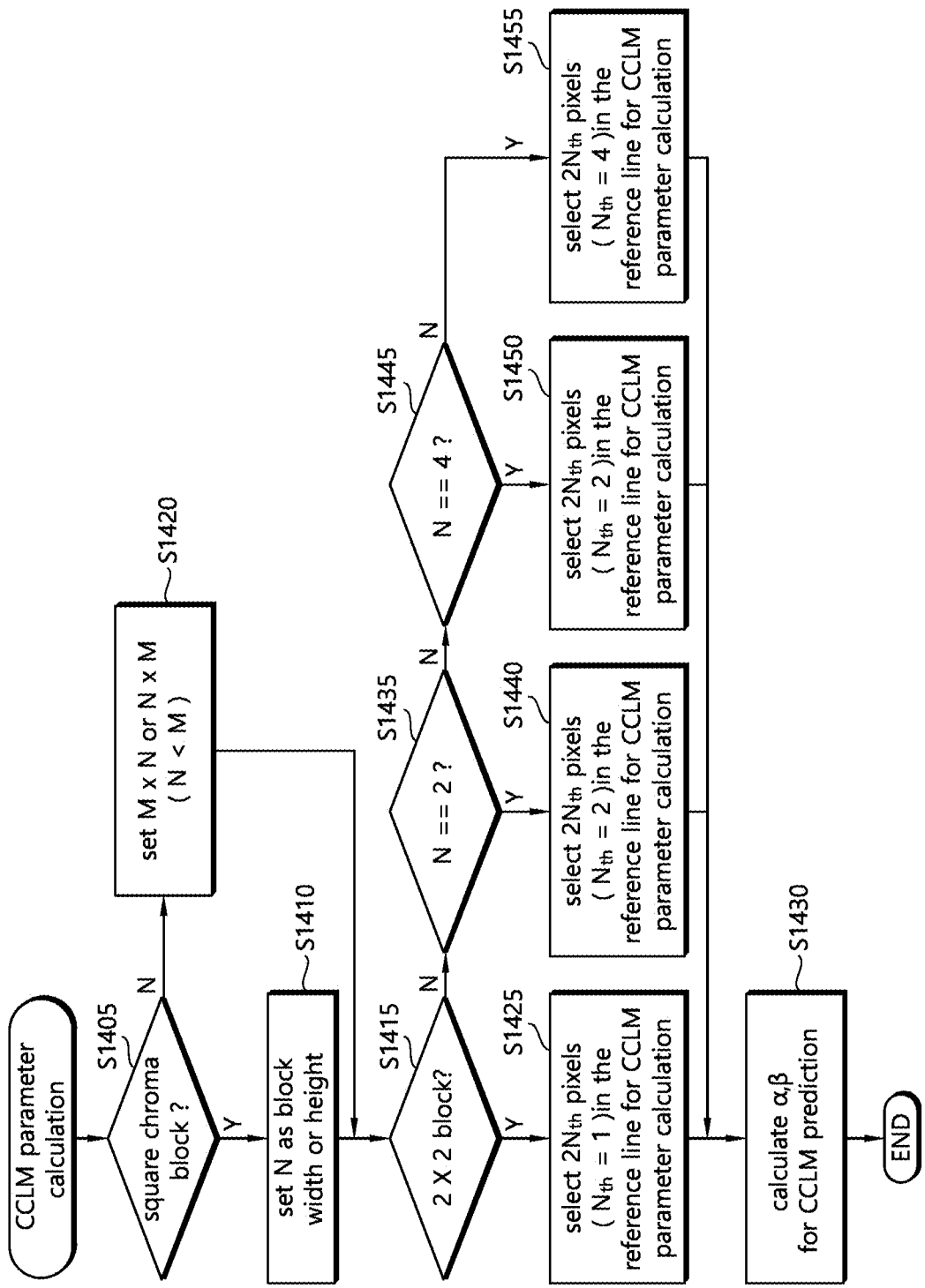

FIGS. 14a and 14b are diagrams for describing a procedure of performing CCLM prediction based on the CCLM parameters of the current chroma block derived according to method 2 of the present embodiment described above.

Referring to FIG. 14a, the encoding apparatus/decoding apparatus may calculate a CCLM parameter for the current block (step, S1400). For example, the CCLM parameter may be calculated as the present embodiment shown in FIG. 14b.

FIG. 14b may illustrate a specific embodiment of calculating the CCLM parameter. For example, referring to FIG. 14b, the encoding apparatus/decoding apparatus may determine whether the current chroma block is a square chroma block (step, S1405).

In the case that the current chroma block is a square chroma block, the encoding apparatus/decoding apparatus may set a width or a height of the current block to N (step, S1410) and determine whether a size of the current chroma block is 2×2 (step, S1415).

Alternatively, in the case that the current chroma block is not a square chroma block, a size of the current chroma block may be derived in M×N size or N×M size (step, S1420). The encoding apparatus/decoding apparatus determine whether a size of the current chroma block is 2×2 (step, S1415). Here, the M represents a value greater than the N (N<M).

In the case that a size of the current chroma block is 2×2, the encoding apparatus/decoding apparatus may select $2N_{th}$ neighboring samples in a reference line adjacent to the current block as a reference sample for the CCLM parameter calculation (step, S1425). Here, the $N_{th}$ may be 1 ($N_{th}$=1).

The encoding apparatus/decoding apparatus may derive parameters α and β for the CCLM prediction based on the selected reference samples (step, S1430).

Meanwhile, in the case that a size of the current chroma block is not 2×2, the encoding apparatus/decoding apparatus determine whether the N is 2 (N==2) (step, S1435).

In the case that the N is 2, the encoding apparatus/decoding apparatus may select $2N_{th}$ neighboring samples in a reference line adjacent to the current block as a reference sample for the CCLM parameter calculation (step, S1440). Here, the $N_{th}$ may be 2 ($N_{th}$=2). Later, the encoding apparatus/decoding apparatus may derive the parameters α and β for the CCLM prediction based on the selected reference samples (step, S1430).

Meanwhile, in the case that the N is not 2, the encoding apparatus/decoding apparatus may determine whether the N is 4(N==4) (step, S1445).

In the case that the N is 4, the encoding apparatus/decoding apparatus may select $2N_{th}$ neighboring samples in a reference line adjacent to the current block as a reference sample for the CCLM parameter calculation (step, S1450). Here, the $N_{th}$ may be 2 ($N_{th}$=2). Thereafter, the encoding apparatus/decoding apparatus may derive parameters α and β for the CCLM prediction based on the selected reference samples (step, S1430).

Alternatively, in the case that the N is not 4, the encoding apparatus/decoding apparatus may select $2N_{th}$ neighboring samples in a reference line adjacent to the current block as a reference sample for the CCLM parameter calculation (step, S1455). Here, the $N_{th}$ may be 4 ($N_{th}$=4). Thereafter, the encoding apparatus/decoding apparatus may derive parameters α and β for the CCLM prediction based on the selected reference samples (step, S1430).

Referring back to FIG. 14a, in the case that the parameters for CCLM prediction for the current chroma block are calculated, the encoding apparatus/decoding apparatus may perform CCLM prediction based on the parameters to generate a prediction sample for the current chroma block (step, S1460). For example, the encoding apparatus/decoding apparatus may generate a prediction sample for the current chroma block based on Equation 1 in which the calculated parameters and reconstructed samples of the current luma block for the current chroma block are used.

Figure 15A:
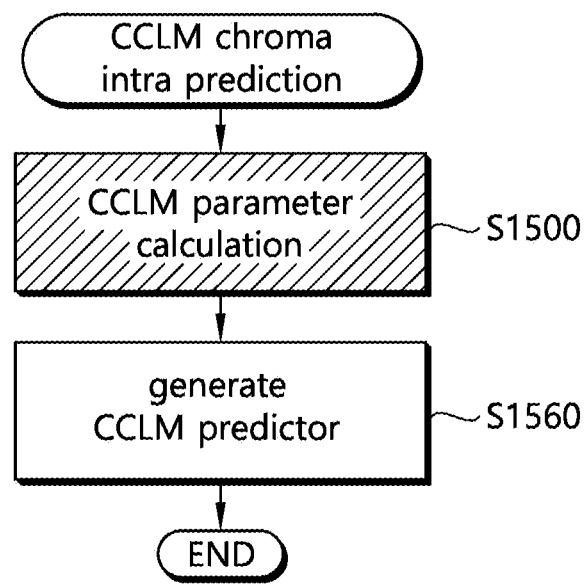
FIGS. 15a and 15b are diagrams for describing a procedure of performing CCLM prediction based on the CCLM parameters of the current chroma block derived according to method 3 of the present embodiment described above.
Figure 15B:
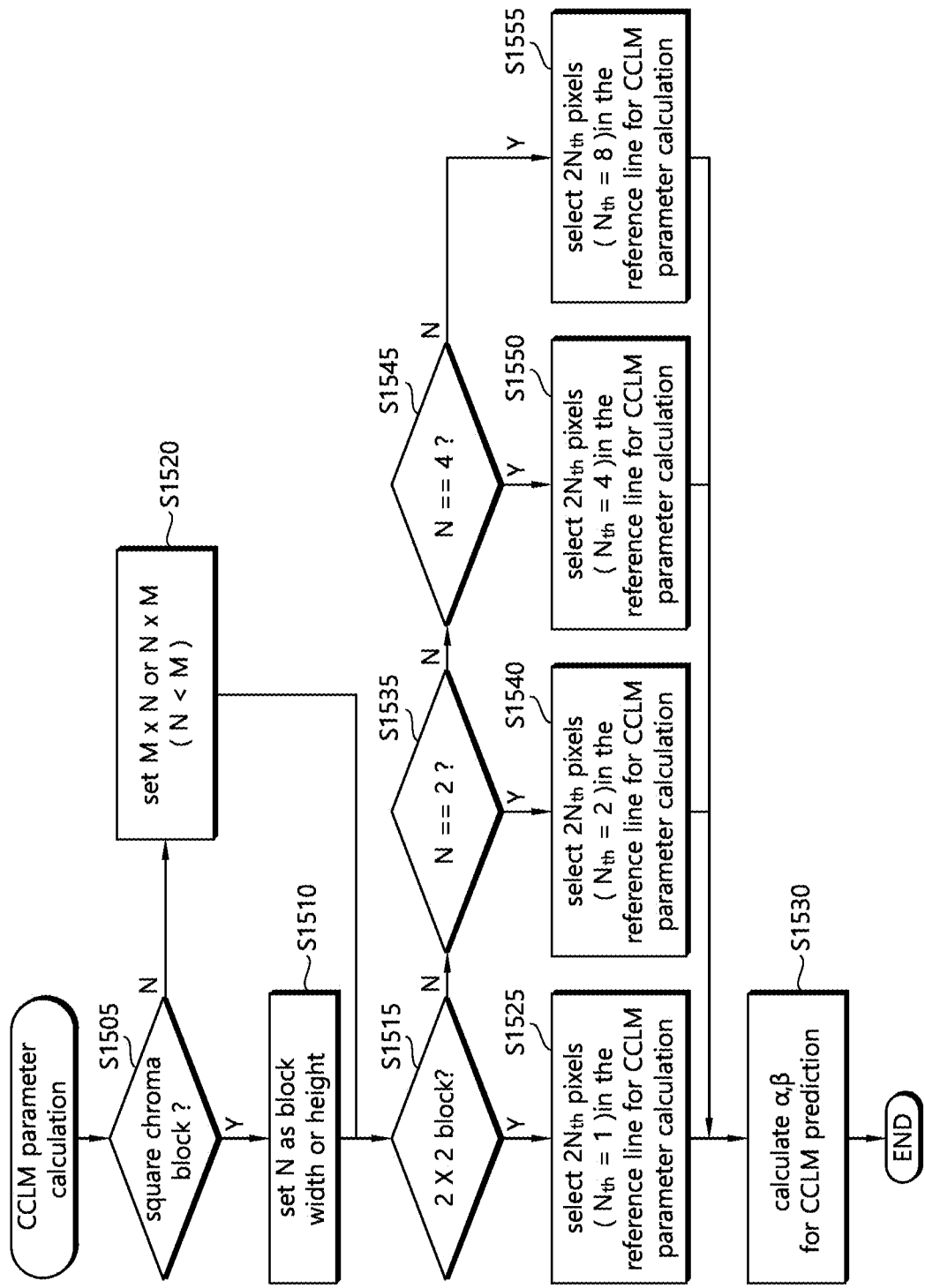

FIGS. 15a and 15b are diagrams for describing a procedure of performing CCLM prediction based on the CCLM parameters of the current chroma block derived according to method 3 of the present embodiment described above.

Referring to FIG. 15a, the encoding apparatus/decoding apparatus may calculate a CCLM parameter for the current block (step, S1500). For example, the CCLM parameter may be calculated as the present embodiment shown in FIG. 15b.

FIG. 15b may illustrate a specific embodiment of calculating the CCLM parameter. For example, referring to FIG. 15b, the encoding apparatus/decoding apparatus may determine whether the current chroma block is a square chroma block (step, S1505).

In the case that the current chroma block is a square chroma block, the encoding apparatus/decoding apparatus may set a width or a height of the current block to N (step, S1510) and determine whether a size of the current chroma block is 2×2 (step, S1515).

Alternatively, in the case that the current chroma block is not a square chroma block, a size of the current chroma block may be derived in M×N size or N×M size (step, S1520). The encoding apparatus/decoding apparatus determine whether a size of the current chroma block is 2×2 (step, S1515). Here, the M represents a value greater than the N (N<M).

In the case that a size of the current chroma block is 2×2, the encoding apparatus/decoding apparatus may select $2N_{th}$ neighboring samples in a reference line adjacent to the current block as a reference sample for the CCLM parameter calculation (step, S1525). Here, the $N_{th}$ may be 1 ($N_{th}$=1).

The encoding apparatus/decoding apparatus may derive parameters α and β for the CCLM prediction based on the selected reference samples (step, S1530).

Meanwhile, in the case that a size of the current chroma block is not 2×2, the encoding apparatus/decoding apparatus determine whether the N is 2 (N==2) (step, S1535).

In the case that the N is 2, the encoding apparatus/decoding apparatus may select $2N_{th}$ neighboring samples in a reference line adjacent to the current block as a reference sample for the CCLM parameter calculation (step, S1540). Here, the $N_{th}$ may be 2 ($N_{th}$=2). Later, the encoding apparatus/decoding apparatus may derive the parameters α and β for the CCLM prediction based on the selected reference samples (step, S1530).

Meanwhile, in the case that the N is not 2, the encoding apparatus/decoding apparatus may determine whether the N is 4 (N==4) (step, S1545).

In the case that the N is 4, the encoding apparatus/decoding apparatus may select $2N_{th}$ neighboring samples in a reference line adjacent to the current block as a reference sample for the CCLM parameter calculation (step, S1550). Here, the $N_{th}$ may be 4 ($N_{th}$=4). Later, the encoding apparatus/decoding apparatus may derive the parameters α and β for the CCLM prediction based on the selected reference samples (step, S1530).

Alternatively, in the case that the N is not 4, the encoding apparatus/decoding apparatus may select $2N_{th}$ neighboring samples in a reference line adjacent to the current block as a reference sample for the CCLM parameter calculation (step, S1555). Here, the $N_{th}$ may be 8 ($N_{th}$=8). Later, the encoding apparatus/decoding apparatus may derive the parameters α and β for the CCLM prediction based on the selected reference samples (step, S1530).

Referring to FIG. 15a again, in the case that the parameters for CCLM prediction for the current chroma block is calculated, the encoding apparatus/decoding apparatus may perform the CCLM prediction based on the parameters and generate a prediction sample for the current chroma block (step, S1560). For example, the encoding apparatus/decoding apparatus may generate a prediction sample for the current chroma block based on Equation 1 in which the calculated parameters and reconstructed samples of the current luma block for the current chroma block are used.

Meanwhile, in the case that subsampling is required in deriving a neighboring reference sample for a CCLM parameter calculation, the present disclosure proposes an embodiment of selecting a subsampling sample more efficiently.

Figure 16:
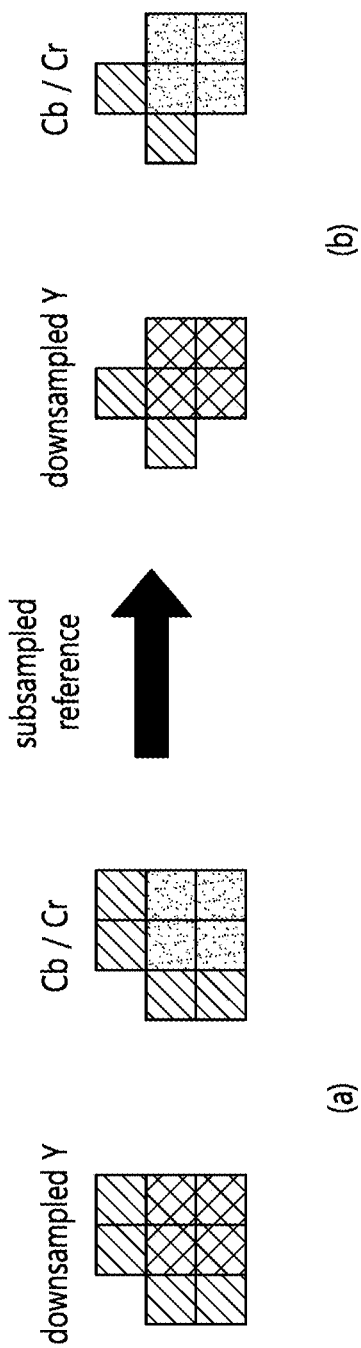
FIG. 16 illustrates an example of selecting a neighboring reference sample of a chroma block.

FIG. 16 illustrates an example of selecting a neighboring reference sample of a chroma block.

Referring to (a) of FIG. 16, in a chroma block of 2×2 size (N=2), CCLM parameters α and β for the chroma block may be calculated based on 4 neighboring reference samples. The neighboring reference samples may include 4 neighboring reference samples of the luma block and 4 neighboring reference samples of the chroma block. In addition, like the present embodiments described above, in the case that $N_{th}$ for the chroma block of 2×2 size is set to 1 ($N_{th}$=1), referring to (b) of FIG. 16, CCLM parameters α and β for the chroma block may be calculated based on 2 neighboring reference samples. However, as shown in FIG. 16, in the case of using neighboring reference samples which are sub-sampled in a half, since the neighboring reference samples are crowded in a top right side of the current chroma block, a problem occurs that diversity of neighboring reference samples is not considered in CCLM parameter calculation, which may be a cause of CCLM parameter accuracy degradation.

Figure 17A:
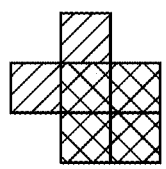
FIGS. 17a to 17c illustrates neighboring reference samples derived through the existing subsampling and neighboring reference samples derived through subsampling according to the present embodiment.
Figure 17A:
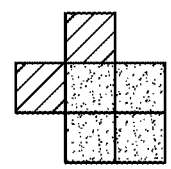
Figure 17A:
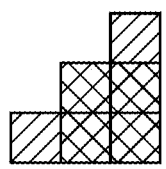
Figure 17A:
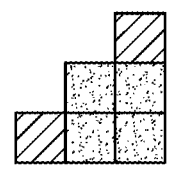
Figure 17B:
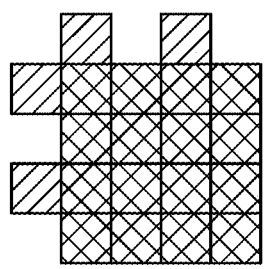
Figure 17B:
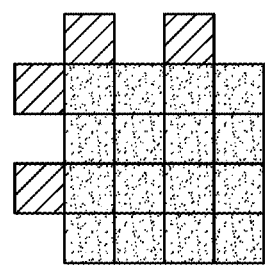
Figure 17B:
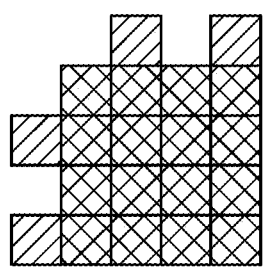
Figure 17B:
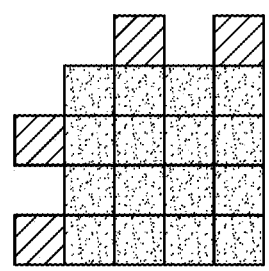
Figure 17C:
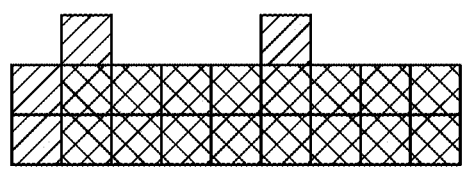
Figure 17C:
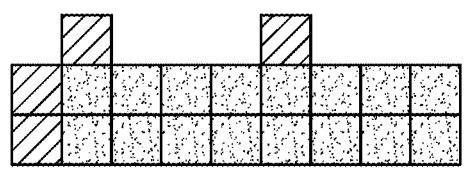
Figure 17C:
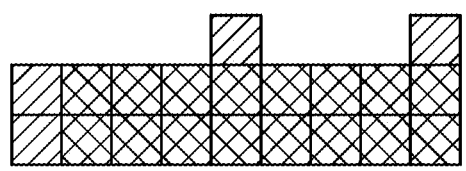
Figure 17C:
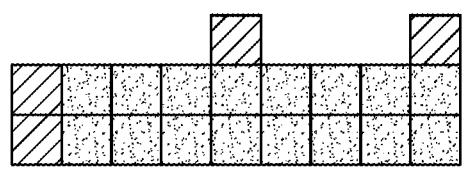

FIGS. 17a to 17c illustrates neighboring reference samples derived through the existing subsampling and neighboring reference samples derived through subsampling according to the present embodiment.

As shown in FIG. 17a and FIG. 17b, a neighboring sample which is far from a top left side of the current chroma block is preferentially selected through the subsampling according to the present embodiment, more diverse sample values may be selected in CCLM parameter calculation.

In addition, as shown in FIG. 17c, the present embodiment proposes subsampling that selects a side far from a top left side preferentially even for a non-square chroma block like n×2 size or 2×n size. Through this, more diverse sample values may be selected in CCLM parameter calculation, and through this, CCLM parameter calculation accuracy may be improved.

Meanwhile, the existing subsampling may be performed based on the following equation.

$$\text{Idx\_}w=(x*\text{width})/\text{subsample\_num}$$

$$\text{Idx\_}h=(y*\text{height})/\text{subsample\_num} \qquad \text{[Equation 4]}$$

Here, Idx_w may represent a neighboring reference sample (or position of neighboring reference sample) adjacent to a top current chroma block which is derived through subsampling, and Idx_h may represent a neighboring reference sample (or position of neighboring reference sample) adjacent to a left current chroma block which is derived through subsampling. Further, width may represent a width of the current chroma block, and height may represent a height of the current chroma block. In addition, subsample_num may represent the number of neighboring reference samples (the number of neighboring reference samples adjacent to a side) which is derived through subsampling.

For example, the subsampling performed based on Equation 4 above may be performed as below.

x of Equation 4 above is a variable and may be increased from 0 to a reference sample number of top neighboring reference samples of the current chroma block after subsampling. As an example, in the case that 2 top neighboring reference samples are selected in the current chroma block of which width is 16, the width of Equation 4 is 16, and x may vary from 0 to 1. In addition, since the Subsample_num is 2, 0 and 8 may be selected as the Idx_w value. Accordingly, in the case that x component and y component of a top left sample position of the current chroma block are 0, the top neighboring reference sample of which x coordinate is 0 and top the neighboring reference sample of which x coordinate is 8 may be selected among the top neighboring reference samples through the subsampling.

y of Equation 4 above is a variable and may be increased from 0 to a reference sample number of left neighboring reference samples of the current chroma block after subsampling. As an example, in the case that 4 left neighboring reference samples are selected in the current chroma block of which height is 32, the height of Equation 4 is 32, and y may vary from 0 to 3. In addition, since the Subsample_num is 4, 0, 8, 16 and 24 may be selected as the Idx_h value. Accordingly, in the case that x component and y component of a top left sample position of the current chroma block are 0, the left neighboring reference sample of which y coordinate is 0, the left neighboring reference sample of which y coordinate is 8, the left neighboring reference sample of which y coordinate is 16 and the left neighboring reference sample of which y coordinate is 24 may be selected among the left neighboring reference samples through the subsampling.

Referring to Equation 4 above, only the samples near to the top left of the current chroma block may be selected through the subsampling.

Therefore, according to the present embodiment, subsampling may be performed based on an equation different from Equation 4 above. For example, the subsampling proposed in the present embodiment may be performed based on the following equation.

$$Idx\_w = width - 1 - (x * width) / subsample\_num\_width$$

$$Idx\_h = height - 1 - (y * height) / subsample\_num\_height \quad \text{[Equation 5]}$$

Herein, subsample_num_width may represent a top neighboring reference sample number derived through subsampling, and subsample_num_height may represent a left neighboring reference sample number derived through subsampling.

In addition, x is a variable and may be increased from 0 to a reference sample number of top neighboring reference samples of the current chroma block after subsampling. Further, y is a variable and may be increased from 0 to a reference sample number of left neighboring reference samples of the current chroma block after subsampling.

For example, referring to Equation 5 above, in the case that 2 top neighboring reference samples are selected in the current chroma block of which width is 16, the width of Equation 5 is 16, and x may vary from 0 to 1. In addition, since the subsample_num_width is 2, 15 and 7 may be selected as the Idx_w value. Accordingly, in the case that x component and y component of a top left sample position of the current chroma block are 0, the top neighboring reference sample of which x coordinate is 15 and top the neighboring reference sample of which x coordinate is 7 may be selected among the top neighboring reference samples through the subsampling. That is, among the top neighboring reference samples of the current chroma block, the top neighboring reference sample which is far from the top left side of the current chroma block may be selected.

In addition, for example, referring to Equation 5 above, in the case that 4 left neighboring reference samples are selected in the current chroma block of which height is 32, the height of Equation 5 is 32, and y may vary from 0 to 3. In addition, since the subsample_num_height is 4, 31, 23, 15 and 7 may be selected as the Idx_h value. Accordingly, in the case that x component and y component of a top left sample position of the current chroma block are 0, the left neighboring reference sample of which y coordinate is 31, the left neighboring reference sample of which y coordinate is 23, the left neighboring reference sample of which y coordinate is 15 and the left neighboring reference sample of which y coordinate is 7 may be selected among the left neighboring reference samples through the subsampling.

Meanwhile, the subsample_num_width and the subsample_num_height of Equation 5 above may be derived based on a size of the current chroma block. For example, the subsample_num_width and the subsample_num_height may be derived as represented in the following figure.

FIG. 49 schematically shows derivation of the subsample_num_width and the subsample_num_height based on chroma block size.

Referring to FIG. 49, subsampling may be performed for neighboring reference samples adjacent to a long side in accordance with a short side between a width and a height of the current chroma block. That is, the number of neighboring reference samples selected among the neighboring reference samples adjacent to a long side may be derived as a smaller value between a width and a height of the current chroma block. For example, it may be derived as subsample_num_width=subsample_num_height=min (width, height).

Alternatively, for example, in the case that the $N_{th}$ is derived, the subsample_num_width and the subsample_num_height may be derived based on the $N_{th}$. For example, the subsample_num_width and the subsample_num_height may be derived as represented in the following figure based on the $N_{th}$.

FIG. 50 schematically shows derivation of the subsample_num_width and the subsample_num_height based on $N_{th}$.

Herein, min (A, B) may represent a smaller value between A and B.

Alternatively, for example, based on a predetermined look-up table (LUT), subsampling may be performed for deriving an optimal number of neighboring reference samples in accordance with a shape of the current chroma block. For example, the LUT may be derived as represented in the following figure.

FIG. 51 schematically shows LUT(look-up table) for deriving of the subsample_num_width and the subsample_num_height based on chroma block size according to an embodiment.

Referring to FIG. 51 above, the selected number of neighboring reference samples may be increased in comparison with the subsampling described above, and through this, a CCLM parameter may be calculated in higher accuracy. In subsampling for deriving 6 neighboring reference samples in the example described above, first 6 positions (idx_w or idx_h) may be selected among subsampling for deriving 8 neighboring reference samples, and in subsampling for deriving 12 or 14 neighboring reference samples, first 12 or 14 positions may be selected among subsampling for deriving 16 neighboring reference samples. In addition, in subsampling for deriving 24 or 28 neighboring reference samples, first 24 or 28 positions may be selected among subsampling for deriving 32 neighboring reference samples.

In addition, referring to FIG. 51, determination of the number of reference samples selected by the encoding apparatus and the decoding apparatus may be as below.

For example, in the case that the chroma block size of the current chroma block is 4×32, the subsample_num_width may be determined as 4 and the subsample_num_height may be determined as 28. In the case of the remaining chroma block sizes, the subsample_num_width and the subsample_num_height may be determined in the same manner.

Alternatively, in order to prevent increase of hardware complexity, subsampling for deriving simplified number of neighboring reference samples may be performed. For example, the LUT may be derived as represented in the following figure.

FIG. 52 schematically shows LUT(look-up table) for deriving of the subsample_num_width and the subsample_num_height based on chroma block size according to an embodiment.

Referring to FIG. 52 above, a maximum value of summation of the subsample_num_width and the subsample_num_height may set to 8. Through this, hardware complexity may be reduced, and simultaneously, a CCLM parameter may be calculated efficiently.

In subsampling for deriving 6 neighboring reference samples in the example described above, first 6 positions (idx_w or idx_h) may be selected among subsampling for deriving 8 neighboring reference samples.

In addition, referring to FIG. 52, determination of the number of reference samples selected by the encoding apparatus and the decoding apparatus may be as below.

For example, in the case that the chroma block size of the current chroma block is 4×32, the subsample_num_width may be determined as 2 and the subsample_num_height may be determined as 6. In the case of the remaining chroma block sizes, the subsample_num_width and the subsample_num_height may be determined in the same manner.

According to the proposed method, without need to transmit additional information, a value promised in an encoder or a decoder may be used, or it may be transmitted whether to use the proposed method or a value in a unit of CU, slice, picture and sequence.

In the case that the subsampling using the LUT as represented in FIG. 51 and FIG. 52 described above is performed, the encoding apparatus and the decoding apparatus may use the subsample_num_width and subsample_num_height numbers determined in the Table (i.e., LUT), and in the case that the $N_{th}$ is used, the subsample_num_width and the subsample_num_height may be determined based on the $N_{th}$ value. In addition, in the other cases, the value derived as FIG. 40 may be used as a default subsample_num_width and a subsample_num_height number.

Meanwhile, in the case that the proposed method is transmitted in a unit of CU, that is, the information representing whether to apply subsampling using Equation 5 described above is transmitted, a method for the decoding apparatus to perform a CCLM prediction by parsing cclm_subsample_flag as below, when an intra-prediction mode of the current chroma block is the CCLM mode.

In the case that the cclm_subsample_flag is 0 (false), a neighboring reference sample selection and a CCLM parameter calculation are performed through the existing subsampling method (subsampling based on Equation 4 described above).

In the case that the cclm_subsample_flag is 1 (true), a neighboring reference sample selection and a CCLM parameter calculation are performed through the proposed subsampling method (subsampling based on Equation 5 described above).

In the case that the information representing whether to use the proposed method is transmitted in in a unit of slice, picture and sequence, the information may be transmitted through high level syntax (HLS) as below. The decoding apparatus may select a subsampling method which is performed based on the information.

For example, the information representing whether to use the proposed method signaled through a slice header may be represented as the following figure.

FIG. 53 schematically shows signaling of syntax element cclm_subsample_flag in slice header according to an embodiment.

cclm_reduced_sample_flag may represent a syntax element of the information representing whether to use the proposed method.

Alternatively, for example, the information representing whether to use the proposed method signaled through a Picture Parameter Set (PPS) may be represented as the following figure.

FIG. 54 schematically shows signaling of syntax element cclm_subsample_flag in PPS according to an embodiment.

Alternatively, for example, the information representing whether to use the proposed method signaled through a Sequence Parameter Set (step, SPS) may be represented as the following figure.

FIG. 55 schematically shows signaling of syntax element cclm_subsample_flag in SPS according to an embodiment.

The method selected based on cclm_reduced_sample_flag value (i.e., a value derived by decoding cclm_reduced_sample_flag) transmitted through the slice header, the PPS or the SPS may be derived as represented in the following figure.

FIG. 56 schematically shows selection of proposed method based on cclm_subsample_flag.

Referring to FIG. 56, in the case that the ceclm_reduced_sample_flag value is 0, the subsampling using Equation 4 may be performed, and in the case that the ceclm_reduced_sample_flag value is 1, the subsampling using Equation 5 may be performed.

Meanwhile, in the case that a predetermined value is used in the encoding apparatus and the decoding apparatus without transmitting the additional information, the encoding apparatus may perform the embodiment described above in the same manner of the decoding apparatus and perform a CCLM parameter calculation based on the selected neighboring reference samples.

Alternatively, in the case that the information representing whether to apply the proposed subsampling method is transmitted in a unit of CU, slice, picture and sequence, the encoding apparatus may determine whether to apply the proposed subsampling method, and then, transmit information of the determined method to the decoding apparatus.

In the case that the information representing whether to apply the proposed subsampling method is transmitted in a unit of CU, when an intra-prediction mode of the current chroma block is CCLM mode, the encoding apparatus may determine a side of good encoding efficiency between two following cases through RDO and transmit information of the value representing the corresponding case to the decoding apparatus.

1) In the case that encoding efficiency is good when a CCLM parameter calculation are performed through the existing subsampling (subsampling based on Equation 4 described above), cclm_reduced_sample_flag of value 0 (false) is transmitted.

2) In the case that encoding efficiency is good when a CCLM parameter calculation are performed through the proposed subsampling (subsampling based on Equation 5 described above), cclm_reduced_sample_flag of value 1 (true) is transmitted.

In the case that the information representing whether to apply the proposed subsampling method is transmitted in a unit of slice, picture or sequence, the encoding apparatus may add a high level syntax (HLS) as represented in FIG. 53, FIG. 54 or FIG. 55 described above and transmit the information.

Figure 18:
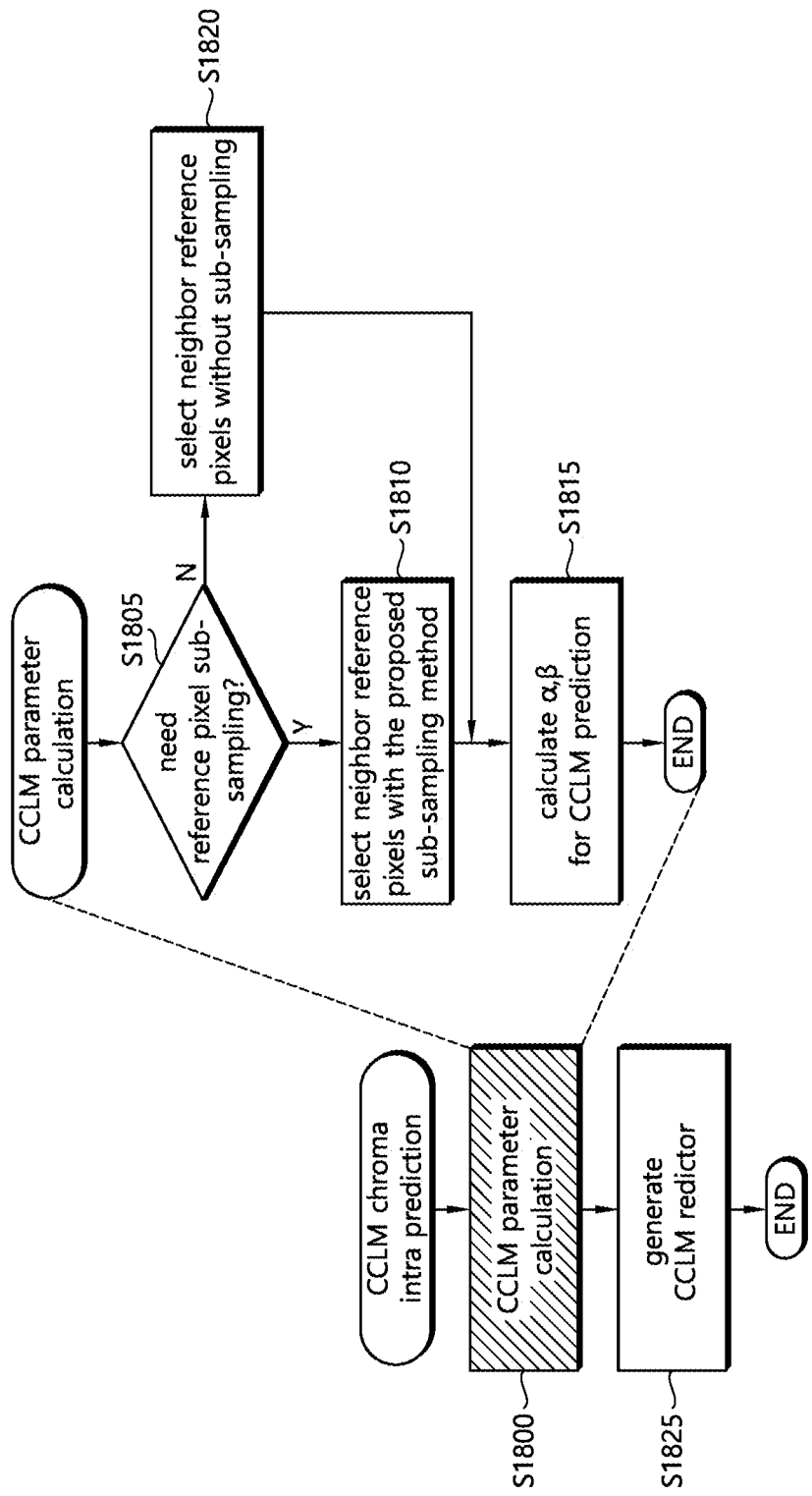
FIG. 18 illustrates an example of performing a CCLM prediction using subsampling using Equation 5 described above.

FIG. 18 shows an example of performing CCLM prediction using subsampling which utilizes Equation 5 described above.

Referring to FIG. 18, the encoding apparatus/decoding apparatus may calculate a CCLM parameter for the current block (step, S1800).

Specifically, the encoding apparatus/decoding apparatus may determine whether subsampling is required for neighboring samples of the current chroma block (step, S1805).

For example, in the case that top neighboring samples whose number is smaller than the width of the current chroma block are selected to derive CCLM parameters for the current chroma block, the subsampling is required to be performed for the top neighboring samples of the current chroma block. Further, for example, in the case that left neighboring samples whose number is smaller than the height of the current chroma block are selected to derive CCLM parameters for the current chroma block, the subsampling is required to be performed for the left neighboring samples of the current chroma block.

In the case that the subsampling is required, the encoding apparatus/decoding apparatus may select a specific number of surrounding samples by performing the subsampling using Equation 5 on the neighboring samples (step, S1810). Thereafter, the encoding apparatus/decoding apparatus may calculate CCLM parameters for the current chroma block based on the selected neighboring samples (step, S1815).

Meanwhile, in the case that the subsampling is not required, the encoding apparatus/decoding apparatus may select neighboring samples of the current chroma block without performing the subsampling (step, S1820). Thereafter, the encoding apparatus/decoding apparatus may calculate CCLM parameters for the current chroma block based on the selected neighboring samples (step, S1815).

In the case that the CCLM parameters are derived, the encoding apparatus/decoding apparatus may generate a prediction sample of the current chroma block by performing CCLM prediction for the current chroma block based on the CCLM parameters (step, S1825).

Figure 19:
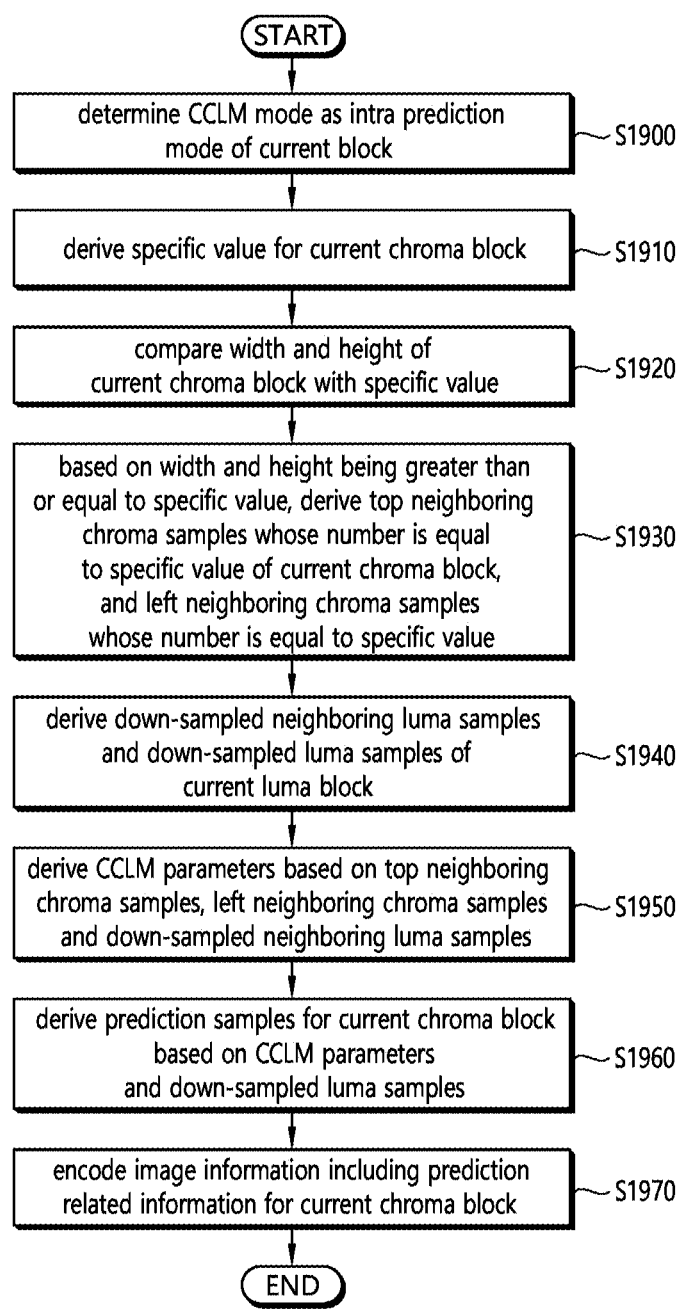
FIG. 19 schematically illustrates a video encoding method by the encoding apparatus according to the present disclosure.

FIG. 19 schematically represents an image encoding method by an encoding apparatus according to the present document. The method disclosed in FIG. 19 may be performed by the encoding apparatus disclosed in FIG. 2. Specifically, for example, S1900 to S1960 in FIG. 19 may be performed by the predictor of the encoding apparatus, and S1970 may be performed by the entropy encoder of the encoding apparatus. Further, although not shown, the process of deriving a residual sample for the current chroma block based on the original sample and the prediction sample for the current chroma block may be performed by the subtractor of the encoding apparatus; the process of deriving reconstructed samples for the current chroma block based on the residual samples and the prediction samples for the current chroma block may be performed by the adder of the encoding apparatus; the process of generating information on a residual for the current chroma block based on the residual sample may be performed by the transformer of the encoding apparatus; and the process of encoding the information on a residual may be performed by an entropy encoder unit of the encoding apparatus.

The encoding apparatus determines a cross-component linear model (CCLM) mode as an intra prediction mode of a current chroma block (step, S1900). For example, the encoding apparatus may determine the intra prediction mode of the current chroma block based on a rate-distortion cost (RDO). Here, the RD cost may be derived based on Sum of Absolute Difference (step, SAD). The encoding apparatus may determine the CCLM mode as the intra prediction mode of the current chroma block based on the RD cost.

In addition, the encoding apparatus may encode information on the intra prediction mode of the current chroma block, and the information on the intra prediction mode may be signaled through a bitstream. The prediction related information of the current chroma block may include information on the intra prediction mode.

The encoding apparatus derives a specific value for the current chroma block (step, S1910).

The encoding apparatus may derive a specific value for the current chroma block. The specific value may be derived to derive CCLM parameters of the current chroma block. For example, the specific value may be expressed as an upper limit of the number of neighboring samples or a maximum number of neighboring samples. The derived specific value may be 2. Alternatively, the derived specific value may be 4, 8 or 16.

For example, the specific value may be derived as a preset value. That is, the specific value may be derived as a value promised between the encoding apparatus and the decoding apparatus. In other words, the specific value may be derived as a preset value for the current chroma block to which the CCLM mode is applied.

Alternatively, for example, the encoding apparatus may encode image information including prediction related information, and signal image information including prediction related information through a bitstream, wherein the prediction related information may include information indicating the specific value. The information indicating the specific value may be signaled in units of a coding unit (CU), a slice, PPS, or SPS.

Alternatively, for example, the encoding apparatus may encode image information including prediction related information, which may include flag information indicating whether to derive the number of neighboring reference samples based on the specific value. In the case that the value of the flag information is 1, the flag information may indicate that the number of neighboring reference samples is derived based on the specific value, while, in the case that the value of the flag information is 0, the flag information may indicate that the number of neighboring reference samples is not derived based on the specific value. In the case that the value of the flag information is 1, the prediction related information may include information indicating the specific value. The information indicating the flag information and/or the specific value may be signaled in units of a coding unit (CU), a slice, PPS, or SPS.

Alternatively, for example, the specific value may be derived based on the size of the current block. As an example, the specific value may be derived based on whether a smaller value between the width and the height of the current block is greater than a specific threshold value. For example, in the case that a smaller value between the width and the height of the current block is greater than a specific threshold value, the specific value may be derived as 4, while, in the case that a smaller value between the width and the height of the current block is not greater than a specific threshold value, the specific value may be derived as 2, The specific threshold value may be derived as a preset value. That is, the specific threshold value may be derived as a value promised between the encoding apparatus and the decoding apparatus. Alternatively, for example, the encoding apparatus may encode image information including prediction related information, which may include information indicating the specific threshold value. In this case, the specific threshold value may be derived based on information indicating the specific threshold value. For example, the derived specific threshold value may be 4 or 8.

The encoding apparatus compares the width and the height of the current chroma block with the specific value (step, S1920). For example, the encoding apparatus may compare the width and the height of the current chroma block with the specific value.

As an example, the encoding apparatus may compare the width of the current chroma block with the specific value, and may compare the height of the current chroma block with the specific value.

Alternatively, as an example, the encoding apparatus may compare a smaller value between the width and the height of the current chroma block with the specific value, and may compare the height of the current chroma block with the specific value.

In the case that the width and the height are greater than or equal to the specific value, the encoding apparatus derives top neighboring chroma samples whose number is equal to the specific value of the current chroma block, and left neighboring chroma samples whose number is equal to the specific value (step, S1930).

The encoding apparatus derives down-sampled neighboring luma samples and down-sampled luma samples of the current luma block (step, S1940). Here, the neighboring luma samples may correspond to the top neighboring chroma samples and the left neighboring chroma samples. The down-sampled the surroundings luma samples may include down-sampled top neighboring luma samples of the current luma block corresponding to the top neighboring chroma samples, and down-sampled left neighboring luma samples of the current luma block corresponding to the left neighboring chroma samples.

In the case that the top neighboring chroma samples whose number is equal to the specific value are derived, down-sampled top neighboring luma samples whose number is equal to the specific value corresponding to the top neighboring chroma samples may be derived. Further, in the case that the top neighboring chroma samples whose number is equal to a value of the width are derived, down-sampled top neighboring luma samples whose number is equal to the value of the width corresponding to the top neighboring chroma samples may be derived.

Further, in the case that the left neighboring chroma samples whose number is equal to the specific value are derived, down-sampled left neighboring luma samples whose number is equal to the specific value corresponding to the left neighboring chroma samples may be derived. Further, in the case that the left neighboring chroma samples whose number is equal to a value of the height are derived, down-sampled left neighboring luma samples whose number is equal to the value of the height corresponding to the left neighboring chroma samples may be derived.

The encoding apparatus derives CCLM parameters based on the top neighboring chroma samples, the left neighboring chroma samples, and the down-sampled neighboring luma samples (step, S1950). The encoding apparatus may derive CCLM parameters based on the top neighboring chroma samples, the left neighboring chroma samples, and the down-sampled neighboring luma samples. For example, the CCLM parameters may be derived based on Equation 3 described above.

The encoding apparatus derives prediction samples for the current chroma block based on the CCLM parameters and the down-sampled luma samples (step, S1960). The encoding apparatus may derive prediction samples for the current chroma block based on the CCLM parameters and the down-sampled luma samples. The encoding apparatus may generate prediction samples for the current chroma block by applying the CCLM derived from the CCLM parameters to the down-sampled luma samples. That is, the encoding apparatus may generate prediction samples for the current chroma block by performing CCLM prediction based on the CCLM parameters. For example, the prediction samples may be derived based on Equation 1 described above.

The encoding apparatus encodes image information including prediction related information on the current chroma block (step, S1970). The encoding apparatus may encode image information including prediction related information on the current chroma block, and signal the encoded image information through a bitstream.

For example, the prediction related information may include information indicating the specific value. Additionally, for example, the prediction related information may include information indicating the specific value. Additionally, for example, the prediction related information may include flag information indicating whether to derive the number of neighboring reference samples based on the specific value. Also, for example, the prediction related information may include information indicating an intra prediction mode for the current chroma block.

Meanwhile, although not shown, the encoding apparatus may derive residual samples for the current chroma block based on original samples and prediction samples for the current chroma block, generate information on a residual for the current chroma block based on the residual samples, and encode the information on a residual. The image information may include the information on a residual. Further, the encoding apparatus may generate reconstructed samples for the current chroma block based on the prediction samples and the residual samples for the current chroma block.

Meanwhile, the bitstream may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

Figure 20:
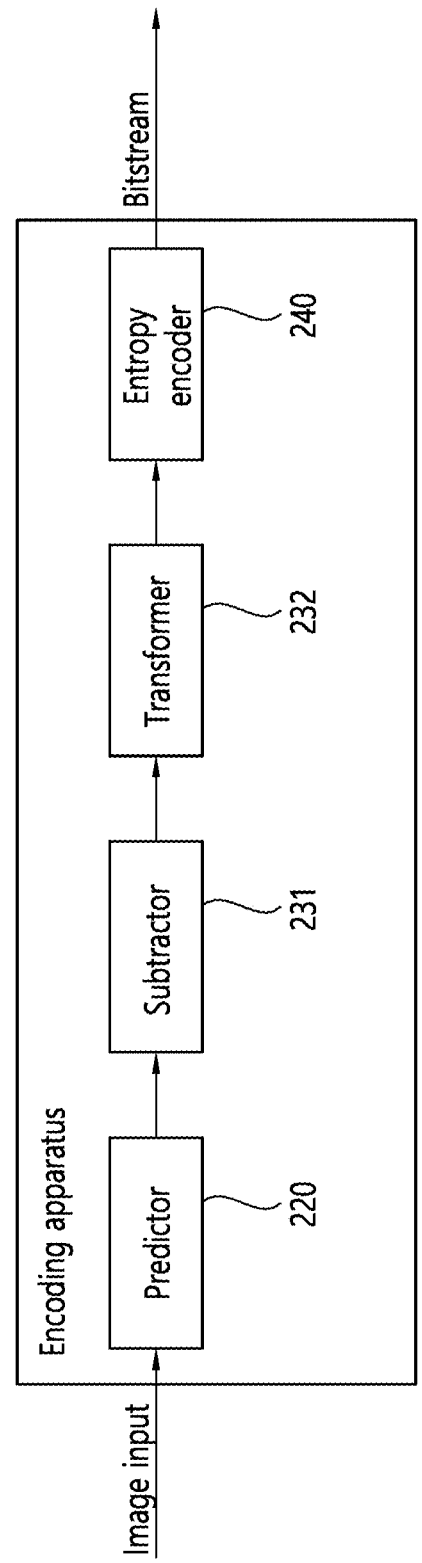
FIG. 20 schematically illustrates the encoding apparatus performing the image encoding method according to the present disclosure.

FIG. 20 schematically represents an encoding apparatus performing an image encoding method according to the present document. The method disclosed in FIG. 19 may be performed by the encoding apparatus disclosed in FIG. 20. Specifically, for example, a predictor of the encoding apparatus of FIG. 20 may perform S1900 to S1960 in FIG. 19, and the entropy encoder of the encoding apparatus of FIG. 20 may perform S1970 in FIG. 19. Further, although not shown, the process of deriving residual samples for the current chroma block based on the original samples and the prediction samples for the current chroma block may be performed by the subtractor of the encoding apparatus in FIG. 20; the process of deriving reconstructed samples for the current chroma block based on the residual samples and the prediction samples for the current chroma block may be performed by the adder of the encoding apparatus in FIG. 20; the process of generating information on a residual for the current chroma block based on the residual sample may be performed by the transformer of the encoding apparatus in FIG. 20; and the process of encoding the information on a residual may be performed by an entropy encoder unit of the encoding apparatus in FIG. 20.

Figure 21:
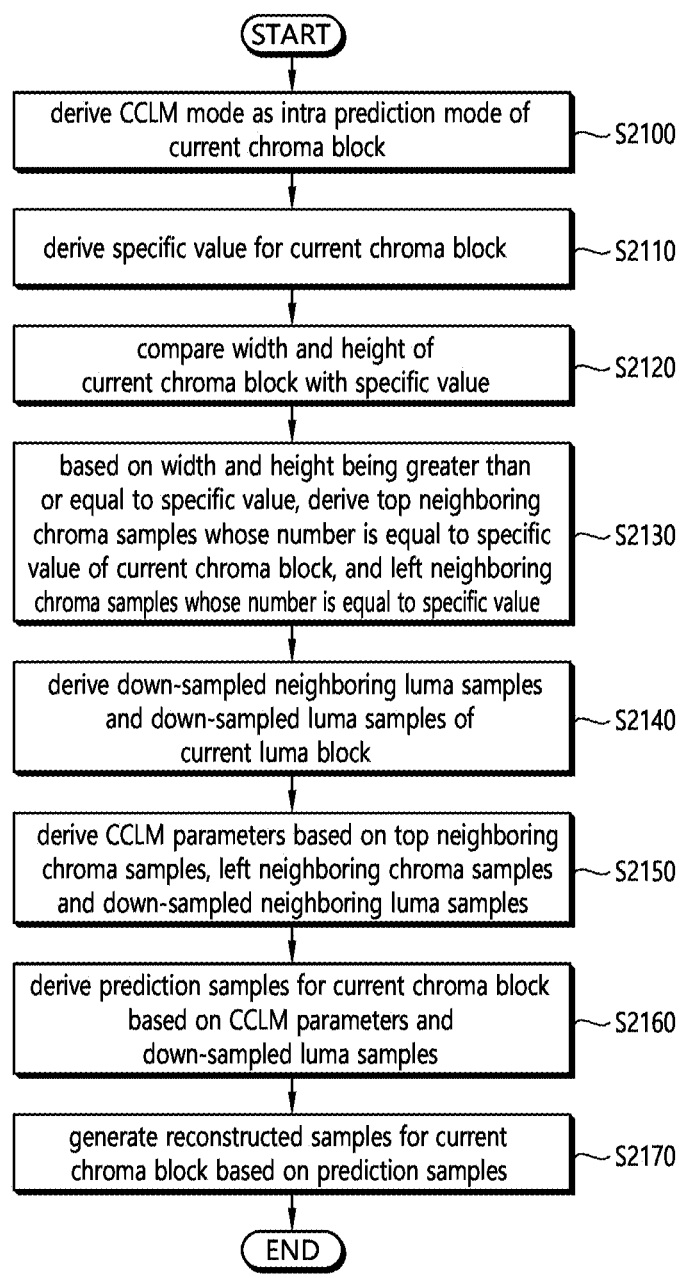
FIG. 21 schematically illustrates a video decoding method by the decoding apparatus according to the present disclosure.

FIG. 21 schematically represents an image decoding method by a decoding apparatus according to the present document. The method disclosed in FIG. 21 may be performed by the decoding apparatus disclosed in FIG. 3. Specifically, for example, S2100 to S2160 in FIG. 21 may be performed by the predictor of the decoding apparatus, and S2170 may be performed by the adder of the decoding apparatus. Further, although not shown, the process of obtaining information on a residual of the current block through a bitstream may be performed by the entropy decoder of the decoding apparatus, and the process of deriving the residual sample for the current block based on the residual information may be performed by the inverse transformer of the decoding apparatus.

The decoding apparatus derives a cross-component linear model (CCLM) mode as an intra prediction mode of the current chroma block (step, S2100). The decoding apparatus may derive an intra prediction mode of the current chroma intra prediction mode. For example, the decoding apparatus may receive information on an intra prediction mode of the current chroma block through a bitstream, and derive the CCLM mode as the intra prediction mode of the current chroma block based on the information on the intra prediction mode.

The decoding apparatus derives a specific value for the current chroma block (step, S2110). The decoding apparatus may derive a specific value for the current chroma block. The specific value may be derived to derive CCLM parameters of the current chroma block. For example, the specific value may be expressed as an upper limit of the number of neighboring samples or a maximum number of neighboring samples. The derived specific value may be 2. Alternatively, the derived specific value may be 4, 8 or 16.

For example, the specific value may be derived as a preset value. That is, the specific value may be derived as a value promised between the encoding apparatus and the decoding apparatus. In other words, the specific value may be derived as a preset value for the current chroma block to which the CCLM mode is applied.

Alternatively, for example, the decoding apparatus may obtain image information including prediction related information through a bitstream, and the prediction related information may include information indicating the specific value. In this case, the decoding apparatus may derive the specific value based on the information indicating the specific value. The information indicating the specific value may be signaled in units of a coding unit (CU), a slice, PPS, or SPS.

Alternatively, for example, the decoding apparatus may obtain image information including prediction related information through a bitstream, which may include flag information indicating whether to derive the number of neighboring reference samples based on the specific value. In the case that the value of the flag information is 1, the flag information may indicate that the number of neighboring reference samples is derived based on the specific value, while, in the case that the value of the flag information is 0, the flag information may indicate that the number of neighboring reference samples is not derived based on the specific value. In the case that the value of the flag information is 1, the prediction related information may include information indicating the specific value. In this case, the decoding apparatus may derive the specific value based on the information indicating the specific value. The information indicating the flag information and/or the specific value may be signaled in units of a coding unit (CU), a slice, PPS, or SPS.

Alternatively, for example, the specific value may be derived based on the size of the current block. As an example, the specific value may be derived based on whether a smaller value between the width and the height of the current block is greater than a specific threshold value. For example, in the case that a smaller value between the width and the height of the current block is greater than a specific threshold value, the specific value may be derived as 4, while, in the case that a smaller value between the width and the height of the current block is not greater than a specific threshold value, the specific value may be derived as 2. The specific threshold value may be derived as a preset value. That is, the specific threshold value may be derived as a value promised between the encoding apparatus and the decoding apparatus. Alternatively, for example, the decoding apparatus may obtain image information including prediction related information through a bitstream, and the prediction related information may include information indicating the specific threshold value. In this case, the specific threshold value may be derived based on information indicating the specific threshold value. For example, the derived specific threshold value may be 4 or 8.

The decoding apparatus compares the width and the height of the current chroma block with the specific value (step, S2120). For example, the decoding apparatus may compare the width and the height of the current chroma block with the specific value.

As an example, the decoding apparatus may compare the width of the current chroma block with the specific value, and may compare the height of the current chroma block with the specific value.

Alternatively, as an example, the decoding apparatus may compare a smaller value between the width and the height of the current chroma block with the specific value, and may compare the height of the current chroma block with the specific value.

In the case that the width and the height are greater than or equal to the specific value, the decoding apparatus derives top neighboring chroma samples whose number is equal to the specific value of the current chroma block, and left neighboring chroma samples whose number is equal to the specific value (step, S2130).

For example, in the case that the width and the height are greater than or equal to the specific value, the decoding apparatus may derive top neighboring chroma samples whose number is equal to the specific value of the current chroma block, and left neighboring chroma samples whose number is equal to the specific value.

Alternatively, for example, in the case that the width and the height are smaller than the specific value, the decoding apparatus may derive top neighboring chroma samples whose number is equal to a value of the width of the current chroma block, and left neighboring chroma samples whose number is equal to a value of the height.

Alternatively, for example, in the case that the width is greater than or equal to the specific value, and the height is smaller than the specific value, the decoding apparatus may derive top neighboring chroma samples whose number is equal to the specific value of the current chroma block, and left neighboring chroma samples whose number is equal to a value of the height.

Alternatively, for example, in the case that the width is smaller than the specific value, and the height is greater than or equal to the specific value, the decoding apparatus may derive top neighboring chroma samples whose number is equal to a value of the width of the current chroma block, and left neighboring chroma samples whose number is equal to the specific value.

Meanwhile, the top neighboring chroma samples may be neighboring chroma samples adjacent to the top boundary of the current chroma block, and the left neighboring chroma samples may be neighboring chroma samples adjacent to the left boundary of the current chroma block.

Additionally, in the case that the top neighboring chroma samples whose number is equal to the specific value is derived, top neighboring chroma samples of positions derived based on above Equation 4 among top neighboring chroma samples adjacent to the top boundary of the current chroma block may be derived as the top neighboring chroma samples whose number is equal to the specific value. Additionally, in the case that the left neighboring chroma samples whose number is equal to the specific value is derived, top neighboring chroma samples of positions derived based on above Equation 4 among left neighboring chroma samples adjacent to the left boundary of the current chroma block may be derived as the left neighboring chroma samples whose number is equal to the specific value.

Alternatively, in the case that the top neighboring chroma samples whose number is equal to the specific value is derived, top neighboring chroma samples of positions derived based on above Equation 5 among top neighboring chroma samples adjacent to the top boundary of the current chroma block may be derived as the top neighboring chroma samples whose number is equal to the specific value. Additionally, in the case that the left neighboring chroma samples whose number is equal to the specific value is derived, top neighboring chroma samples of positions derived based on above Equation 5 among left neighboring chroma samples adjacent to the left boundary of the current chroma block may be derived as the left neighboring chroma samples whose number is equal to the specific value.

The decoding apparatus derives down-sampled neighboring luma samples and down-sampled luma samples of the current luma block (step, S2140). Here, the neighboring luma samples may correspond to the top neighboring chroma samples and the left neighboring chroma samples. The down-sampled the surroundings luma samples may include down-sampled top neighboring luma samples of the current luma block corresponding to the top neighboring chroma samples, and down-sampled left neighboring luma samples of the current luma block corresponding to the left neighboring chroma samples.

In the case that the top neighboring chroma samples whose number is equal to the specific value are derived, down-sampled top neighboring luma samples whose number is equal to the specific value corresponding to the top neighboring chroma samples may be derived. Further, in the case that the top neighboring chroma samples whose number is equal to a value of the width are derived, down-sampled top neighboring luma samples whose number is equal to the value of the width corresponding to the top neighboring chroma samples may be derived.

Further, in the case that the left neighboring chroma samples whose number is equal to the specific value are derived, down-sampled left neighboring luma samples whose number is equal to the specific value corresponding to the left neighboring chroma samples may be derived. Further, in the case that the left neighboring chroma samples whose number is equal to a value of the height are derived, down-sampled left neighboring luma samples whose number is equal to the value of the height corresponding to the left neighboring chroma samples may be derived.

The decoding apparatus derives CCLM parameters based on the top neighboring chroma samples, the left neighboring chroma samples, and the down-sampled neighboring luma samples (step, S2150). The decoding apparatus may derive CCLM parameters based on the top neighboring chroma samples, the left neighboring chroma samples, and the down-sampled neighboring luma samples. For example, the CCLM parameters may be derived based on Equation 3 described above.

The decoding apparatus derives prediction samples for the current chroma block based on the CCLM parameters and the down-sampled luma samples (step, S2160). The decoding apparatus may derive prediction samples for the current chroma block based on the CCLM parameters and the down-sampled luma samples. The decoding apparatus may generate prediction samples for the current chroma block by applying the CCLM derived from the CCLM parameters to the down-sampled luma samples. That is, the decoding apparatus may generate prediction samples for the current chroma block by performing CCLM prediction based on the CCLM parameters. For example, the prediction samples may be derived based on Equation 1 described above.

The decoding apparatus generates reconstructed samples for the current chroma block based on the prediction samples (step, S2170). The decoding apparatus may generate reconstructed samples based on the prediction samples. For example, the decoding apparatus may receive information on the residual for the current chroma block from the bitstream. The information on the residual may include a transform coefficient relating to a (chroma) residual sample. The decoding apparatus may derive the residual sample (or residual sample array) for the current chroma block based on the residual information. In this case, the decoding apparatus may generate the reconstructed samples based on the prediction samples and the residual samples. The decoding apparatus may derive a reconstructed block or a reconstructed picture based on the reconstructed sample. Thereafter, as described above, the decoding apparatus may apply an in-loop filtering procedure such as deblocking filtering and/or an SAO procedure to the reconstructed picture in order to improve subjective/objective video quality, as needed.

Figure 22:
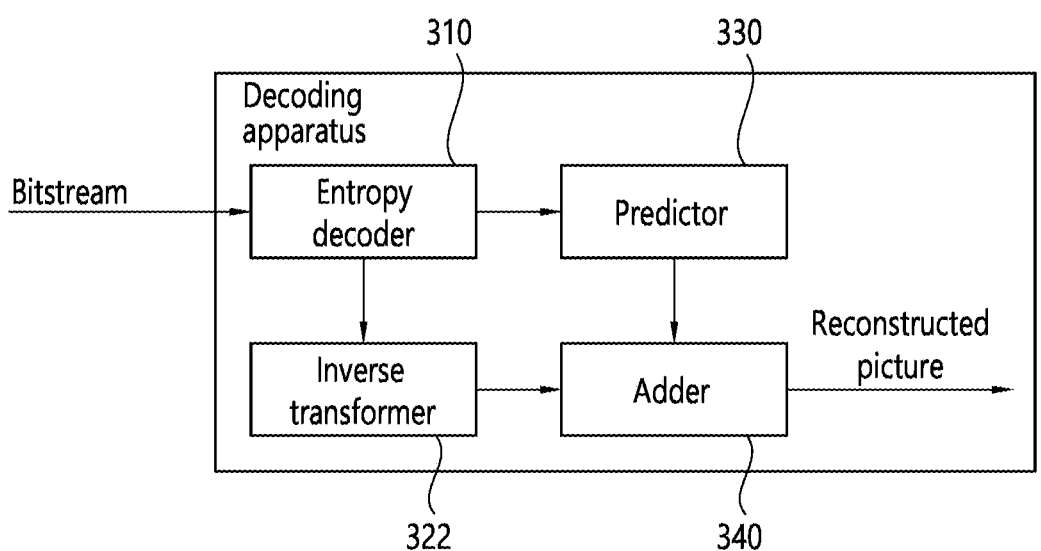
FIG. 22 schematically illustrates a decoding apparatus for performing a video decoding method according to the present disclosure.

FIG. 22 schematically represents a decoding apparatus performing an image decoding method according to the document. The method disclosed in FIG. 21 may be performed by the decoding apparatus disclosed in FIG. 22. Specifically, for example, a predictor of the decoding apparatus of FIG. 22 may perform S2100 to S2160 in FIG. 21, and an adder of the decoding apparatus of FIG. 22 may perform S2170 in FIG. 21. Further, although not shown, the process of obtaining image information including information on the residual of the current block through a bitstream may be performed by the entropy decoder of the decoding apparatus of FIG. 22, and the process of deriving the residual samples for the current block based on the information on the residual may be performed by the inverse transformer of the decoding apparatus of FIG. 22.

According to the above-described document, image coding efficiency can be improved by performing the intra prediction based on the CCLM.

In addition, according to this document, it is possible to increase the efficiency of intra prediction based on the CCLM.

In addition, according to this document, the complexity of intra prediction can be reduced by limiting the number of neighboring samples selected to derive a linear model parameter for the CCLM to a specific number.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 23:
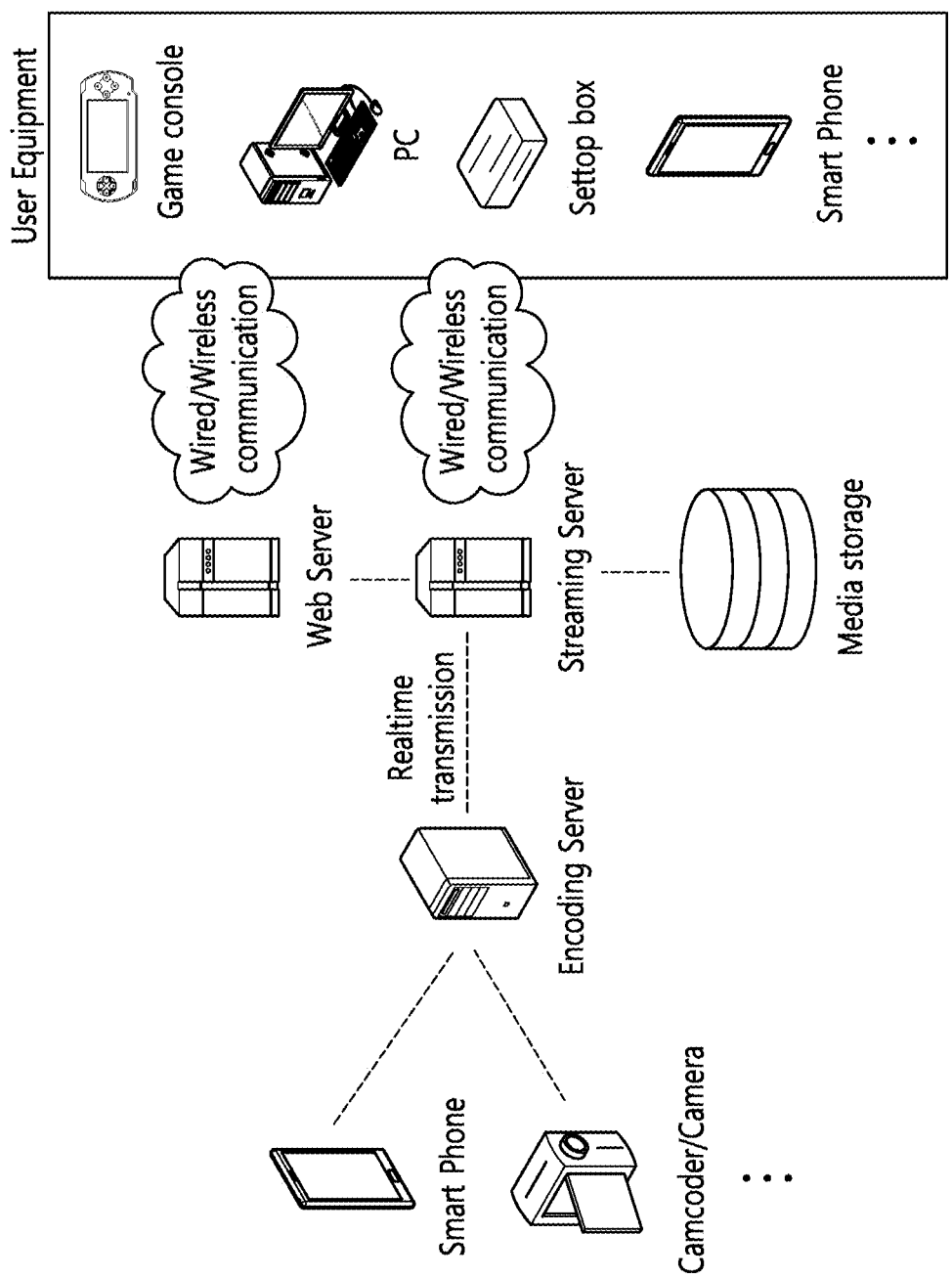
FIG. 23 illustrates a structural diagram of a contents streaming system to which the present disclosure is applied.

FIG. 23 illustrates a structural diagram of a contents streaming system to which the present disclosure is applied.

The content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like. Each server in the content streaming system may be operated as a distributed server, in which case data received from each server may be distributed.

The invention claimed is:

1. An image decoding method performed by a decoding apparatus, the image decoding method comprising:
   obtaining prediction related information for a current chroma block;
   deriving a cross-component linear model (CCLM) mode as an intra prediction mode of the current chroma block based on the prediction related information;
   deriving a specific value for the current chroma block;
   deriving specific top neighboring chroma samples and specific left neighboring chroma samples of the current chroma block based on a width and a height of the current chroma block and the specific value;
   deriving CCLM parameters based on the specific top neighboring chroma samples and the specific left neighboring chroma samples;
   deriving prediction samples for the current chroma block based on the CCLM parameters; and
   generating reconstructed samples for the current chroma block based on the prediction samples,
   wherein the derived specific value is 2,
   wherein based on the width and the height being greater than or equal to the specific value, top neighboring chroma samples of specific top positions among top neighboring chroma samples of the current chroma block are selected as the specific top neighboring chroma samples,
   wherein the specific top positions are derived based on the number of the specific top neighboring chroma samples and the width of the current chroma block,
   wherein based on the width and the height being greater than or equal to the specific value, left neighboring chroma samples of specific left positions among left neighboring chroma samples of the current chroma block are selected as the specific left neighboring chroma samples, wherein the specific left positions are derived based on the number of the specific left neighboring chroma samples and the height of the current chroma block, and wherein based on the width of the current chroma block being equal to 4 and the number of the specific top neighboring chroma samples being equal to 2, the specific top positions are (1,−1) and (3,−1).

2. An image encoding method performed by an encoding apparatus, the image encoding method comprising:

determining a cross-component linear model (CCLM) mode as an intra prediction mode of a current chroma block;

deriving a specific value for the current chroma block;

deriving specific top neighboring chroma samples and specific left neighboring chroma samples of the current chroma block based on a width and a height of the current chroma block and the specific value;

deriving CCLM parameters based on the specific top neighboring chroma samples and the specific left neighboring chroma samples;

deriving prediction samples for the current chroma block based on the CCLM parameters; and encoding image information including prediction related information for the current chroma block, wherein the derived specific value is 2, wherein based on the width and the height being greater than or equal to the specific value, top neighboring chroma samples of specific top positions among top neighboring chroma samples of the current chroma block are selected as the specific top neighboring chroma samples, wherein the specific top positions are derived based on the number of the specific top neighboring chroma samples and the width of the current chroma block, wherein based on the width and the height being greater than or equal to the specific value, left neighboring chroma samples of specific left positions among left neighboring chroma samples of the current chroma block are selected as the specific left neighboring chroma samples, wherein the specific left positions are derived based on the number of the specific left neighboring chroma samples and the height of the current chroma block, and wherein based on the width of the current chroma block being equal to 4 and the number of the specific top neighboring chroma samples being equal to 2, the specific top positions are (1,−1) and (3,−1).

3. A transmission method of data for image, the method comprising:

obtaining a bitstream of image information including prediction related information for prediction samples for a current chroma block; and transmitting the data including the bitstream of the image information including the prediction related information, wherein the prediction samples for the current chroma block are derived based on cross-component linear model (CCLM) parameters, wherein the CCLM parameters are derived based on specific top neighboring chroma samples of the current chroma block, and specific left neighboring chroma samples of the current chroma block, wherein the specific top neighboring chroma samples and the specific left neighboring chroma samples of the current chroma block are derived based on a width and a height of the current chroma block and a specific value for the current chroma block, wherein the derived specific value is 2, wherein based on the width and the height being greater than or equal to the specific value, top neighboring chroma samples of specific top positions among top neighboring chroma samples of the current chroma block are selected as the specific top neighboring chroma samples, wherein the specific top positions are derived based on the number of the specific top neighboring chroma samples and the width of the current chroma block, wherein based on the width and the height being greater than or equal to the specific value, left neighboring chroma samples of specific left positions among left neighboring chroma samples of the current chroma block are selected as the specific left neighboring chroma samples, wherein the specific left positions are derived based on the number of the specific left neighboring chroma samples and the height of the current chroma block, and wherein based on the width of the current chroma block being equal to 4 and the number of the specific top neighboring chroma samples being equal to 2, the specific top positions are (1,−1) and (3,−1).

* * * * *